US006792188B2

(12) United States Patent
Libori et al.

(10) Patent No.: US 6,792,188 B2
(45) Date of Patent: Sep. 14, 2004

(54) DISPERSION MANIPULATING FIBER

(75) Inventors: Stig Eigil Barkou Libori, Gentofte (DK); Jes Broeng, Lyngby (DK); Anders Bjarklev, Roskilde (DK); Thomas Sondergaard, Lyngby (DK); Martin Dybendal Nielsen, Lyngby (DK)

(73) Assignee: Crystal Fibre A/S, Birkerod (DK)

( * ) Notice: Subject to any disclaimer, the term of this patent is extended or adjusted under 35 U.S.C. 154(b) by 87 days.

(21) Appl. No.: 09/910,705

(22) Filed: Jul. 20, 2001

(65) Prior Publication Data

US 2002/0061176 A1 May 23, 2002

Related U.S. Application Data

(60) Provisional application No. 60/223,451, filed on Aug. 4, 2000.

(30) Foreign Application Priority Data

| Jul. 21, 2000 | (DK) | ................................... | PA 2000 01125 |
| Sep. 21, 2000 | (DK) | ................................... | PA 2000 01405 |
| Feb. 12, 2001 | (DK) | ................................... | PA 2001 00227 |
| Jun. 28, 2001 | (DK) | ................................... | PA 2001 01014 |

(51) Int. Cl.[7] .............................. G02B 6/02; G02B 6/20
(52) U.S. Cl. ....................................... 385/125; 385/126
(58) Field of Search ................................ 385/125, 126

(56) References Cited

U.S. PATENT DOCUMENTS

| 5,155,792 A | * | 10/1992 | Vali et al. .................... 385/125 |
| 5,802,236 A | * | 9/1998 | DiGiovanni et al. ......... 385/127 |
| 5,907,652 A | * | 5/1999 | DiGiovanni et al. ......... 385/125 |
| 6,243,522 B1 | * | 6/2001 | Allan et al. .................. 385/123 |
| 6,418,258 B1 | * | 7/2002 | Wang .......................... 385/123 |

FOREIGN PATENT DOCUMENTS

| EP | 1 054 273 | 11/2000 |
| WO | WO 99/00685 | 1/1999 |
| WO | WO 99/64903 | 12/1999 |
| WO | WO 99/64904 | 12/1999 |
| WO | WO 00/16141 | 3/2000 |
| WO | WO 00/37974 | 6/2000 |
| WO | WO 00/49436 | 8/2000 |
| WO | WO 01/31376 | 5/2001 |
| WO | WO 01/37008 | 5/2001 |
| WO | WO 01/96919 A1 | 12/2001 |

OTHER PUBLICATIONS

Monra, Tanya Holey Optical Fibers: An Efficient Modal Model Journal Of Lightwave Technology (IEEE) vol. 17, No 6 Jun. 1999.*
Russel, Philip WO 00/49436 (PCT) Aug. 24, 2000.*
Birks, Timothy WO99/00685 (PCT) Jan. 07, 1999.*
Birks et al., "Dispersion compesation using single–material fibers," *IEEE Photonics Technology Letters* 11:674–676 (Jun. 199).
Broderick et al., "Nonlinearity in holey optical fibers: measurement and future opportunities,"*Optics Letters*, 24:13951 397 (Oct. 1999).
Broeng et al., "Waveguidance by the photonic bandgap effect in optical fibres," *J. Opt. A:Pure Appl. Opt* 1:477–482(1999).

(List continued on next page.)

*Primary Examiner*—John D. Lee
*Assistant Examiner*—Daniel Valencia
(74) *Attorney, Agent, or Firm*—Merchant & Gould P.C.

(57) ABSTRACT

The present invention relates to optical fibers and especially to optical fibers having microstructures in core and/or cladding region(s). The fibers may be utilized for dispersion compensation and non-linear applications.

169 Claims, 39 Drawing Sheets

OTHER PUBLICATIONS

Broeng et al., "Photonic crystal fibers: a new class of optical waveguides,"*Optical Fiber Technology*, 5:305–329 (1999).

Fedotov et al., "Spectral broadening of femtosecond laser pulses in fibers with a photonic–crystal cladding," *JETP Letters*, 71:281–284 (2000).

Ferrando et al., "Nearly zero ultraflattened dispersion in photonic crystal fibers," *Optics Letters*, 25:790–792 (Jun. 2000).

Knight et al., "Properties of photonic crystal fiber and the effective index model," *J. Opt. Soc. A.A*, 15:748–752 (Mar. 1998).

Moneric, "Propagation in doubly clad single–mode fibers," *IEEE Journal of Quantum Electronics*, QE–18: 535–542 (Apr. 1982).

Mogilevtsev et al., "Group–velocity dispersion in photonic crystal fibers," *Optics Letters* 23:1662–1664 (Nov. 1998).

Monro et al., "Holey optical fibers an efficient modal model," *J. Lightwave Tech.*, 17: 1993–102 (Jun. 1999).

Monro et al., "Holey Fibers with random cladding distributions," *Optics Letters*, 25:206–208 (Feb. 2000).

Ranka et al., "Visible continuum generation in air–silica microstructure optical fibers with anomalous dispersion at 800 nm," *Optics Letters*, 25:25–27 (Jan. 2000).

Wadsworth et al., "Solition effects and supercontinuum generation in photonic crystal fibers at 850 nm," *CLEO 2000*, PD1.5 (2000).

* cited by examiner

DISPERSION MANIPULATING FIBER

This application claims priority to U.S. provisional application Serial No. 60/223,451, filed Aug. 4, 2000.

FIELD OF THE INVENTION

The present invention relates to optical fibres and especially to optical fibres having micro-structures in core and/or cladding region(s). The fibres may be utilized for dispersion compensation and non-linear applications.

BACKGROUND OF THE INVENTION

The dispersion properties of conventional optical fibres are receiving a continuously high research interest in connection with high-capacity optical communication, soliton propagation, and control of non-linear effects. Accordingly, there is a strong interest in realizing new types of optical fibres that may provide new dispersion properties or may counteract some of the undesired dispersion properties of existing fibres.

Recently a new type of optical fibre that is characterized by a so-called micro structure has been proposed. Optical fibres of this type (which are referred to by several names—as e.g. micro-structured fibres, photonic crystal fibre, holey fibre, and photonic bandgap fibres) have been described in a number of references, such as WO 99/64903, WO 99/64904, and Broeng et al (see Pure and Applied Optics, pp. 477–482, 1999) describing such fibres having claddings defining Photonic Band Gap (PBG) structures, and U.S. Pat. No. 5,802,236, Knight et al. (see J. Opt. Soc. Am. A, Vol. 15, No. 3, pp. 748–752, 1998), Monro et al. (see Optics Letters, Vol. 25 (4), p. 206–8, February 2000) defining fibres where the light is transmitted using modified Total Internal Reflection (TIR). This application covers fibres that may guide by both physical principles and we shall use the term micro-structured fibres to generally describe these fibres.

Micro-structured fibres are known to exhibit dispersion properties that are unattainable in conventional optical fibres (see e.g. Ranka et al., Optics Letters, Vol. 25, No. 1, pp.25–27, 2000, Broderick et al. Optics Letters, Vol. 24, No. 20, pp. 1395–1397, 1999, Mogilevtsev et al. Optics Letters, Vol. 23, No. 21, pp. 1662–1664, 1998). These properties include shifting the zero dispersion wavelength below 1.3 $\mu$m. This has e.g. in the above-cited Ranka-reference been utilized for super-continuum generation of light over a very broad frequency range (covering visible to near-infrared wavelengths). The development of such white-light generators using micro-structured fibres was made possible through the design of micro-structured fibres with high anomalous waveguide dispersion at visible wavelength—and it has fuelled a large research interest into non-linear effects in micro-structured fibres (Fedotov et al. JETP Letters, Vol. 71, No. 7, pp. 281–284, 2000, Wadsworth et al. CLEO 2000, Paper PD1.5, 2000). The above-cited references all describe fibres with zero dispersion wavelength shifted below 1.3 $\mu$m. The fibres are characterized by a relatively high cladding air-filling fraction—air hole diameters, d, of more than 0.45 times the centre-to-centre distance between two nearest air holes, $\Lambda$, and they all have a solid core. The size of the core is relatively small—about 1.5 $\mu$m in diameter. It is a disadvantage of the prior art fibres with zero-dispersion wavelength shifted below 1.3 $\mu$m that they are not strictly single-mode at visible wavelengths, but support a few (or more) guided modes. In the above-cited reference by Ranka et al., it is demonstrated that for relatively short fibre lengths, the fundamental mode of such fibres may be considered undisturbed by any higher order guided modes (i.e. there is a low coupling coefficient between the fundamental and the higher order modes). However, for guidance over longer fibre lengths (i.e. hundred of meters) it is a disadvantage of the prior art fibres with zero dispersion wavelength shifted below 1.3 $\mu$m that they are not strictly single mode at visible wavelengths. It is a further disadvantage of the prior art fibres with zero dispersion wavelength below 1.3 $\mu$m that they will be highly multimode at visible wavelengths if the core size is increased above 2 $\mu$m. It would be an advantage if fibres with zero dispersion wavelength shifted below 1.3 $\mu$m could be realized so as to have a core that was comparable in size to that of standard transmission optical fibres (i.e. to have a core of around 5 micron in diameter).

Another important aspect of micro-structured fibres is that they may exhibit normal dispersion (or so-called negative dispersion) at near-infrared wavelengths. Fibres with large negative dispersion at 1.55 $\mu$m are attractive for use as insertion-components in existing optical fibre communication links, as they may be used to compensate the positive dispersion around 1.55 $\mu$m of already installed standard transmission fibres (i.e. fibres that are designed to operate in the second telecommunication window and have a zero dispersion wavelength at 1.3 $\mu$m).

Monro et al. have presented micro-structured fibres having dispersion values of about –30 ps/nm/km at 1.55 $\mu$m (see Journal of Lightwave Technology, Vol. 17, No. 6, pp. 1093–1102, 1999). The fibres presented by Monro et al. are characterized by a solid core surrounded by micro-structured cladding with a close-packed arrangement of identical air holes. The cladding holes have a size d/$\Lambda$ around 0.2. It is a disadvantage of the fibres presented by Monro et al. that the dispersion is not more negative than –30 ps/nm/km. DiGiovanni et al. (see U.S. Pat. No. 5,802,236) have presented micro-structured fibres that provide significantly larger negative dispersion at near-infrared wavelengths. DiGiovanni et al. disclose micro-structured fibres that are characterized by a core and a micro-structured cladding. The cladding consists of inner and outer cladding features, thereby forming an inner and an outer cladding region. Both the inner and outer cladding of the fibres have an effective index that is lower than the core refractive index at all wavelengths. The features of the inner cladding region (preferably air holes) act to lower the effective refractive index compared to the effective refractive index of the outer cladding region. Hence, the fibres disclosed by DiGiovanni have a so-called "depressed" cladding design. The use of depressed cladding regions is well-known from the development of conventional dispersion compensating fibres (see e.g., M. Monerie, Propagation in doubly clad single-mode fibres, IEEE Journal of Quantum Electronics, vol. QE-18, no. 4, April 1982, pp. 535–542). To those skilled in the art, it will be recognised that in order to increase the negative dispersion of the fibres disclosed by DiGiovanni et al., the size of the cladding features must be increased. Digiovanni et al. disclose fibres that have dispersion of up to –1700 ps/nm/km. It is a disadvantage of the fibres disclosed by DiGiovanni that the depressed cladding design does not allow to increase the inner cladding feature size so as to obtain negative dispersion of more than –2500 ps/nm/km. This latter limit of maximum obtainable negative dispersion was predicted by Birks et al. (see Photonics Technology Letters, Vol. 11, No. 6, pp. 674–676, 1999). Birks et al. studied the fundamental limits of negative dispersion that can be obtained in solid core micro-structured fibres made of pure silica and air. Birks et al. argue in the above-cited reference that by increasing the void size (air holes), the negative dispersion of micro-structured fibres is generally increased. Hence, an ideal micro-structured fibre (with respect to negative dispersion) consists—according to Birks et al.—merely of a thin silica rod (the fibre core) surrounded by air. Hence, Birks et al. made a prediction of the maximum obtainable negative dispersion based on the study of a solid silica rod surrounded completely by air (this case corresponds to the inner cladding features of the fibres disclosed by DiGiovanni et al. being so large that they overlap each-other). For such an ideal micro-structured fibre, Birks et al. found a dispersion of −2000 ps/nm/km. This result has been taken as the maximum obtainable negative dispersion that can be obtained using silica-based optical fibres. It is a disadvantage of the fibres disclosed by Birks et al. that a negative dispersion of more than −2500 ps/nm/km cannot be obtained. It is a further disadvantage of the fibres disclosed by Birks et al. and of DiGiovanni et al. that the fibre core must be very small (about 1 μm or less in diameter) in order to ensure single mode operation at near-infrared wavelengths while exhibiting large negative dispersion.

The present invention provides fibres that are substantially single mode at visible wavelengths while having zero dispersion shifted below 1.3 μm. This application further discloses fibres that are strictly single mode, have a zero dispersion wavelength below 1.3 micron, and a core diameter of more than 2 μm.

This application discloses micro-structured fibres that have dispersion significantly more negative than −2500 ps/nm/km. The present inventors have realized that it is advantageous to turn up-side-down the usual design rules for realization of fibre with large negative dispersion—and to design fibres with a so-called "raised", micro-structured, inner cladding region. As documented in this application, it becomes possible to realise micro-structured fibres with negative dispersion of at least up to −4500 ps/nm/km. This application describes in detail the design-route that the present inventors have found in order to realize such fibres and discloses a number of preferred embodiments of fibres according to the present invention.

The present invention is particularly aimed at fibres for dispersion compensating and/or dispersion slope compensating applications.

While non-linearities are usually undesired for transmission and dispersion compensating fibres, they are for, other applications, desired as they may be utilized to provide different kinds of functionalities in optical fibres (such as wavelength conversion, parametric amplification, supercontinuum generation, solitons etc.). For a detailed description of non-linear fibres and their applications, please see Agrawal, "Nonlinear fiber optics", *Academic Press*, third edition, 2001.

Also for non-linear fibres, dispersion plays an important role, and in order to realise improved non-linear fibres, it is vital to be able to control and manipulate the dispersion properties of such fibres accurately. The present invention also addresses fibres with special dispersion properties for a number of non-linear fibre applications in the near-infrared wavelength range. In particular, the present invention provides new micro-structured fibres with small cores and so-called flat, near-zero dispersion at near-infrared wavelengths (especially around 1.5 μm) for use as non-linear fibres.

Ferrando et al. have studied fibres with nearly zero, flat dispersion (Optics Letters, Vol. 25, No. 11, pp. 790–792, Jun. 1, 2000). Fibres with such dispersion properties are of large interest as non-linear fibres, since low dispersion (close to zero) is one of the key elements in order to reduce the threshold for non-linear effects. A further key element is to reduce the mode field diameter of the guide mode as much as possible. Hence, small cores and near-zero dispersion are desired characteristics for non-linear fibres. In order to utilize non-linear effects in fibres over broader wavelength ranges (such as in modem broadband telecommunication systems), it is further desired that the near-zero dispersion is obtained over a broad wavelength range in the near-infrared (hence, that the dispersion curve is relatively flat over the wavelength range of interest). It is an advantage of the fibres disclosed by Ferrando et al. that they exhibit flat, near-zero dispersion over a very broad wavelength range (for example dispersion between +1 ps/nm/km and −1 ps/nm/km over more than 50 nm).

It is, however, a disadvantage of the fibres with near-zero, flat dispersion disclosed by Ferrando et al. that the centre-to-centre, Λ, spacing between two nearest air holes surrounding the core is equal to or larger than 2.3 μm—thereby limiting the smallest possible core diameter to around 4.6 μm. The exact, absolute value of the core diameter, naturally, depends on the definition of the core diameter. Unless otherwise stated, we will use the same core diameter definition as used in WO 99/00685, namely a core diameter defined as the distance from a centre of an innermost cladding feature to a centre of another innermost cladding feature, these two innermost cladding features being positioned substantially opposite each other with respect to the core center. For the fibre design used by Ferrando et al. this results in a core diametre equal to two times Λ (hence Ferrando et al. disclose fibres with core diameters larger than 4.6 μm). Alternatively, the core diameter may be defined from a circle connecting centers of the innermost cladding features—this may be relevant in the case of only a few innermost cladding features (such as 3 or 5). This later definition is in agreement with the core definition used in WO 99/00685. For core shapes with a strong deviation away from a circular shape, such as an elliptical or rectangular shape the core diameter should be defined most appropriate with respect to the mode field area, e.g. as the mid-value between lengths of the first and second main axes of the elliptical or rectangular shape.

It is an object of the present invention to provide optical fibers for non-linear applications, where the fibres are characterized by a core diameter smaller than 4 μm as well as near-zero dispersion at near-infrared wavelength. In particular, it is an object to provide optical fibres with a core diameter smaller than 3.5 μm and dispersion that varies less than +/−5 ps/nm/km around zero over a wavelength range from at least 1.45 μm to 1.65 μm.

Glossary and Definitions

In this application we distinguish between "refractive index" and "effective refractive index". The refractive index is the conventional refractive index of a homogeneous material. In this application we consider mainly optical wavelengths in the visible to near-infrared regime (wavelengths from approximately 400 nm to 2 μm). In this wavelength range most relevant materials for fibre production (e.g. silica) may be considered mainly wavelength independent, or at least not strongly wavelength dependent. However, for non-homogeneous materials, such as micro-structures, the effective refractive index is very dependent on the morphology of the material. Furthermore, the effective refractive index of a micro-structure is strongly wavelength dependent—much stronger than the refractive index of any of the materials composing the micro-structure. The procedure of determining the effective refractive index of a given micro-structure at a given wavelength is well-known to those skilled in the art (see e.g. Jouannopoulos et al, "Photonic Crystals", Princeton University Press, 1995 or Broeng et al, Optical Fiber Technology, Vol. 5, pp. 305–330, 1999). The present invention takes advantage of specific micro-structure morphologies and their strong wavelength dependency in a novel manner and discloses fibres where the effective indices of the core and cladding regions are varying with respect to each-other in an untraditional way. Most importantly, there exists for certain fibres, disclosed in this application, specific wavelengths—so-called "shifting" wavelengths—for which the difference between the effective indices of core and cladding regions may change sign. The present inventors utilize this property to realize micro-structured fibres with strong dispersion around the shifting wavelengths.

Usually a numerical method capable of solving Maxwell's equation on full vectorial form is required for accurate determination of the effective refractive indices of micro-structures. The present invention makes use of employing such a method that has been well-documented in the literature (see previous Joannopoulos-reference). In the long-wavelength regime, the effective refractive index is roughly identical to the weighted average of the refractive indices of the constituents of the material. For micro-structures, a directly measurable quantity is the so-called filling fraction that is the volume of disposed features in a micro-structure relative to the total volume of a micro-structure. Of course, for fibres that are invariant in the axial fibre direction, the filling fraction may be determined from direct inspection of the fibre cross-section.

SUMMARY OF THE INVENTION

A problem to be solved by the invention is to be able to guide light in single-mode micro-structured fibres with relatively large mode areas, where either the zero dispersion wavelength is shorter than 1.3 μm or the fibres exhibit a large negative dispersion value around 1.55 μm. Another problem to be solved is to provide in single-mode micro-structured fibres with very small mode areas and a flat, near-zero dispersion at wavelengths around 1.55 μm.

The present invention covers several aspects of fibres with special dispersion properties, namely fibres with a micro-structured core region and a micro-structured cladding region with cladding features being large compared to the wavelength of light guided through the fibres, and further, the invention covers fibres with a so-called raised, inner, micro-structured cladding region.

In certain aspects, the present invention relates to single-mode optical fibres with strong dispersion. A potential application of such fibres is for dispersion compensation or dispersion slope compensation of high bit rate optical communication links. For such applications, non-linear effects are crucial to eliminate, and fibres with relatively large mode field diameters are required.

The present inventors have realised that the prior art fibres with a solid core require small core diameters in order to obtain single-mode operation and large negative dispersion. For modern optical telecommunication systems based on standard transmission fibres with a zero-dispersion wavelength of 1.3 μm, a very important fibre application today is dispersion compensation at wavelengths around at 1.55 μm. However, for high capacity systems that are based on multi-wavelength channels (so-called dense wavelength multiplexed systems D-WDM), the prior art micro-structured fibres cannot be used for dispersion compensation due to their small core diameter. The small core diameter causes a (for this aspect) crucial increase in undesired non-linear effects—such as e.g. four-wave mixing.

The present invention, however, discloses a number of fibre designs allowing realization of very large negative dispersion for large mode area fibres. In particular, for fibre core diameters which are comparable to those of standard optical transmission fibres.

The present inventors have further realized that the use of a depressed cladding—as disclosed in the prior art—is not optimum for realising fibres with large negative dispersion at near-infrared wavelengths. The present inventors have, on the other hand, found that micro-structured fibres can be improved with respect to increasing the dispersion (both to large negative or large positive values) if the fibres have a micro-structured core region and a micro-structured cladding region with cladding features being large compared to the wavelength of light guided through the fibre and/or if the fibre is designed with two cladding regions where the inner cladding region is micro-structured and has an effective refractive index that is larger than the outer cladding region at the operating wavelengths (the inner cladding region should e.g. have a lower filling fraction than the outer cladding region). We shall refer to this type of design as micro-structured fibres with a raised, inner cladding.

The present inventors have further realized that the use of a raised, inner cladding provides the flexibility to obtain fibres with very, small cores and near-zero dispersion over a broad wavelengths range at near-infrared wavelengths. Such fibres are covered by another aspect of the present invention, and are mainly of interest for non-linear applications.

Hence, the present inventors have realized that utilization of a raised, inner cladding is a particularly attractive for manipulating the dispersion properties of micro-structured fibres.

When tailoring the dispersion properties of micro-structured fibres, it is generally desired to have larger features the cladding (usually low-index features in the form of voids or air holes) as this provides larger effective, refractive index contrasts and thereby stronger dispersive effects. It is, therefore, desirable to realize micro-structured fibres with large air holes. The main problem for the fibre designs disclosed in the prior art is, however, that above a certain air hole size, the fibres may become multi-mode. The present invention describes a way of realizing strictly single-mode micro-structured fibres with large air holes, by using micro-structuring of the core region and/or various dopants in the high-index composite of the micro-structured fibre (this being either in the core or in the cladding—or in both).

According to a first aspect of the invention there is provided a micro-structured optical fibre for transmitting at least a predetermined wavelength of light, said optical fibre having an axial direction and a cross section perpendicular to said direction. The fibre comprises a core region that comprises a multiplicity of spaced apart core features that are elongated in the fibre axial direction and disposed in a core material. The presence of the core features cause a micro-structuring of the core region, and the effective refractive index of the core region is noted $N_{co}$. Surrounding the core region is a cladding material that comprises a multiplicity of spaced apart cladding features. These cladding features are elongated in the fibre axial direction and disposed in a first cladding material. The presence of the cladding features cause a micro-structuring of the cladding region, and the effective index of the cladding is noted $N_{cl}$.

The fibre has a plurality of the cladding features that are large compared to the predetermined wavelength of the light guided through the fibre.

The micro-structured fibre according to the first aspect of the invention may be embedded in an article, which e.g. can be used in an optical fibre communication system.

By having a plurality of the cladding features with a large size compared to the wavelength of light guided through the fibre (the features are in at least one cross-sectional direction larger than the predetermined wavelength) and the micro-structured core region, it is possible to obtain the technical advantage of having a fibre with both strongly dispersive waveguiding properties and a large mode area. It is a requirement in order to obtain these characteristics that a plurality of the cladding features are large compared to the predetermined wavelength of the light guided through the fibre, while at the same time the core is micro-structured.

According to an embodiment of the first aspect of the invention the effective index of refraction of the core region, $N_{co}$, may be larger than the effective index of refraction of the cladding region, $N_{cl}$, at said predetermined wavelength of light. This is in order to ensure that the fibre may guide light in a single-mode by internal reflection at the predetermined wavelength.

It should be understood that the first aspect of the invention may cover a relatively large number of combinations or variations of the refractive indices of the core material, the core features, the cladding material, and the cladding features. Thus, the refractive index of one or more of the core features may be lower than the refractive index of the core material. Here, the refractive index of a majority or all of the core features may be lower than the refractive index of the core material. However, it is also within an embodiment of the first aspect of the invention that the refractive index of one or more of the core features is higher than the refractive index of the core material, where the refractive index of a majority or all of the core features may be higher than the refractive index of the core material.

Accordingly, the invention covers embodiments where the refractive index of one or more of the cladding features is lower than the refractive index of the cladding material, where the refractive index of a majority or all of the cladding features may be lower than the refractive index of the cladding material. However, the invention further covers embodiments, where the refractive index of one or more of the cladding features is higher than the refractive index of the cladding material, and the refractive index of a majority or all of the cladding features may be higher than the refractive index of the cladding material.

The fibres disclosed in the present invention are intended for use in a wide range of applications, where the light guided trough the fibre may be in the range from 0.3 $\mu$m to 2 $\mu$m. For use in certain systems, the predetermined wavelength may be very short—typically in the interval from 0.3 $\mu$m to 0.6 $\mu$m. For other applications, the fibre may be desired for delivery of light from laser sources such as III–V semiconductor lasers—with a wavelength range from around 0.6 $\mu$m to 1.2 $\mu$m. Particularly, the wavelength range around 0.8 $\mu$m is of interest for delivery of light from relatively cheap GaAs based semiconductor lasers. For other applications, fibres according to the present invention may be used for applications such as delivery of light from powerful, tuneable Ti:Sapphire lasers. Hence, the fibres may be designed to guide light at wavelengths between 0.78 $\mu$m to 0.98 $\mu$m. For other systems, e.g. systems employing lasers and amplifiers based on rare-earth doping, the fibres may be desired to guide light at specific wavelengths, corresponding to transitions for particular rare-earths. Important transition lines are located around 1.06 $\mu$m and 1.55 $\mu$m. The fibres according to the present invention, may be used for a number of telecommunication applications—e.g for dispersion compensation—where the fibre may be used in the wavelength range from about 1.2 $\mu$m to 1.6 $\mu$m. Particularly, the fibres may find use in the so-called second and third telecommunication window, i.e. for wavelengths around 1.3 $\mu$m and for wavelengths from around 1.5 $\mu$m to 1.6 $\mu$m. For yet other applications, the fibres may find use at mid-infrared wavelengths, such as around 2.0 $\mu$m. The present invention covers preferred embodiments, where the predetermined wavelength is within the above-mentioned wavelength ranges.

In a preferred embodiment, fibres according to the present invention have single-mode operation. This property is important both for applications at short wavelengths—e.g. for lithographic applications—as well as for longer wavelength applications, such as telecommunication applications around 1.55 $\mu$m.

Often, a fibre according to the present invention should also guide light for a range of wavelengths below the predetermined wavelength. This is e.g. the case for wavelength multiplexing systems used in telecommunication systems, where the fibre should be single mode at wavelength in the range from 1.5 $\mu$m to 1.6 $\mu$m. For other applications, such as fibre amplifiers or fibre laser, the fibres are desired to be single-mode at a pump wavelength that may be significantly below the predetermined wavelength. Therefore, preferred embodiments of the present invention covers fibres with single mode operation for wavelength ranges down to 0.3 $\mu$m.

It is for many applications desirable to have fibres according to the present invention to operate by total internal reflection. In a preferred embodiment, the core features are, therefore, smaller in size compared to the cladding features. This may provide a high-index core region within which light can be guided by total internal reflection (this type of guidance is in the literature also referred to as index-guidance or modified total internal reflection). The size is in this respect easily determined from an inspection of the fibre cross-section—the core features should have at least one cross-sectional dimension that is smaller than that of the cladding features. It is preferred that a part of or all of the core features have cross-sectional dimensions perpendicular to said axial direction being smaller than the cross-sectional dimensions of the cladding features.

The present invention includes micro-structured fibres, where the elongated features may be either non-periodically or periodically distributed. Hence, when we are discussing the spacing of elongated elements, we refer to the centre-to-centre distance between two neighbouring features. For periodically distributed features, this centre-to-centre spacing is easily determined, and is e.g. for a close-packed arrangement of the features identical to the pitch of the periodic structure. For non-periodic distributions, the centre-to-centre spacing should be taken as the average centre-to-centre distance between neighbouring features in the relevant region. For special distributions, e.g. in the case of a very low number of features, the centre-to-centre spacing should be taken as the smallest centre-to-centre distance between neighbouring features in the relevant region.

In a preferred embodiment, the core features have a centre-to-centre spacing that is smaller than the predetermined wavelength of light guided through the fibre. This provides a further improvement in order to obtain operation by total internal reflection. In further preferred embodiments, the core feature spacing is smaller than 0.9 times the predetermined wavelength, such as smaller than 0.6 times, such as smaller than 0.4 times, or such small as 0.2 times the predetermined wavelength.

To further ensure an operation based on total internal reflection, it is further preferred to have the core features small compared to the predetermined wavelength. Hence, in a preferred embodiment the core features have a cross-sectional dimension that is smaller than the predetermined wavelength. Thus, a part of or all of the core features may have cross-sectional dimensions perpendicular to said axial direction being smaller than 0.9 times the predetermined wavelength, such as 0.6 times, such as smaller than 0.4 times, or such as smaller than 0.2 times. Preferably, the cross-sectional dimension is as small as 0.2 times the predetermined wavelength.

Since fibres according to the first aspect of the present invention are characterized by relatively large cladding features (a plurality being larger than the predetermined wavelength), the core features may need to have a certain size in order to ensure single mode operation at the predetermined wavelength. In a preferred embodiment the core features have a cross-sectional dimension that is larger than 0.2 $\mu$m.

It is preferred that the core features have a cross-sectional dimension perpendicular to said axial direction being so large that a second-order mode of propagation is shifted to a wavelength of light being shorter or smaller than said predetermined wavelength. In a preferred embodiment, the core features are so large that the second-order mode will only be able to propagate at wavelength shorter than 1.5 $\mu$m, such as smaller than 1.3 $\mu$m, or such as smaller than 1.06 $\mu$m, such as smaller than 0.8 $\mu$m, or such as smaller than 0.6 $\mu$m, such as smaller than 0.4 $\mu$m, such as smaller than 0.3 $\mu$m, or such as smaller than 0.2 $\mu$m. Preferably, the second-order mode cut off is shifted to wavelengths as short as 0.2 $\mu$m. For single-mode fibres, it should be mentioned that the second-order mode cut-off is often simply referred to as the cut-off.

To obtain the above-discussed shifting of the second-order mode cut-off, it is preferred that the core features have a cross-sectional dimension smaller than 2 $\mu$m, such as smaller than 1.3 $\mu$m, such as smaller than 1.06 $\mu$m, such as smaller than 0.8 $\mu$m, or such as smaller than 0.6 $\mu$m, such as smaller than 0.4 $\mu$m, such as smaller than 0.3 $\mu$m, or such as smaller than 0.2 $\mu$m. In a preferred embodiment, the core features have a cross-sectional dimension in the range from 0.2 $\mu$m to 1.8 $\mu$m.

In has already been mentioned that in order to ensure that the fibres according to the present invention are single-mode at the predetermined wavelength when operating by total or almost total internal reflection, the effective refractive index of the core region should be larger than the effective refractive index of the cladding region. Hence, in a preferred embodiment, $N_{co}$ is larger than $N_{cl}$ at the predetermined wavelength.

In order to obtain a strongly dispersive waveguide characteristic, the present inventors have realized how to utilize that the cladding region can be designed to have a higher effective refractive index than the core at wavelengths shorter than the predetermined wavelength (where $N_{co}$ is larger than $N_{cl}$). This provides a cut-off for the fundamental mode in the core region at a so-called shifting wavelength (where $N_{co}$ and $N_{cl}$ are equal), but a very strong dispersion at the (longer) predetermined wavelength.

Therefore, the present invention covers fibres where $N_{cl}$ is larger than $N_{co}$ below a shifting wavelength, this shifting wavelength being shorter than the predetermined wavelength. The present inventors have realized that the dispersion is strongest close to the shifting wavelength, and depending on the application of the fibres, the shifting wavelength may, therefore, be tailored to a specific value. In order to obtain the strong dispersion at particular predetermined wavelengths, the present invention, therefore, covers preferred embodiments, where the shifting wavelength is below 1.5 $\mu$m, where it is below 1.3 $\mu$m, below 1.06 $\mu$m, below 0.8 $\mu$m, below 0.6 $\mu$m, and below 0.4 $\mu$m.

Yet another manner of ensuring operation by total internal reflection, is by having the feature filling fraction of the core region lower than the cladding region. Hence, in a preferred embodiment, the core features in the cross-section occupy in total a ratio $F_c$ of the core region that is smaller than the ratio $F_i$, where $F_i$ is the total ratio that the cladding features occupy of the cladding region.

The present invention also covers fibres that may guide light by PBG (Photonic Band Gap) effects. In this case, the cladding features must be periodically distributed, and the present invention therefore includes preferred embodiments where the cladding features are periodical features. The cladding features may e.g. be arranged in a close-packed arrangement, which provides intrinsically the largest feature filling fraction. A long range of other arrangements may, however, also be of interest for specific applications.

To provide fibres according to the present invention that are operating solely by PBG effects it is preferred that the core region has a lower effective refractive index than the cladding region. Thus, in order to operate in the PBG mode, the effective index of refraction of the core region, $N_{co}$, should be lower than the effective index of refraction of the cladding region, $N_{cl}$, at said predetermined wavelength of light.

Hence, in a preferred embodiment, the core features may have cross-sectional dimensions perpendicular to said axial direction being larger than the cross-sectional dimensions of the cladding features. The larger core features or holes may provide a low-index core region—meaning that the effective refractive index of the core region may be lower than the effective refractive index of the cladding region—within which light may be guided by PBG effect for certain wavelength ranges. For a specific fibre, these wavelength ranges may be tailored by choice of cladding feature arrangement, adjustment of cladding features size(s), core feature arrangement and/or core feature size(s). Such fibres may be advantageous not only in order to realize fibre with the previously described dispersive properties, but additionally to be able to guide a high fraction of light in the core features. In the case of air or vacuum filled features such fibres may, therefore, further be characterized by low material losses.

Another manner of ensuring operation solely by PBG effects is by having the feature filling fraction of the core region higher than the cladding region. Hence, in a preferred embodiment, the core features in the cross-section occupy in total a ratio $F_c$ of the core region that is larger than the ratio $F_i$, where $F_i$ is the total ratio that the cladding features occupy of the cladding region.

In order to fabricate micro-structured fibres with a highly regular feature arrangement, it is preferred to have the centre-to-centre spacing between core features equal to the centre-to-centre spacing of cladding features. Hence, the present invention covers preferred embodiments with a substantially identical feature spacing relation for the core and cladding regions. Due to structural uniformities during fabrication, the spacing may, however, in practice have smaller variations, even in the case where an identical spacing is sought.

In yet another preferred embodiment, the core feature spacing is smaller than the cladding feature spacing. The main advantage of this is the achievement of a higher flexibility when tailoring the mode-shape of light guided through the fibre. By using core features that are smaller than the cladding features, it is possible to increase the number of core features and thereby to provide a better mode shaping. For most applications, it is desired to have a mode-shape that is as close as possible to a gaussian shape, in order to reduce coupling losses at e.g. splicing to standard fibres.

To provide the largest flexibility for mode-shaping, it is preferred that the number of core features is larger than two. To further increase the mode-shaping flexibility, it is preferred that the number of core features is larger than 5, and even further preferable that the number of core features is larger than 17.

The fabrication method most commonly used for the fabrication of micro-structured fibre, would for the realization of fibres according to the present invention favour the use of specific numbers of core features (when these have a size smaller than the cladding features—preferably a cladding feature spacing of three times or of the square-root of three times the core feature spacing). Therefore, in a preferred embodiment, the number of core features is equal to 7, or is equal to 13 or is equal to 19.

In yet another preferred embodiment, the core material (the background material of the core region) has a lower refractive index than the cladding material. This allows a further flexibility of tailoring the dispersive properties of fibres guiding by either of the two types of waveguidance (total internal reflection, PBG effects or both). For example, it is possible to provide further control of the above-mentioned shifting wavelength by the use of a core material having a lower refractive index compared to the cladding material. This refractive index difference may be obtained e.g. by using different dopants in the two materials (e.g. silica doped to various degrees), or it may be obtained simply by using different basis materials (e.g. different types of polymers).

In yet another preferred embodiment the refractive index of the core and cladding materials are identical or substantially equal. This may e.g. be preferred in cases where fibre losses are a critical issue, and the fibre must be fabricated from the purest possible material. In this case it is preferred to use the same (pure) material for the core and cladding material. Also with respect to fabrication method, it may be an advantage to use the same core and cladding material (and therefore the same refractive index of the core and cladding material). This is e.g. the case where a difference in thermal expansion coefficient for the core and cladding materials cannot be tolerated. The presently used fabrication methods for micro-structured fibres are generally not in favour of the use of different core and cladding materials. Hence, fibres with the same core and cladding material are preferred.

It should, however, be understood that the present invention also covers embodiments in which the refractive index of the core material is higher than the refractive index of the cladding material.

In order to obtain the strongest possible dispersive properties of the fibres according to the present invention, it is preferred that a high fraction of the cladding features have a cross-sectional dimension that is larger than the predetermined wavelength. Hence, preferred embodiments covers fibres, where more than 20% of the cladding features are larger than the predetermined wavelength, such as more than 40%, more than 60%, or more than 80% or all of the cladding features are larger.

In a preferred embodiment, the core has a diameter larger than 2 μm. Generally, for telecom applications a core size in the range from about 2 μm to 10 μm is desired. For high-power applications, a larger core size is desired such as from about 10 μm to 50 μm.

In order to obtain the strongest possible dispersive effects in fibres according to the present invention, it is preferred to have the cladding feature size as large as possible. Hence, in a further preferred embodiment, the cladding features should have a diameter that is larger than 0.45 times the cladding feature spacing, such as a diameter larger than 0.6 times the cladding feature spacing, such as larger than 0.9 times the cladding feature spacing. Also it is preferred that cladding features occupy at least 25% of the cross-section of the cladding region, such as more than 40%, such as more than 50%, such as more than 60%, such as more than 70%, such as more than 80%.

It is further preferred that in order to guide light in a single mode with strong dispersion, that the core features occupy more than 5% of the cross-section of the core region, such as more than 10%, such as more than 25%, such as more than 50%, such as more than 75%.

In a further preferred embodiment the core features are periodical core features. This allows the simplest manner for fabrication of fibres with a micro-structured core region.

In a further preferred embodiment the spacing of the core features and of the cladding features are in the range of about 0.2 μm to 10 μm.

Commonly it is preferred to realise the fibres with core material and/or the cladding material being silica.

The core features and/or the cladding features may be rods or voids or combinations of rods and voids. Thus, one or more, a majority or all of the core features may be rods. It is also within embodiments of the invention that one or more, a majority or all of the cladding features are rods. Here, some or all of the rods of the core features and/or the cladding features may be made of silica, wherein one or more of the silica core features and/or cladding features may be doped with one or more materials selected from a list comprising: Ge, Al, F, Er, Yb, Nd, La. However, the invention also covers embodiments wherein one or more, a majority or all of the core features are voids. Similarly, one or more, a majority or all of the cladding features may be voids.

When some of the core features and/or the cladding features are voids, these voids may, depending on the specific application of the fibre, contain air, another gas, or a vacuum. Alternatively, when any of the core features and/or the cladding features are voids, such voids may contain polymer(s), a material providing an increased third-order non-linearity, a photo-sensitive material, or a rare earth material. In a second aspect of the invention there is provided an article (e.g. an optical fibre communication system) that comprises a micro-structured optical fibre for guiding light at an operating wavelength, said optical fibre having an axial direction and a cross section perpendicular to said axial direction, the optical fibre comprising: a core region having an effective refractive index $N_{co}$ and being surrounded by a cladding region comprising a multiplicity of spaced apart cladding features being elongated in the axial direction and disposed in a first cladding material, the cladding features having a refractive index that differs from a refractive index of the first cladding material, the cladding region further comprising an inner cladding region surrounding the core region and an outer cladding region surrounding the inner cladding region where the inner and outer cladding regions have effective refractive indices $N_i$, and $N_o$, respectively, with $N_i > N_o$ at the operating wavelength.

It should be understood that the article of the second aspect of the invention may be an optical fibre communicating system or a part of an optical fibre communicating system such as the micro-structured optical fibre itself.

In an embodiment of the second aspect of the invention, the inner cladding region comprises the first cladding material and the cladding features disposed therein, the first cladding material thereby constituting an inner cladding material and the cladding features disposed in the first cladding material constituting a multiplicity of spaced apart inner cladding features. It is further preferred that the outer cladding region comprises a multiplicity of spaced apart outer cladding features being elongated in the axial direction and disposed in an outer cladding material, the outer cladding features having a refractive index that differs from a refractive index of the outer cladding material.

In a preferred embodiment of the second aspect of the invention there is provided an article comprising a micro-structured optical fibre for guiding light at an operating wavelength, said optical fibre having an axial direction and a cross section perpendicular to said axial direction, the optical fibre comprising a core region surrounded by an inner cladding region that comprises a multiplicity of spaced apart inner cladding features that are elongated in the axial direction and disposed in an inner cladding material, the inner cladding region being surrounded by an outer cladding region that comprises a multiplicity of spaced apart outer cladding features that are elongated in the axial direction and disposed in an outer material, the inner cladding features having a refractive index that differs from a refractive index of the inner cladding material and the inner cladding region having an effective refractive index $N_i$, and the outer cladding features having a refractive index that differs from a refractive index of the outer cladding material and the outer cladding region having an effective refractive index $N_o$, wherein $N_i$ is larger than $N_o$ at the operating wavelength.

It has already been mentioned that for a micro-structure fibre, such as a fibre having a cladding region with cladding features, the effective refractive index may be strongly wavelength dependent. Thus, for embodiments of the second aspect of the invention having cladding features in the cladding regions, and wherein the core region has an effective refractive index $N_{co}$, it is preferred that optical fibre is dimensioned so that the difference between $N_{co}$ and $N_i$ is a function of the wavelength of the guided light, and so that the effective index of the core region $N_{co}$ is substantially equal to the effective index of the inner cladding region $N_i$ at a wavelength referred to as the shifting wavelength, and wherein $N_i$ is larger than No for operating wavelengths equal to or below said shifting wavelength.

In one embodiment, the optical fibre may be dimensioned so that $N_{co}$ is larger than $N_i$ for wavelengths or at least a range of wavelengths longer than the shifting wavelength, and $N_{co}$ is lower than $N_i$ for wavelengths or at least a range of wavelengths shorter than the shifting wavelength. In another embodiment, the optical fibre may be dimensioned so that $N_{co}$ is lower than $N_i$ for wavelengths or at least a range of wavelengths longer than the shifting wavelength, and $N_{co}$ is higher than $N_i$ for wavelengths or at least a range of wavelengths shorter than the shifting wavelength. The second aspect of the invention also covers embodiments wherein $N_i$ is larger than $N_o$ for a range of wavelengths above the shifting wavelengths.

It should be understood that the second aspect of invention covers embodiments wherein the core region is a substantially solid core made of a core material and having an effective refractive index $N_{co}$ being substantially equal to the refractive index of the core material. However, the second aspect of invention also covers embodiments, wherein the core region comprises a multitude of spaced apart core features being elongated in the axial direction and disposed in a core material.

In an embodiment of the second aspect of the invention the inner cladding features or at least part of the inner cladding features may have a cross-sectional dimension that is smaller than a cross-sectional dimension of the outer cladding features. This provides a relatively easy design to allow realisation of raised cladding micro-structured fibres. Typically the features are substantially circular, thus the cross-sectional dimension may be equal to the feature diameter.

In a preferred embodiment, the refractive index of the core material is lower than the refractive index of the inner cladding region material. This allows a simple design for a fibre exhibiting a shifting wavelength.

It is also within a preferred embodiment that the centre-to-centre spacing between inner and outer cladding features is substantially identical in the meaning that the centre-to-centre spacing between two nearest inner cladding features is substantially identical to the centre-to-centre spacing between two nearest outer cladding features. The advantages of this embodiment are similar to those described in the first aspect of the invention.

According to an embodiment of the second aspect of the invention, the filling fraction of inner cladding features in the inner cladding region is smaller than the filling fraction of outer cladding features in the outer cladding region.

Thus, the inner cladding features may in the cross-section occupy in total a ratio, $F_i$, of the inner cladding region and the outer cladding features may in the cross-section occupy in total a ration, $F_o$, of the outer cladding region, with $F_i$ being smaller than $F_o$. This provides a simple manner of obtaining a raised inner cladding.

It should be understood that the characteristics of a micro-structured fibre according to the second aspect of the invention may be obtained by a relatively large number of different fibre designs. Thus, the second aspect of the invention may also cover embodiments, wherein all or at least part of the inner cladding features have a cross-sectional dimension being substantially identical to a cross-sectional dimension of all or at least part of the outer cladding features. Here, it is preferred that the centre-to-centre spacing between inner cladding features is larger than the centre-to-centre spacing between outer cladding features.

According to an embodiment of the invention, the number of inner cladding features may be lower than 6, such as equal to 4, such as equal to 3, such as equal to 2.

It is also within embodiments of the second aspect of the invention that the refractive index of the inner cladding material is substantially identical to or larger than the refractive index of the outer cladding material.

In a preferred embodiment, the refractive index of the inner cladding material is larger than the refractive index of the outer cladding material and the inner cladding features in the cross-section occupy an area, $F_i$, of the inner cladding region and the outer cladding features in the cross-section occupy an area, $F_o$, of the outer cladding region, and $F_i$ is equal to or larger than $F_o$. In this preferred embodiment, the higher refractive index of the inner cladding material allows the use of larger inner cladding features, while the fibre maintains the relation $N_i > N_o$.

According to an embodiment of the invention, the refractive index of one or more of the inner cladding features may be higher than the refractive index of the inner cladding material. This may also help in obtaining a raised inner cladding region. Here, the refractive index of a majority or all of the inner cladding features may be higher than the refractive index of the inner cladding material.

However, it is also within embodiments of the invention that the refractive index of one or more of the inner cladding features is lower than the refractive index of the inner cladding material. Here, the refractive index of a majority or all of the inner cladding features may be lower than the refractive index of the inner cladding material.

The second aspect of the present invention also covers an embodiment in which the outer cladding region comprises the first cladding material and the cladding features disposed therein, the first cladding material thereby constituting an outer cladding material and the cladding features disposed in the first cladding material constituting a multiplicity of spaced apart outer cladding features. Here, the core region may comprise a multitude of spaced apart core features being elongated in the axial direction and disposed in a core material. In one embodiment the refractive index of the core features is larger than the refractive index of the inner cladding material, and the refractive index of the core material is lower than the refractive index of the inner cladding material. However, in an alternative embodiment, the refractive index of the core features may be lower than the refractive index of the inner cladding material, and the refractive index of the core material may be larger than the refractive index of the inner cladding material. According to an embodiment, the inner cladding region may here comprise an inner cladding material with the refractive index of said inner cladding material being larger than the refractive index of the outer cladding features. Preferably, the refractive index of the inner cladding material may be about equal to or larger than the refractive index of the outer cladding material. For fibres according to the second aspect of the invention having an outer cladding region with outer cladding features, the refractive index of one or more, a majority or all of the outer cladding features may be higher than the refractive index of the outer cladding material. However, in a preferred embodiment, the refractive index of one or more, a majority or all of the outer cladding features is lower than the refractive index of the outer cladding material.

For fibres according to the second aspect of the invention having a core region with core features, the refractive index of one or more of the core features may be higher than the refractive index of the core material. However, in a preferred embodiment the refractive index of one or more of the core features is lower than the refractive index of the core material.

In an embodiment of the second aspect of the invention, the refractive index of the core material is substantially identical to the refractive index of the inner cladding region material. The advantages of this embodiment are similar to those described in the first aspect of the invention. In another or further embodiment, the refractive index of the core material is substantially identical to the refractive index of the outer cladding region material. The advantages of this embodiment are similar to those described in the first aspect of the invention.

For embodiments according to the second aspect having core features, the core features may have a diameter that is smaller than the diameter of the inner cladding features. This may ensure operation by total internal reflection. It is also within an embodiment of the invention that the core features have a centre-to-centre spacing being smaller than the centre-to-centre spacing of the inner cladding features. This allows further means for mode shaping.

For fibres according to the second aspect of the invention having outer cladding features, the outer cladding features may occupy more than 30% of the cross-section of the outer cladding region, such as more than 40%, such as more than 50%, such as more than 60%, such as more than 70%, such as more than 80%. This allows stronger dispersion to be exhibited.

In a preferred embodiment of the second aspect of the invention, the inner and/or outer cladding features may be periodically disposed. This may allow operation by PBG effects, as well as it may be of importance for reasons of fabrication, as the one of the most widely used fabrication techniques favours the use of close-packed cladding features—hence, the features may be periodic features. It is also within an embodiment of the invention that the core features are periodical core features. This is advantageous for similar reasons as described in the first aspect of the invention.

In a preferred embodiment of the second aspect of the invention, the core has a diameter larger than 2 µm. A relatively large mode area is vital for the use of fibres in e.g. multi-wavelength dispersion compensation schemes. The advantages of this preferred embodiment are similar to those described in the first aspect of the invention. Here, the core diameter may be in the interval from 2 µm to 10 µm, such as in the interval from 4 µm to 6 µm. The advantages of having core diameters within these ranges are to provide fibres for high power applications, for lowering/elimination of non-linear effects, and/or for low coupling losses to standard transmission fibres.

For fibres according to the second aspect of the invention, the inner and/or outer cladding features may have a spacing in the range of about 0.1 to 10 times the wavelength of any light guided through the fibre, such as in the range of about 0.5 to 1, such as in the range of about 1 to 2, such as in the range of about 2 to 5, such as in the range of about 5 to 10. The potential of dimensioning the cladding features within the above-described ranges provides a high flexibility when tailoring the dispersion properties for specific applications. It is important that strong dispersion may well be obtained for small cladding features. This is attributed to the fact that a raised inner cladding region may well be obtained even for small cladding features—hence, providing a shifting wavelength.

In a preferred embodiment of the second aspect of the invention, the core features may have a spacing in the range of about 0.1 to 10 times the wavelength of any light guided through the fibre, such as in the range of about 0.5 to 1, such as in the range of about 1 to 2, such as in the range of about 2 to 5, such as in the range of about 5 to 10. As for the above-described embodiment, this embodiment ensures a large flexibility of the present invention with respect to specific applications. The second aspect of the present invention also covers embodiments where the core features have a spacing in the range of about 0.1 μm to 10 μm, such as in the range of about 0.5 μm to 1 μm, such as in the range of about 1 μm to 2 μm, such as in the range of about 2 μm to 5 μm, such as in the range of about 5 μm to 10 μm. Again this embodiment ensures a large flexibility of the present invention with respect to specific applications.

For the fibres according to the second aspect of the invention, any of the core features and/or any of the inner or the outer cladding features may be voids. The advantages of this preferred embodiment are similar to those described in the first aspect of the invention. Thus, one or more, a majority or all of the core features may be voids and/or one or more, a majority or all of the inner cladding features may be voids. It is also within the second aspect of the invention that one or more, a majority or all of the outer cladding features are voids. Here, one or more of the core features and/or the cladding features may be voids containing air, another gas, or a vacuum.

However, it is also within the second aspect of the fibres that any of the core features and/or any of the inner or the outer cladding features may be rods. Thus, one or more, a majority or all of the core features may be rods and/or one or more, a majority or all of the inner cladding features may be rods. It is also within the second aspect of the invention that one or more, a majority or all of the outer cladding features may be rods.

Similar to embodiments of the first aspect of the invention, the second aspect of the invention also covers embodiments where one or more of the core features and/or the cladding features are voids containing polymer(s), a material providing an increased third-order non-linearity, a photo-sensitive material, or a rare earth material. Such embodiments allow the realization of various applications, such as fibre laser, amplifiers, wavelength converters, optical switches etc.

According to the present invention the fibres of both the first and the second aspect of the invention may be designed for guiding light with wavelength(s) in the range from about 0.3 μm to 15 μm, such as from about 0.5 μm to 1.6 μm, such as from about 1.0 μm to 2.0 μm, such as from about 2 μm to 5 μm, such as from about 5 μm to 15 μm. The fibres in this application will mainly be of interest for applications where light in various wavelength ranges between 0.3 μm and 2 μm, as discussed in the first aspect of this invention. Due to the fact that a significant fraction of the light may in fact be guided in the core features—and these may e.g. contain air or vacuum—the fibres presented in this application may well find use for guidance of light at wavelengths that are presently unattainable using conventional optical fibres. Hence, the fibres presented in this application may be utilized for guidance of light at both mid-infrared wavelengths—the wavelength ranges from around 2 μm to 5 μm—as well as for mid- to far-infrared wavelengths—such as the wavelength range from around 5 μm to 15 μm.

For a range of applications, such as e.g. dispersion compensation in D-WDM systems, it is preferred that the fibres according to the present invention are designed for guiding light at several predetermined wavelengths.

The present invention further relates to a third aspect, according to which there is provided an article comprising a micro-structured optical fibre for guiding light at an operating wavelength, said optical fibre having an axial direction and a cross section perpendicular to said axial direction, the optical fibre comprising: a core region having an effective refractive index $N_{co}$ and being surrounded by an inner cladding region that comprises a multiplicity of spaced apart inner cladding features that are elongated in the axial direction and disposed in an inner cladding material, the inner cladding region being surrounded by an outer cladding region, the inner cladding features having a refractive index that differs from a refractive index of the inner cladding material, the inner cladding region having an effective refractive index $N_i$ and the outer cladding region having an effective refractive index $N_o$, wherein $N_i$ is larger than $N_o$ at the operating wavelength, and wherein the core region is a substantially solid core made of a core material, said core region having an effective refractive index $N_{co}$ being larger than $N_i$ at the operating wavelength. It is preferred that the outer cladding region comprises a multiplicity of spaced apart outer cladding features being elongated in the axial direction and disposed in an outer cladding material, with the outer cladding features having a refractive index that differs from a refractive index of the outer cladding material.

It should be understood that the article according to any embodiment of the third aspect of the invention may be an optical fibre communicating system or a part of an optical fibre communicating system such as the micro-structured optical fibre itself.

In a preferred embodiment of the third aspect of the invention there is provided an article comprising a micro-structured optical fibre for guiding light at an operating wavelength, said optical fibre having an axial direction and a cross section perpendicular to said axial direction, the optical fibre comprising a core region having an effective refractive index $N_{co}$ and being surrounded by an inner cladding region that comprises a multiplicity of spaced apart inner cladding features that are elongated in the axial direction and disposed in an inner cladding material, the inner cladding region being surrounded by an outer cladding region that comprises a multiplicity of spaced apart outer cladding features that are elongated in the axial direction and disposed in an outer material, the inner cladding features having a refractive index that differs from a refractive index of the inner cladding material and the inner cladding region having an effective refractive index $N_i$, and the outer cladding features having a refractive index that differs from a refractive index of the outer cladding material and the outer cladding region having an effective refractive index $N_o$, wherein:

$N_i$ is larger than $N_o$ at the operating wavelength, the core region is a substantially solid core with a core diameter around or below 4 μm and with an effective refractive index $N_{co}$ being larger than $N_i$ at the operating wavelength, the centre to centre spacing or pitch of the inner cladding features, $\Lambda_i$, is around or below 2 μm, the inner cladding features have a diameter or cross sectional dimension, $d_i$, fulfilling the requirement that $d_i/\Lambda_i$ is equal to or below 0.7 and equal to or above 0.2, the centre to centre spacing or pitch of the outer cladding features, $\Lambda_o$, is around or below 2 μm, and the outer cladding features have a diameter or cross sectional dimension, $d_o$, fulfilling the requirement that $d_o/\Lambda_o$ is equal to or above 0.4. The micro-structured fibre exhibits non-linear optical effects at wavelengths around 1.5 μm, such as in the wavelength range from 1.4 μm to 1.6 μm.

For the third aspect of the invention it is preferred that $N_{co}$ is larger than $N_i$ for all wavelengths of optical radiation which can be guided by the micro-structured fibre. It is also preferred that the effective refractive index difference between the core region and the inner cladding region is greater than about 5%.

According to a preferred embodiment of the third aspect of the invention, the core region and the inner cladding region are mutually adapted so that the micro-structured fibre exhibits a substantially zero dispersion or near-zero dispersion wavelength within the range of 1.2 μm to 1.8 μm, such as within the range of 1.48 μm to 1.62 μm, such as within the range of 1.52 μm to 1.58 μm. It is also within a preferred embodiment that the centre to centre spacing or pitch of the inner cladding features, $\Lambda_i$, is around or below 2 μm, such as around or below 1.5 μm, such as around 1.4 μm, or in the range of 1 μm to 2 μm, such as in the range of 1 μm to 1.5 μm.

It is also in accordance with the third aspect of the invention that the number of inner cladding features is higher than or equal to 6. Here, the inner cladding features may have a diameter or cross sectional dimension, $d_i$, and a centre to centre spacing or pitch, $\Lambda_i$, fulfilling the requirement that $d_i/\Lambda_i$ is in the range from 0.2 to 0.4, such as about 0.3. The third aspect also covers embodiments wherein the centre to centre spacing or pitch of the outer cladding features, $\Lambda_o$, is substantially equal to the centre to centre spacing or pitch of the inner cladding features, $\Lambda_i$.

In a preferred embodiment of the third aspect of the invention, all or at least part of the inner cladding features have a diameter or cross-sectional dimension being substantially identical to a diameter or cross-sectional dimension of all or at least part of the outer cladding features. The number of inner cladding features may be lower than 6, such as equal to 4, such as equal to 3, such as equal to 2, Here, it is preferred that the centre to centre spacing between inner cladding features $\Lambda_i$ may be larger than the centre to centre spacing between outer cladding features $\Lambda_o$. Furthermore, the inner cladding features may have a diameter or cross sectional dimension, $d_i$, and a centre to centre spacing or pitch, $\Lambda_i$, fulfilling the requirement that $d_i/\Lambda_i$ is in the range from 0.25 to 0.5, in the range from 0.28 to 0.57, or in the range from 0.35 to 0.7. It is further preferred that the outer cladding features are arranged in concentric manners forming concentric annular regions surrounding the core. Preferably the number of concentric rings of cladding features is two or larger than two, such as three, four or five or more rings. The separation between rings may be identical for all rings or the separation between rings may be varying in different manners in order to further tailor the waveguiding properties of the fibres. In a preferred embodiment, the separation between rings is decreasing. In another preferred embodiment, the separation between rings is increasing.

It is preferred that the centre to centre spacing or pitch of the outer cladding features, $\Lambda_o$, is around or below 2 μm, such as around or below 1.5 μm, such as around 1.4 μm, or in the range of 1 μm to 2 μm, such as in the range of 1 μm to 1.5 μm. The outer cladding features may preferably have a diameter or cross sectional dimension, $d_o$, fulfilling the requirement that $d_o/\Lambda_o$ is equal to or below 0.7 and equal to or above 0.4, such as about 0.5 or such as about 0.6.

For embodiments according to the third aspect of the invention, it is preferred that the core has a diameter around or below 4 μm, such as around or below 3.6 μm, such as around or below 2 μm, such as around or below 1.5 μm. It is also within an embodiment of the invention that the refractive index of the core region is varying along the diameter of the core region so that an inner and/or a central portion of the core has a higher refractive index than an outer portion of the core. The inner and/or central portion of the core may have a higher refractive index than the refractive index of the inner cladding material and/or the outer cladding material. In a preferred embodiment, the inner and/or central portion of the core may comprise one or more rods having a higher refractive index than the background index of the core or the outer portion of the core.

The third aspect of the invention also covers embodiments having different relations between the refractive indices of the core region and the inner and/or outer cladding regions. In one embodiment, at least part of the core region has a refractive index being substantially identical to the refractive index of the inner and/or outer cladding region material. In another embodiment, at least part of the core region has a refractive index being larger than the refractive index of the inner and/or outer cladding region material. In yet another embodiment, at least part of the core region has a lower refractive index than the refractive index of the inner cladding material and/or the outer cladding material It is preferred that the inner cladding features are voids and/or rods having a lower refractive index than the inner cladding material. It is also preferred that the outer cladding features are voids and/or rods having a lower refractive index than the outer cladding material. For embodiments having cladding features being voids, such cladding features may be voids containing air, another gas, or a vacuum. The cladding feature may also or alternatively be voids containing polymer(s), a material providing an increased third-order non-linearity, a photo-sensitive material, or a rare earth material.

According to an embodiment of the third aspect of the invention, all or at least part of the inner cladding features may have a cross-sectional dimension being smaller than a cross-sectional dimension of the outer cladding features. It is also within an embodiment of the invention that the refractive index of the inner cladding material is substantially identical to the refractive index of the outer cladding material.

The third aspect of the invention also covers embodiments where the inner cladding features in the cross-section occupy in total a ratio, $F_i$, of the inner cladding region, and the outer cladding features in the cross-section occupy in total a ration, $F_o$, of the outer cladding region, and $F_i$ is smaller than $F_o$.

It should be understood that the different materials may be selected as background material for the core region and/or the cladding regions for the fibres of the different aspects of the present invention. Thus, the core region and/or the cladding regions may comprise silica.

It also within embodiments of the aspects of the invention that the core and/or any of the cladding materials contains polymer(s), comprise a dopant (e.g. an active or photosensitive material) or a material showing higher order (non-linear) optical effects. Thus, the core region and/or any of the cladding regions may comprise materials providing an increased third-order non-linearity, materials that are photo-sensitive material(s), or are rare earth material(s).

The use of polymer(s) as background material for the fibres allows potentially cheap and very flexible fabrication of the fibres covered by the present invention.

The use of the above mentioned materials for the core and/or cladding regions allows the realization of various applications, such as fibre laser, amplifiers, wavelength converters, optical switches etc. Higher order (non-linear) effects may be used for e.g., soliton communication or more generally in applications, where non-linear effects are influencing the propagation properties of signals in optical communication systems. This also includes realisation of components for optical signal processing and for switching. Especially for applications for fibre lasers or fibre amplifiers, the dopant in the core or the cladding may be e.g., a rare-earth dopant adapted to receive pump radiation and amplify radiation travelling in the core region. The dopant may also be a light sensitive dopant, such as Germanium. In that situation, the dopant may be used for e.g. optically writing a grating in the fibre or core region. Of particular interest is the use of photosensitive materials to allow writing of 1D gratings in the longitudinal direction of the fibres. Fibres with such gratings, combined with the large mode area, are very attractive for high power fibre lasers.

For a range of applications, it is desirable to control the polarization of light guided through the fibre as well as the dispersion. The present fabrication techniques of micro-structured fibre make it difficult to completely eliminate asymmetries in the fibre cross-section. As those skilled in the art will recognize, this means that the fundamental mode of micro-structured fibres will have two nearly degenerate polarization states. For micro-structured fibres, where polarization effects are sought eliminated (the fibres are intended to have a low birefringence), we will note the two polarization states as substantially non-degenerate. For micro-structured fibres where, on the other hand, polarization effects are desired, the non-degeneracy may be enhanced such that the birefringence can reach levels of $10^{-5}$ and even higher, such as of at least $10^{-3}$. We will note such fibres as having a fundamental mode consisting of two substantially, non-degenerate polarization states. For a long range of applications, such as e.g. for high precision lithographic systems, it is desired to have fibres with high birefringence. Therefore, the different aspects of the present invention cover embodiments with fibres that guide light in two substantially, non-degenerate polarization states. To quantify the splitting of the polarizations states, the invention covers preferred embodiments, where the fibre birefringence is at least $10^{-5}$, such as at least $10^{-4}$, such as at least $10^{-3}$.

The present invention covers embodiments wherein shape of the core region is essentially circular or elliptical, and/or wherein the core region has a substantially two-fold symmetry, which may be obtained from arrangement of the core features in a substantially two-fold symmetric manner. Furthermore, the invention covers embodiments wherein the core region and/or cladding region has substantially 180 degree rotational symmetry in the fibre cross-section.

To control the degree of birefringence, it is preferred to have fibres with a core region having either small or large degree of asymmetry. This may be obtained by a core region, in which the core features have a non-circular symmetric shape in the fibre cross-section. It may also or alternatively be obtained either by positioning of the core features in an asymmetric manner, in an otherwise symmetric core region, or by having an asymmetry in the actual shape of the core region. Naturally, combinations of the afore-mentioned cases may also be employed. By asymmetry is here meant a deviation away from a circular symmetric shape or away from a quadratic, a hexagonal or a symmetric, higher order polynomial shape. The present invention, therefore, covers preferred embodiments with the above-described manners of applying asymmetry to the core region. However, the invention may also cover embodiments in which the shape of the core region is substantially rectangular in the fibre cross-section. Fibres according to the present invention may often have a solid overcladding surrounding the micro-structured cladding and core regions. Typically, this overcladding will consist of silica having a higher refractive index than the micro-structured cladding region in order to strip off cladding modes.

In some of the above-described embodiments, it has been assumed that the core and cladding features have a lower refractive index than the core and cladding material (the background material of these regions). The reason for this is that micro-structured fibres commonly are fabricated such that the cladding features are voids such as air holes, hence the features have a lower refractive index than the surrounding background material. It is, however, important to notice that the inventions and ideas described in this application are also valid and may be utilized in the case of high-index features.

The present invention also covers fibres, where the cladding features are placed in concentric manners, such as in concentric annular regions surrounding the core.

The present invention also covers fibres, where the cladding features are increasing in size with respect to their distance to the centre of the core.

DETAILED DESCRIPTION OF THE INVENTION AND SOME PREFERRED EMBODIMENTS

Figure 1:
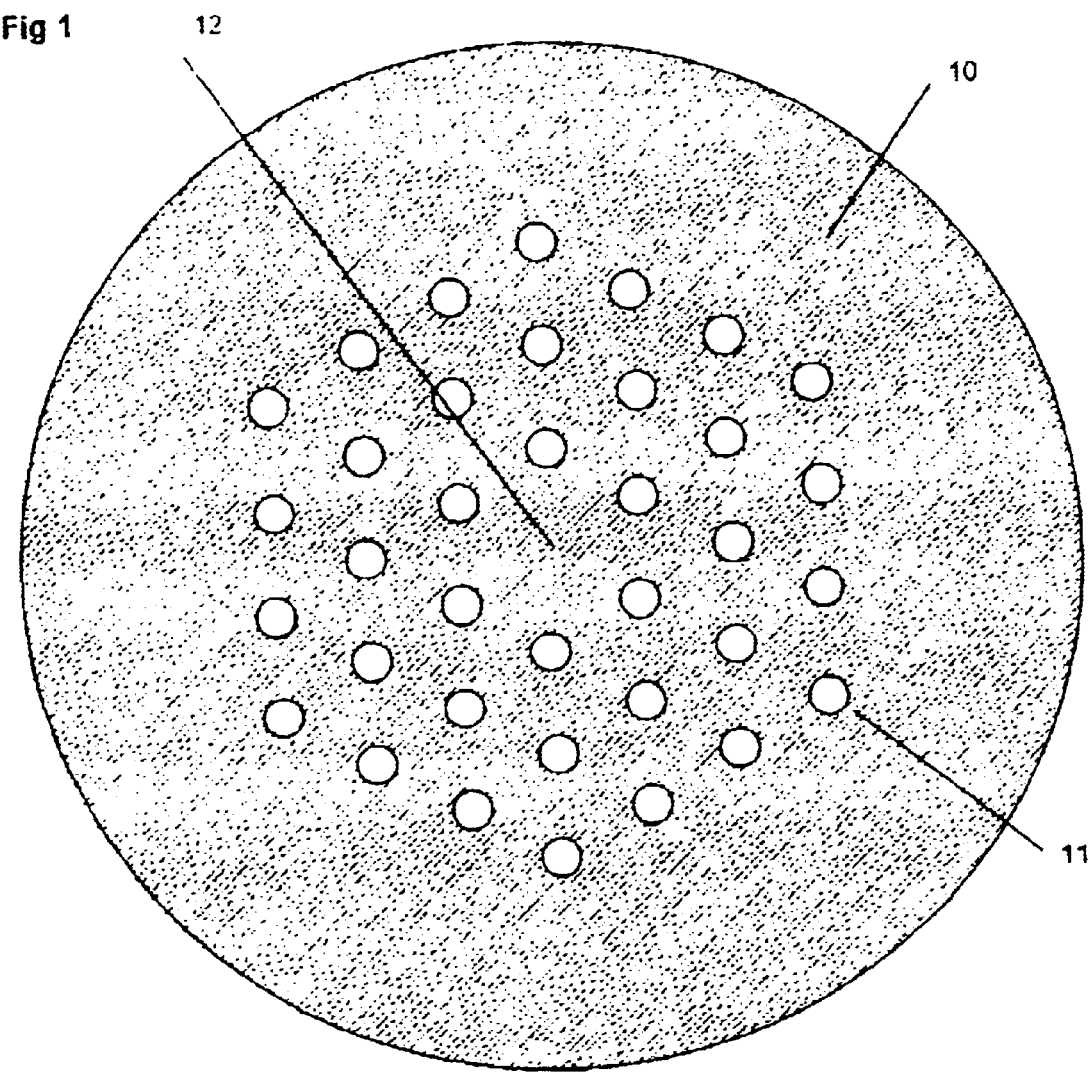
FIG. 1 illustrates schematically the design of a typical micro-structured fibre known from the prior art.
Figure 2:
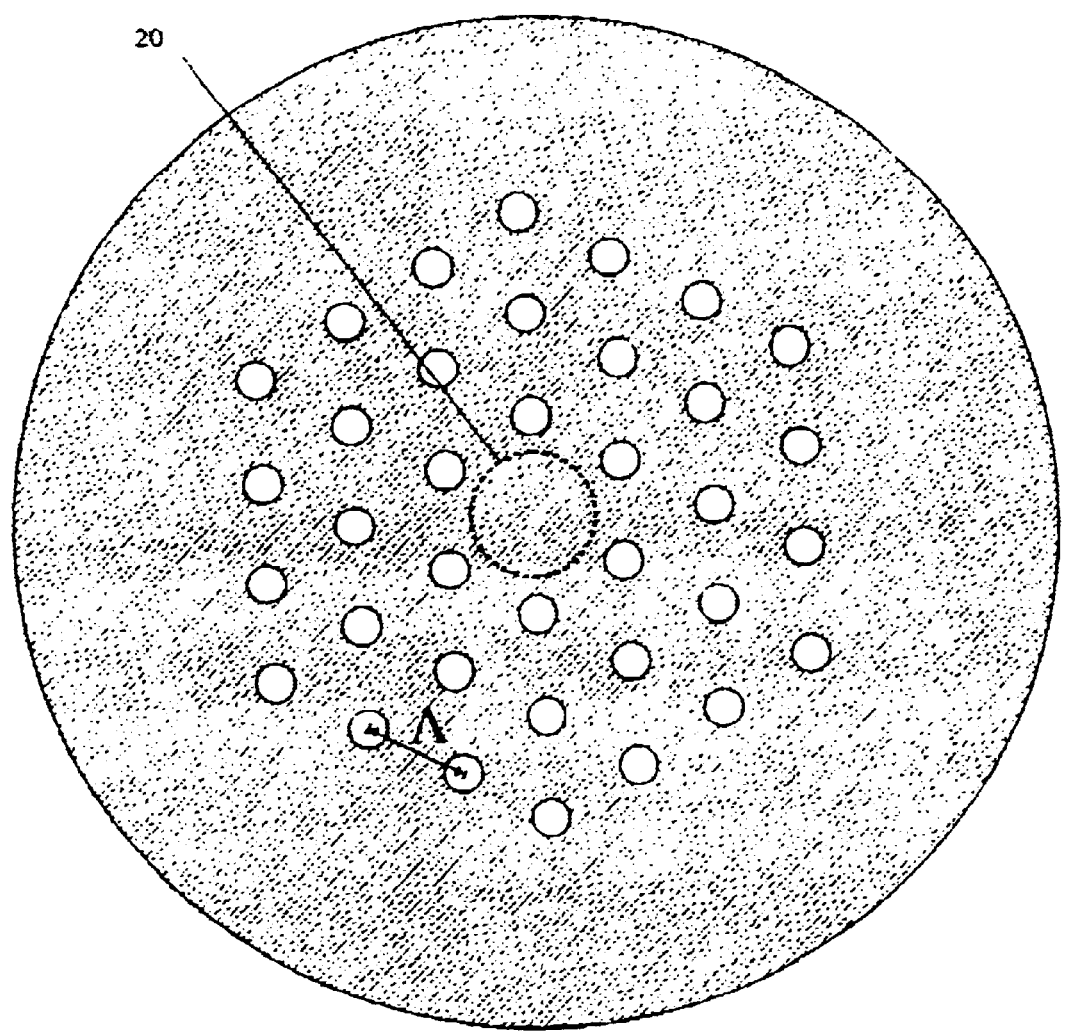
FIG. 2 illustrates the core region of the fibre in FIG. 1.

A typical micro-structured fibre known from the prior art is illustrated schematically in FIG. 1. The figure shows a cross-section of the fibre. The fibre consists of a background material (10) and it is invariant in the longitudinal direction (the direction perpendicular to the illustrated cross-section) and it has a cladding region characterized by an array of features (11) running along the fibre axis. In the prior art, the most commonly used background material is silica and the features are most commonly air holes. The holes are in this case arranged periodically (in a so-called close-packed or triangular arrangement), but the holes may also be non-periodically or randomly distributed (see e.g. Monro-reference). In the centre of the fibre (12) a single hole has been left out in order to form a high-index core region. In FIG. 2, the core region is schematically illustrated (20) along with the centre-to-centre distance between two nearest air holes, Λ. In the case of micro-structured fibres with periodically arranged holes, these form in the cross-section a two-dimensionally periodic lattice with a lattice constant equal to Λ.

Figure 3:
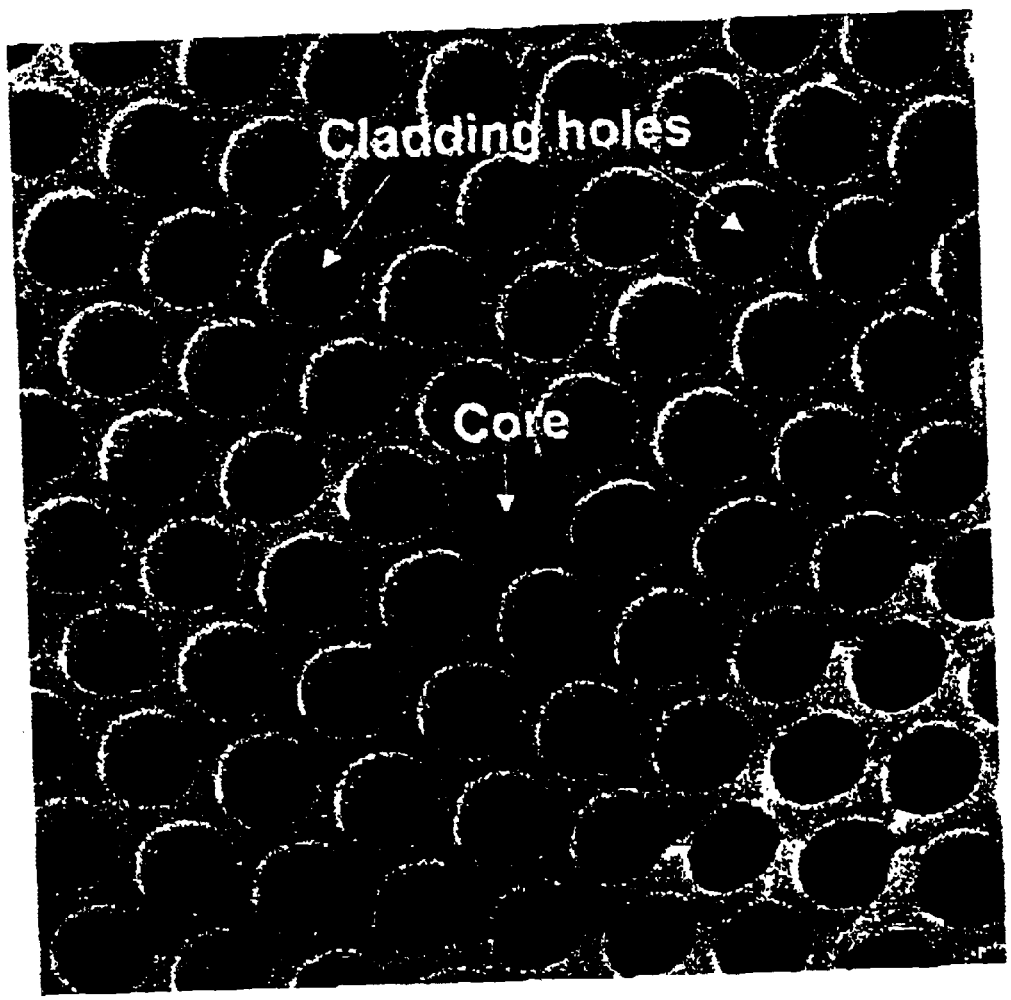
FIG. 3 shows a scanning electron micrograph of a real, micro-structured fibre with a design known from the prior art.
Figure 4:
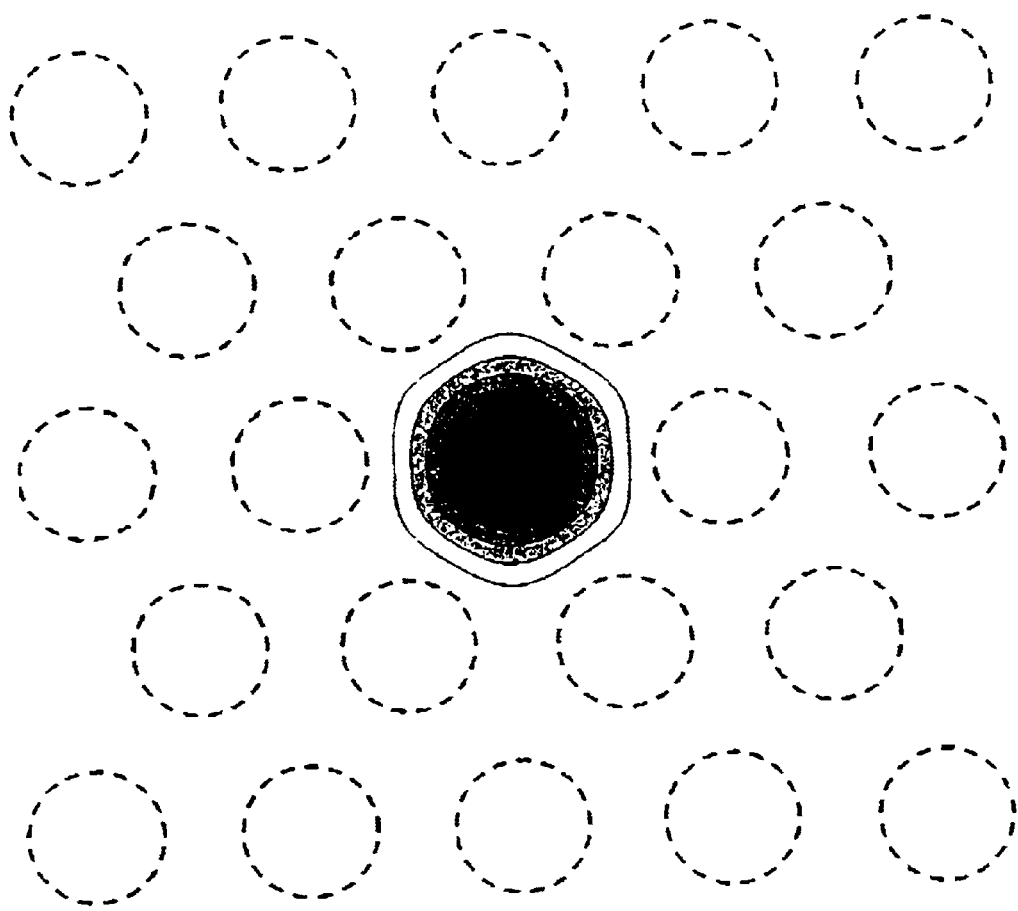
FIG. 4 shows the mode field distribution of the fundamental mode of a micro-structured fibre.

Micro-structured fibres are commonly fabricated using a relatively simple procedure, where an array of silica rods and tubes are stacked by hand to form a preform, that may be drawn into fibre using a conventional tower setup. Various lattice structures may be realized using this technique by positioning rods and tubes during the stacking process in a close-packed arrangement. Such preforms are readily drawn to dimensions, where centre-to-centre spacing between two nearest air holes may be less than 2.0 µm, while preserving the initial air hole lattice in the cross-section of the fibres. FIG. 3 shows an example of a final micro-structured fibre—with a regular air hole arrangement—that has been realized using a so-called stack-and-draw process. The fibre in FIG. 3 has air holes arranged in a triangular lattice, and a high-index core is formed by the omission of a single air hole. Light may be guided efficiently in the core region of micro-structured fibres, and an example of the fundamental mode that is guided in micro-structured fibre known from the prior art is illustrated in FIG. 4.

Figure 5:
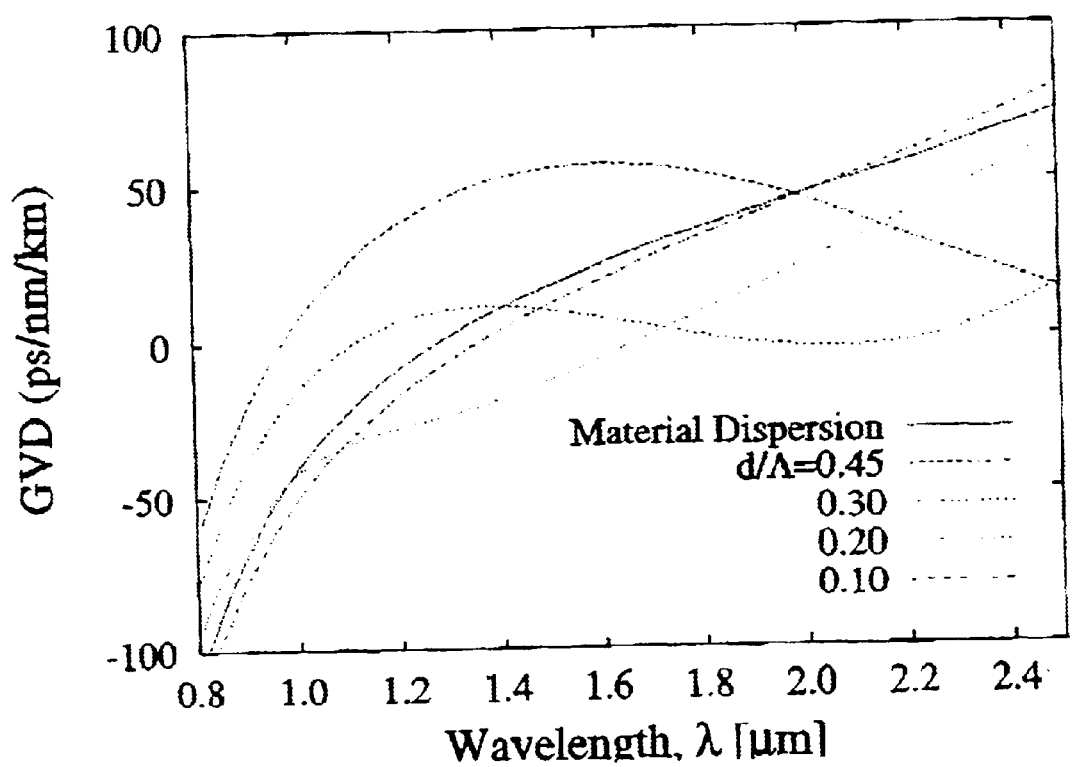
FIG. 5 shows the dispersion properties of micro-structured fibres with relatively small cladding air holes.

FIG. 5 shows the dispersion properties at near-infrared wavelengths of a series of typical micro-structured fibres known from the prior art. The fibres have all a design as shown in FIG. 1, but the cladding air holes are varied from d/Λ=0.10 to 0.45. The simulation of the fibres is for a fixed Λ value of 2.3 µm. The dispersion properties are simulated using a full-vectorial mode-solver as a function of wavelength. From the figure, it is first noted that for very small air hole sizes, e.g., when the influence of the air holes is strongly limited, the dispersion curve is very close to the material dispersion of pure silica (zero dispersion wavelength around 1.3 µm). As the diameter of the air holes is increased, the waveguide dispersion becomes increasingly strong. This shows that the waveguide dispersion may be positive at wavelengths below 1.3 μm, while the fibres simulated in FIG. 5 are all single-mode due to the relatively small size of the cladding holes (d/Λ equal to or less than 0.45). These dispersion properties are well known for micro-structured fibres, but are unattainable for conventional optical fibres. Such dispersion properties may be utilized in applications such as white-light and soliton generators.

The air-filling fraction is a key parameter to increase in order to further increase the dispersion of micro-structured fibres. This may be desired in order to shift the zero-dispersion to even shorter wavelengths than presently possible, or to allow the use of shorter fibre length for obtaining a given dispersion effect. It is, however, well known from the prior art that micro-structured fibres may become multi-mode for large cladding air-filling fractions—and that the largest possible cladding air hole size that can be employed in order for the prior art fibres to be strictly single-mode at all wavelengths is about d/Λ=0.45 (see e.g. Birks et al, Optical Fiber Communication Conference, paper. FG4-1, 1999.).

Figure 6:
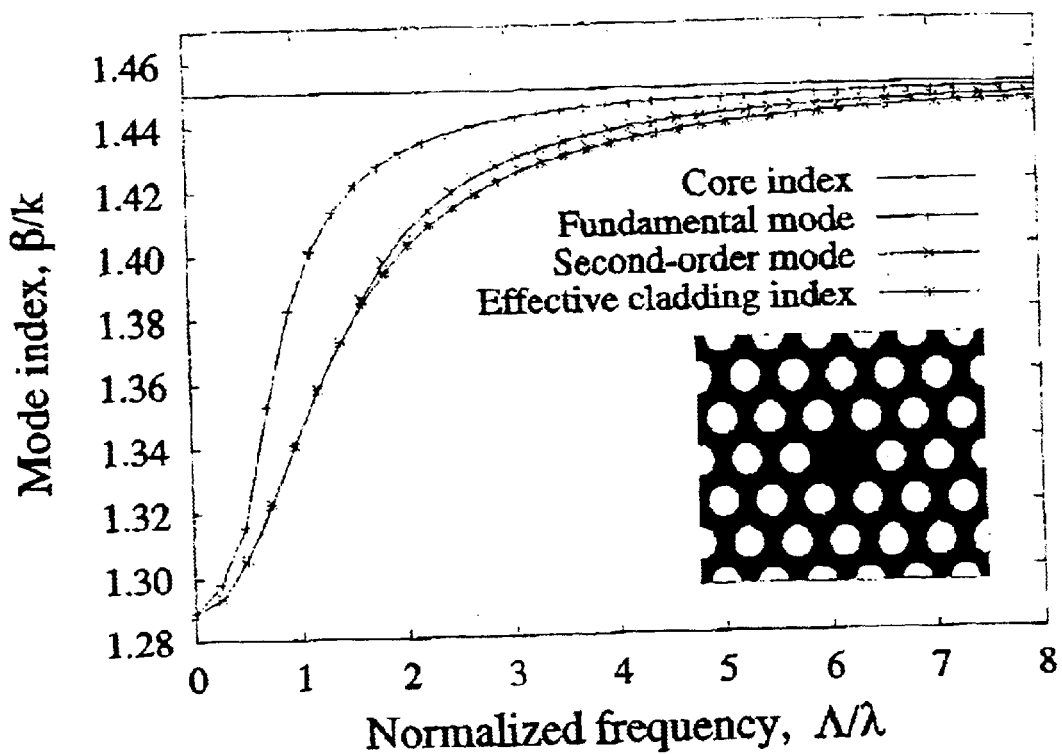
FIG. 6 shows the cut-off properties of a micro-structured fibre with a design known from the prior art.
Figure 7:
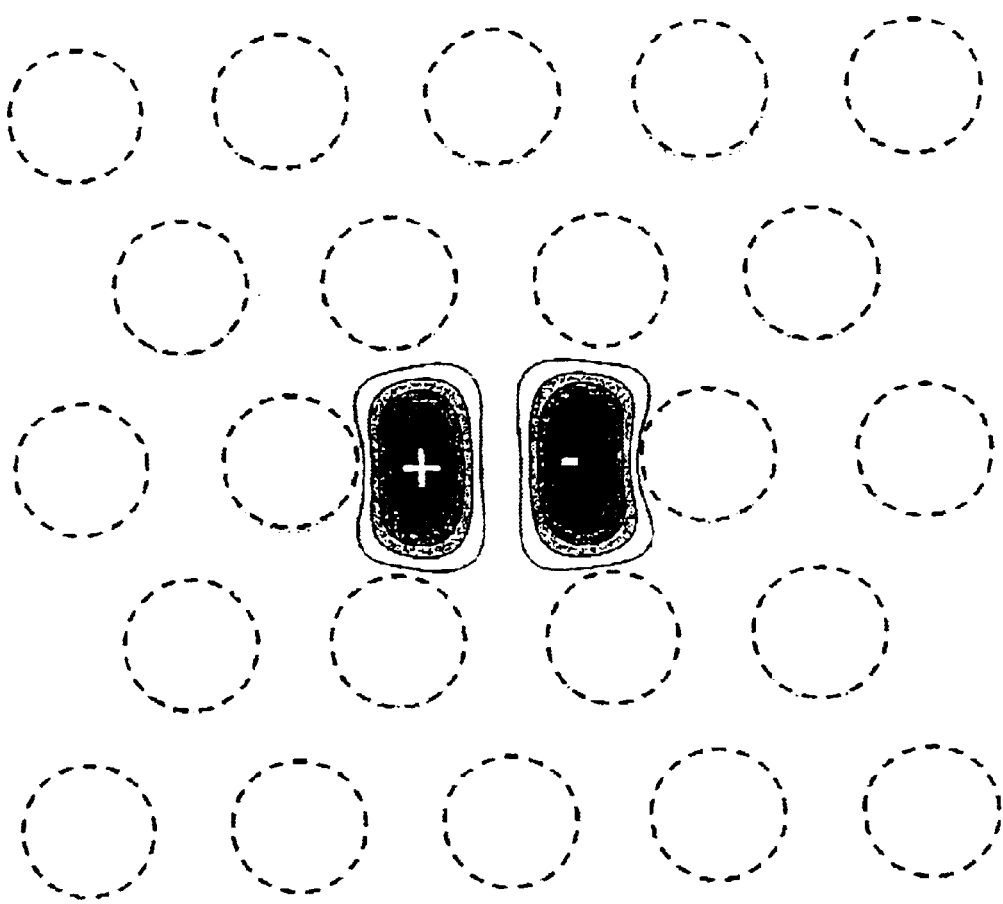
FIG. 7 shows the mode field distribution of the second-order mode of a micro-structured fibre. The two lobes of the mode field have a 180 degree phase reversal between them which is indicated by the plus and minus signs.

The cut-off properties of prior art micro-structured fibres may be understood from FIG. 6, which shows the effective index of the guided modes of a micro-structured fibre with relatively large air holes in the cladding region. The cladding air holes are identical and they have a size d/Λ=0.6, where d is the air hole diameter, and Λ is the centre-to-centre spacing of two nearest air holes. The figure shows additionally the effective refractive indices of the core region and the cladding region. The core region is made of pure silica and it is, therefore, equal to 1.45 (which is a representative value for silica at visible to near-infrared wavelengths). The cladding region on the other hand contains air holes which act to lower the effective refractive index significantly below the index of the core region. The fibre supports at least two modes and the mode-field distribution of the second-order mode is illustrated in FIG. 7. The second-order mode has a mode cut-off wavelength of Λ/1.5. Hence, to avoid the second-order mode at e.g. a wavelength of 632 nm, the centre-to-centre hole spacing, Λ, must be scaled to less than 1 μm. For the specific fibre in FIG. 4, this gives a core diameter of less than 2 μm (the core diameter may be approximated by two times Λ for the specific design).

Figure 8:
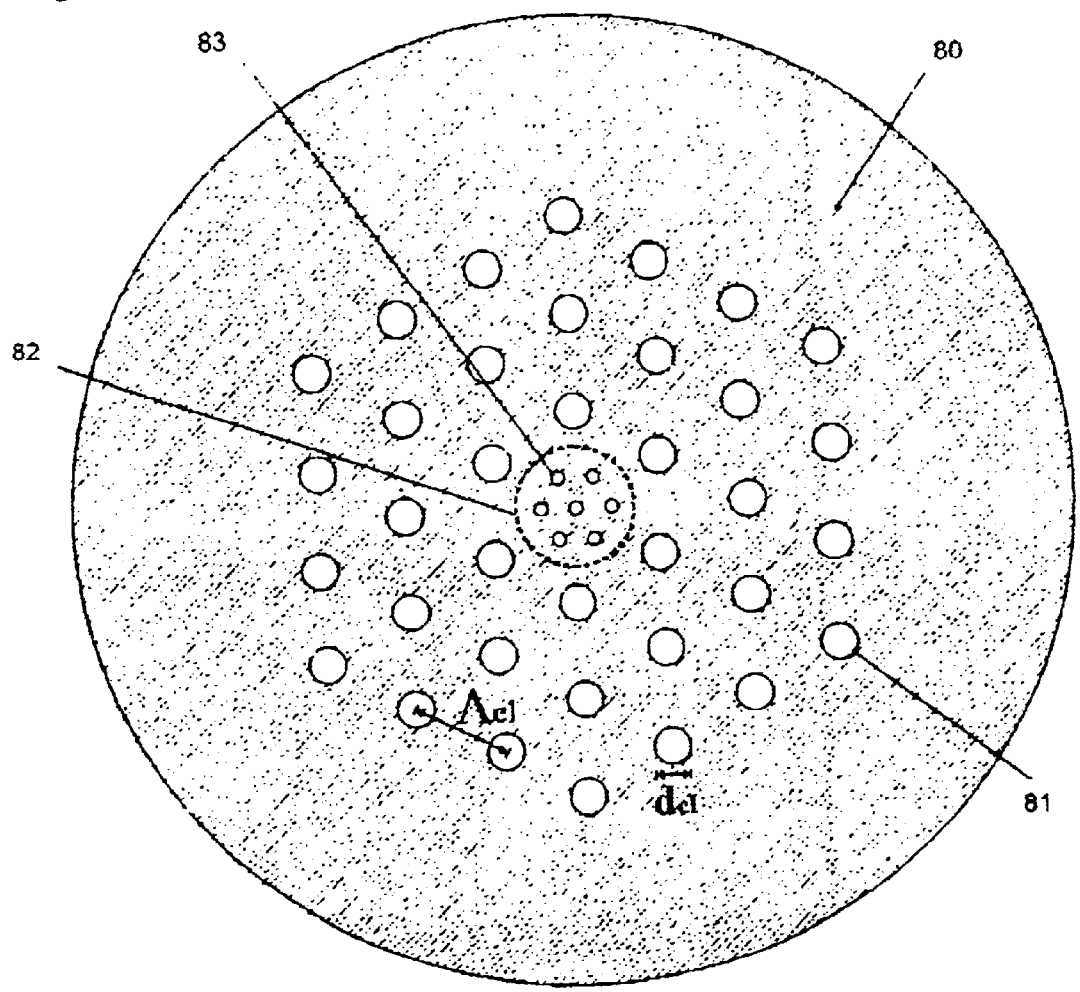
FIG. 8 illustrates a fibre according to the present invention. The fibre has a core region containing a multiplicity of core features. The core features are smaller in size and more closely spaced than the cladding features.
Figure 9:
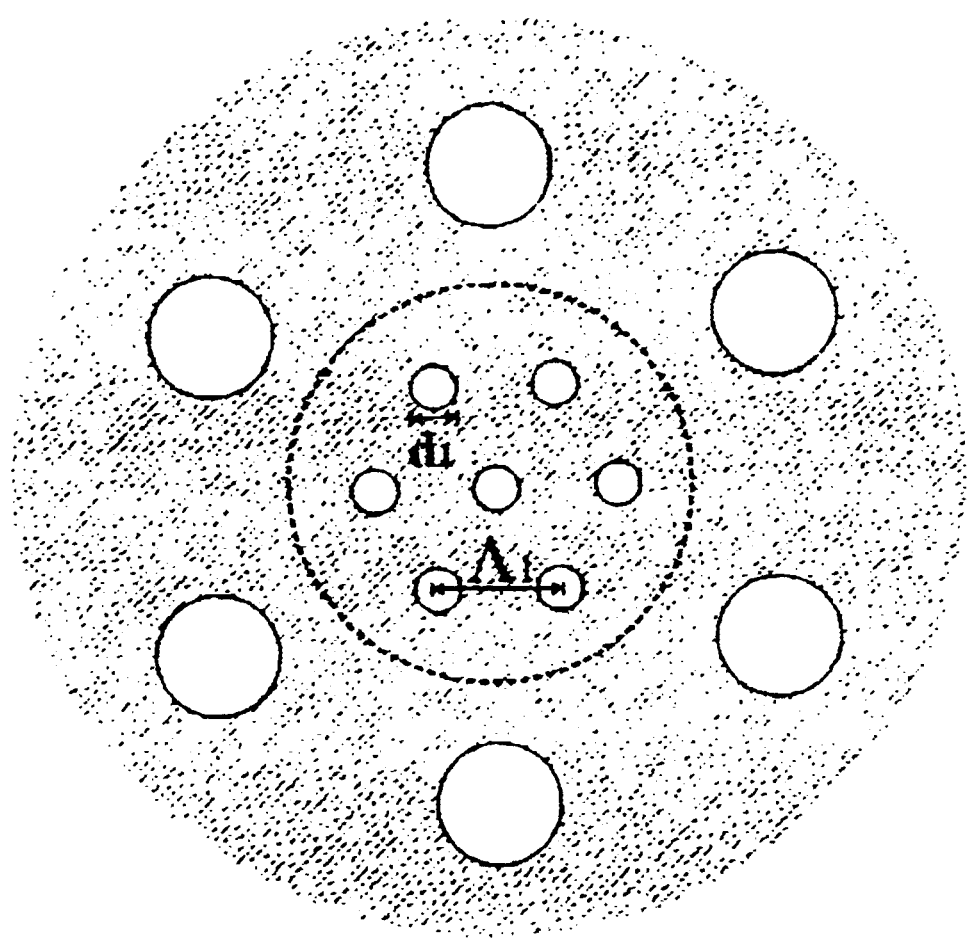
FIG. 9 shows a close-up of the core region (and the inner part of the cladding region) for the fibre in FIG. 8.
Figure 10:
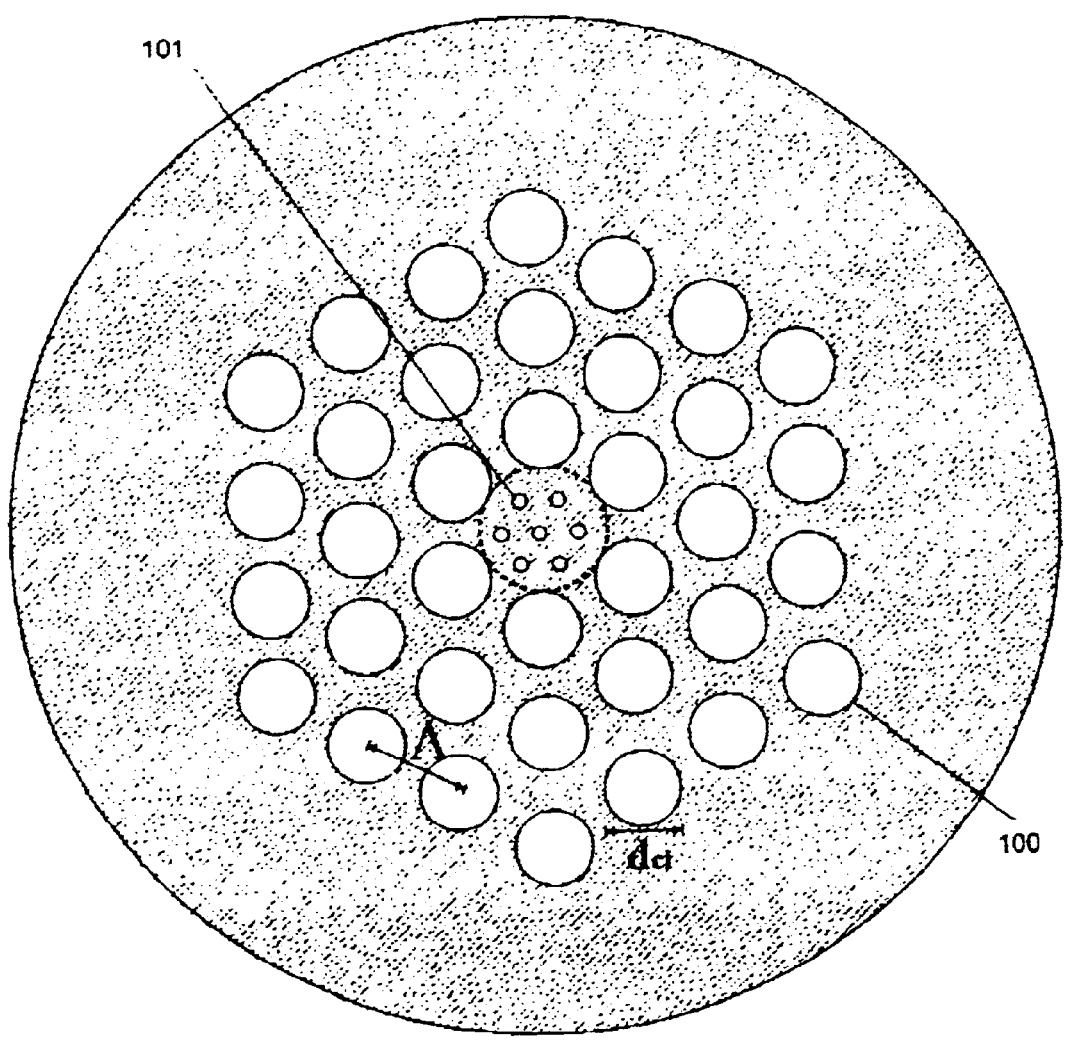
FIG. 10 shows another fibre according to the present invention. The fibre has core and cladding features positioned at the same places as the fibre in FIG. 8, but the cladding features are significantly larger.

In contrast to the fibre of the prior art, the present inventors have realised how to increase the features significantly above d/Λ=0.45 (and thereby obtain the desired dispersion properties this gives access to) while keeping the fibres substantially single-mode at all wavelengths. This is obtained by applying into the core region elongated features with a size that is smaller than the size of the cladding features, while at the same time the core feature spacing is smaller than the cladding feature spacing. Hereby, the present inventors have realised that the cut-off wavelength of any higher order modes may be pushed to very short wavelength—and for certain fibre dimension the second-order mode cut-off may be completely eliminated even for fibres with large features in the cladding. FIG. 8 shows schematically a fibre according to the present invention, which has a background material (80) containing cladding features (81) of diameter, $d_{cl}$, and spacing, $\Lambda_{cl}$, and a core region (82) that contains (in this case) seven core features (83). A close-up of the core region is schematically illustrated in FIG. 9, where the core feature diameter, $d_1$, and the core feature centre-to-centre spacing, $\Lambda_1$, is illustrated. The fibre in FIGS. 8 and 9 is characterized by $d_{cl}>d_1$ and $\Lambda_1>\Lambda_1$. While the FIGS. 8 and 9, show a fibre according to the invention with medium sized cladding features, fibres with even larger cladding features ($d_{cl}/\Lambda_{cl}$ larger than 0.6) will be further advantageous when core features are provided. FIG. 10 shows a schematic example of a fibre according to the present invention with large cladding features (100) and smaller features (101) in the core region.

Figure 11:
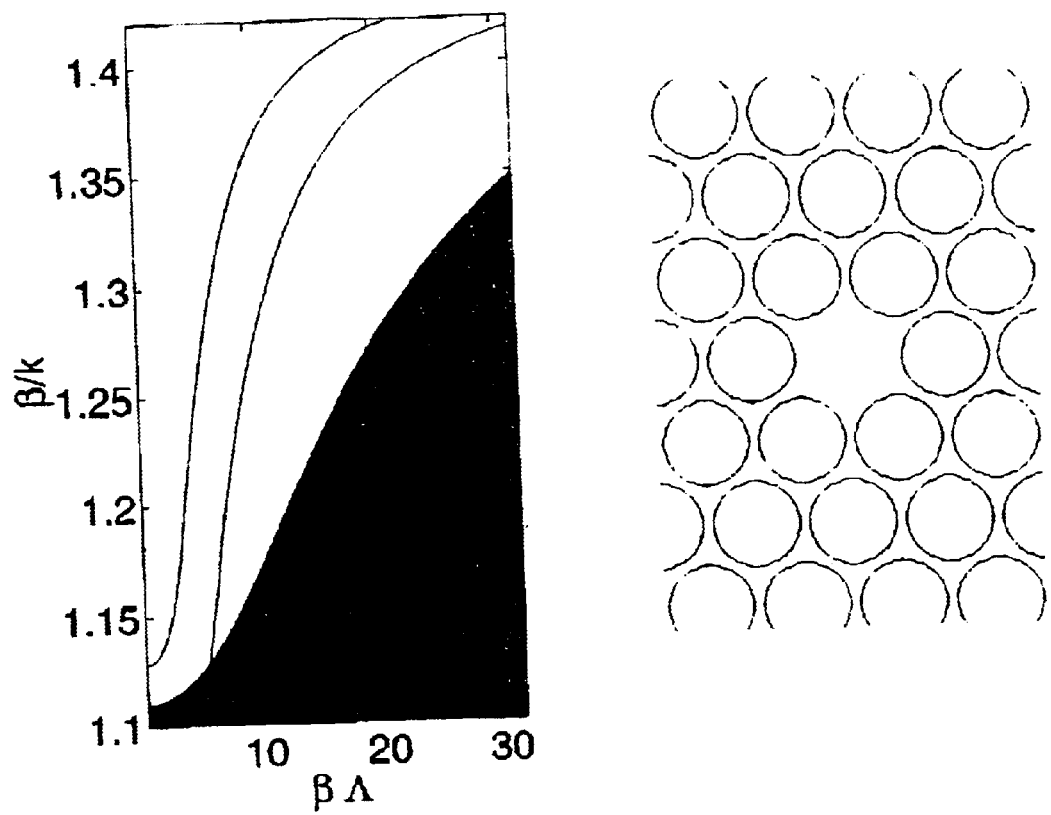
FIG. 11 illustrates a prior art fibre with a high filling fraction in the cladding. The fibre supports a high number of guided modes (only the effective index ( /k) of the fundamental and second-order mode are illustrated). The dark area indicates cladding modes. The fundamental mode displays attractive dispersion properties, but these cannot be utilized in practice since the fundamental mode will couple to the second-order mode. The fibre structure is illustrated in the right part of the figure.
Figure 12:
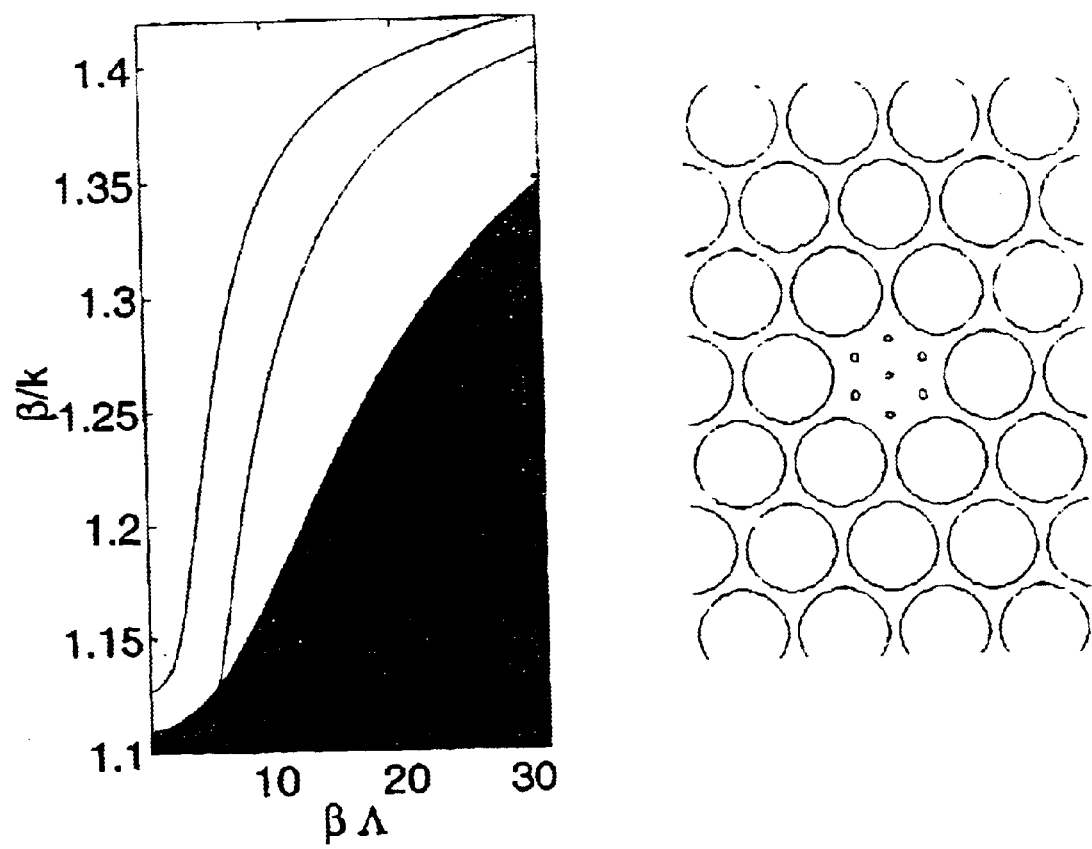
FIG. 12 illustrates a fibre with micro-structured core region. The core holes introduce a suppression of both the fundamental and second-order mode (as well as for all other modes guided by the fibre—which are for reasons of clarity not illustrated). The fundamental mode still exhibits attractive dispersion properties. The second-order mode cut-off is shifted towards shorter wavelengths compared to the prior art fibre—see FIG. 11 The cladding holes are spaced further away from each other compared to the core holes, and the air filling fraction in the core region is significantly lower than in the cladding region. This effect is caused by the effective indices of the guided modes being lowered. This is caused by the core region having an effective index, which is lower than the refractive index of the core in the prior art fibre.
Figure 13:
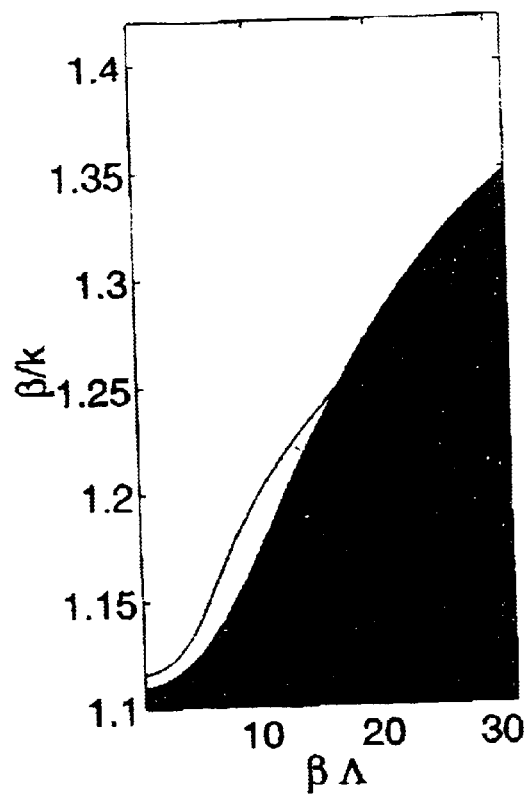
FIG. 13 illustrates a fibre with micro-structured core region. The core holes introduce a complete suppression of all other modes than the fundamental mode. The fundamental mode still exhibits attractive dispersion properties and the fundamental mode has a relatively large fraction of the light guided in air. This amount of light that is guided in air is roughly related to the k-value, where a /k-value closer to one means a larger degree of air guidance. The cladding holes are spaced further away from each other compared to the core holes, and the air filling fraction in the core region is lower than in the cladding region.
Figure 13:
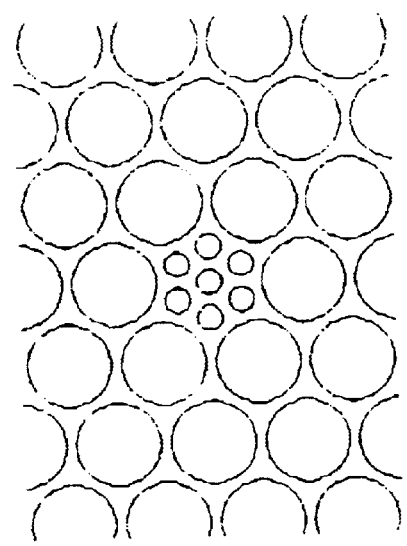

To illustrate the findings of the present inventors, the FIGS. 11 to 13 documents how it is possible to eliminate the second-order mode (as well as any higher-order modes) by introducing features into the core region of a fibre with very large cladding features. In the specific example, the fibre consists of pure silica with features made of air. The cladding features have in the specific example a size of d/Λ=0.9. However, also for smaller cladding features it will be advantageous to introduce features into the core region. FIG. 11 illustrates the operation of fibre with a solid core (a fibre design that is known from the prior art). The figure shows the relation between propagation constant along the fibre axis, β, and free space wavenumber, k, for modes in the fibre. The propagation constant is normalized with respect to the cladding feature spacing, Λ. The fibre supports a multitude of guided modes, but only the two lowest order modes have been shown for reasons of clarity (the fundamental mode has the highest β/k value for a given β value). The semi-infinite, dark region (the region below the line corresponding to the effective refractive index of the cladding) illustrates the continuum of cladding modes existing in the fibre. In this region the fibre cannot guide light efficiently along its length in the fibre core. The right side of the figure illustrates schematically the fibre morphology, where full lines illustrate the air holes. By introducing small features into the core region, the guided modes may be slightly pushed towards the dark region (the non-guiding region). This behaviour is illustrated in FIG. 12. If the core features are further increased in size, but still obeying the conditions that they should be smaller and more closely spaced than the cladding features, then the second-order mode may be completely eliminated. This behaviour is illustrated in FIG. 13. The advantageous of the type of fibre shown in FIG. 13 is that a strong dispersion can be obtained (a result of the large cladding features) while the fibre is strictly single mode. This can be used to shift the zero dispersion wavelength significantly below 1.3 μm, while maintaining single mode operation. Furthermore, the type of fibre shown in FIG. 13 will have a larger core size than a fibre with similar sized cladding elements that has to obey the requirement of single mode operation. For the fibre shown in FIG. 13, the core size may be larger than 2 μm in diameter and operate with large dispersion at visible wavelengths. In fact the core diameter may easily be designed to be in the interval from 2 to 10 μm for the type of fibre illustrated in FIG. 13. Core sizes within this interval are of importance for a range of specific applications, where a high coupling coefficient between micro-structured fibres and conventional fibres are required. As a further mean to improve the coupling to conventional fibres, it is desired to shape the mode field using a high number of core features.

The fibres disclosed in this application have a micro-structured core region surrounded by a micro-structured cladding region. The core region should also in this respect preferably consist of more than 2 features in order to provide a significant variation of the effective refractive index of the core region as a function of wavelength.

Figure 14:
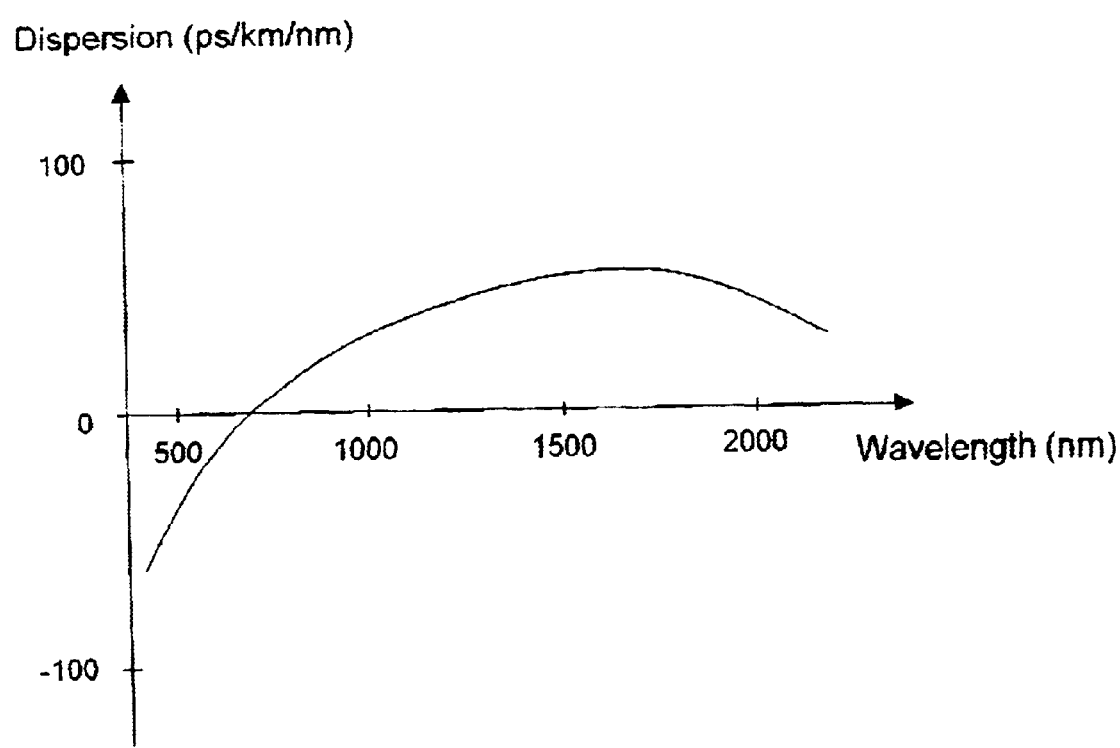
FIG. 14 schematically shows the dispersion properties at visible to near-infrared wavelength of the fibre in FIG. 13.

The dispersion properties of the fibre shown in FIG. 13 are simulated and presented in FIG. 14.

While the present inventors have realized that micro-structured fibres may be significantly improved by introducing a specifically designed micro-structure in the core region, it is important to notice that the micro-structured cores only for certain wavelength ranges have an effective refractive index that is higher than the cladding region(s). Hence, the fibres will only over a limited wavelength range guide light in the core by TIR. This is seen in FIG. 13 where a cut-off value exists for the fundamental mode. The fibres may, however, also guide light outside the wavelength ranges where TIR takes place. This can result from waveguidance by PBG effects, a waveguidance mechanism that can also be utilized in the fibres covered by the present invention. This requires, however, that the cladding region has a periodic distribution of the cladding features. Such a requirement is not necessary for the majority of fibres disclosed in this application which may well have non-periodically distributed cladding features (and guide light by TIR).

As documented by the discussion above, the effective index of the core micro-structure may for certain wavelength regions be strongly wavelength dependent for fibres according to the present invention. This may provide the fibres with a relatively low core-cladding effective refractive index difference even for large cladding features. The low core-cladding effective refractive index difference represents the key issue that allows to suppress the second-order mode cut-off completely or to shift it to wavelengths shorter than a desired operational wavelength. Hereby the strong dispersion of the fundamental mode can be achieved in the micro-structured fibres while being under single-mode operation. According to the present invention, it will be further advantageous, if the refractive index of the core background material is lower than that of the background cladding material (e.g. if the fibre is made of silica glass, that the silica core material is doped so that is has a lower refractive index than the cladding background material). This will act to further suppress the second-order mode cut-off. As already mentioned then it should be noticed that the fibres, disclosed in this application, may be characterized by a cut-off wavelength for the fundamental mode, in which case the fibres will not transmit light at wavelengths shorter than a certain critical value. This cut-off wavelength may, however, be designed to be shorter than a desired operational wavelength. A further embodiment of the present invention includes micro-structured fibres with a core region, which is characterized by a microstructure having a different micro-structure than the cladding region and where the effective index of the core region is higher than the effective index of the cladding at long wavelengths and becomes lower at wavelengths shorter than a certain critical value. This requires a core region where the background material has been doped to a lower nominal value than the background material of the cladding microstructure and/or the core microstructure has a lower filling fraction than the cladding microstructure. It is important to notice that both the core and cladding microstructures may be substantially periodic or they may be non-periodic. The core structure may, in principle, be periodically micro-structured without paying respect to whether the cladding structure is periodically micro-structured, and vice versa. The advantage of the latter type of embodiment is that a more circular symmetric mode field distribution in the fibre cross-section may be obtained at a desired wavelength. This type of embodiment may, however, not provide a complete suppression of the second-order mode. A further way of providing a smoothing of the mode field is by providing additional elements (either ring-shape features surrounding completely the core region or discrete elements such as air holes in a ring around the core centre) in close proximity to the core-cladding interface.

In a preferred embodiment, the cladding has features of size $d/\Lambda$ larger than 0.45—and the core region contains more than one elongated feature (usually voids in the form of air holes). Preferably the number of core features is larger than 2 in order to utilize the core features to shape the guided mode of the fibre to a desired profile. Using just a single hole will either provide a single, centrally air hole—causing an undesired mode profile with a low coupling coefficient with respect to Gaussian mode profiles (that is the profile of conventional fibre) or cause an a-symmetric profile. Hence with the aid of two or more holes, the guided mode(s) may be shaped to more desired profiles, while at the same time serving to push the second-order mode cut-off to short wavelengths. Furthermore, it is preferred that the number of significantly higher than 2, such as higher than 5 or higher than 17 and that the spacing between core features becomes very small (much smaller than the wavelength of light guided through the fibre). By this, the light will not be able to avoid the core features, and a large fraction of the light may, consequently, be guided within the features. In a further preferred embodiment, the features are voids containing air, a purified gas or vacuum, hence allowing a fibre to guide with low losses.

Apart from the potential of strongly shifting the zero-dispersion wavelength, FIG. 5 also shows a near-zero, broadband dispersion flattened behaviour of crystal fibres with $d_{cl}/\Lambda$ around 0.30. Due to the exhibition of positive waveguide dispersion at short wavelengths, the dispersion-flattened range is in fact extended to wavelengths below 1.3 $\mu$m down to approximately 1.1 $\mu$m. The attractive potential for micro-structured fibres of finding use as a standard transmission fibre in broadband optical communication seem, therefore, with respect to the dispersion properties, possible to fulfil. The large tailorability in the design of the crystal fibres, with respect to air holes sizes, shapes and arrangements provides a further fruitful mean of tuning of the dispersion curve to obtain specific properties. Micro-structuring of the core as disclosed in this application provides further flexibility for designing fibres with flat, near-zero dispersion over broad wavelength ranges.

Yet another aspect of micro-structured fibres is their ability to provide dispersion compensation at near-infrared wavelengths—and at 1.55 $\mu$m in particular. The present inventors have realised how to provide a significantly higher degree of freedom for tailoring the negative dispersion of micro-structured fibres compared to both traditional fibres and previously known micro-structured fibres. The present inventors have realised a design-route for such micro-structured fibres, and the present invention discloses a number of specific design of micro-structured fibres with large negative dispersion.

The fibres are characterized by a number of elongated cladding elements surrounding a core region—and the cladding elements are designed in such a way that the field distribution of light guided through the fibre will be much more wavelength dependent compared to any previously known fibre. This strong wavelength dependence provides the means for creating optical fibres with extremely strong dispersion. The present invention, therefore, includes designs of novel types of dispersion manipulating optical fibres that are able to compensate—over a small fibre length—the dispersion of conventional optical fibres that are already installed in many telecommunication systems. Hence, fibres according to the present invention may be utilized as short dispersion compensating components that can be inserted into existing systems.

Figure 15:
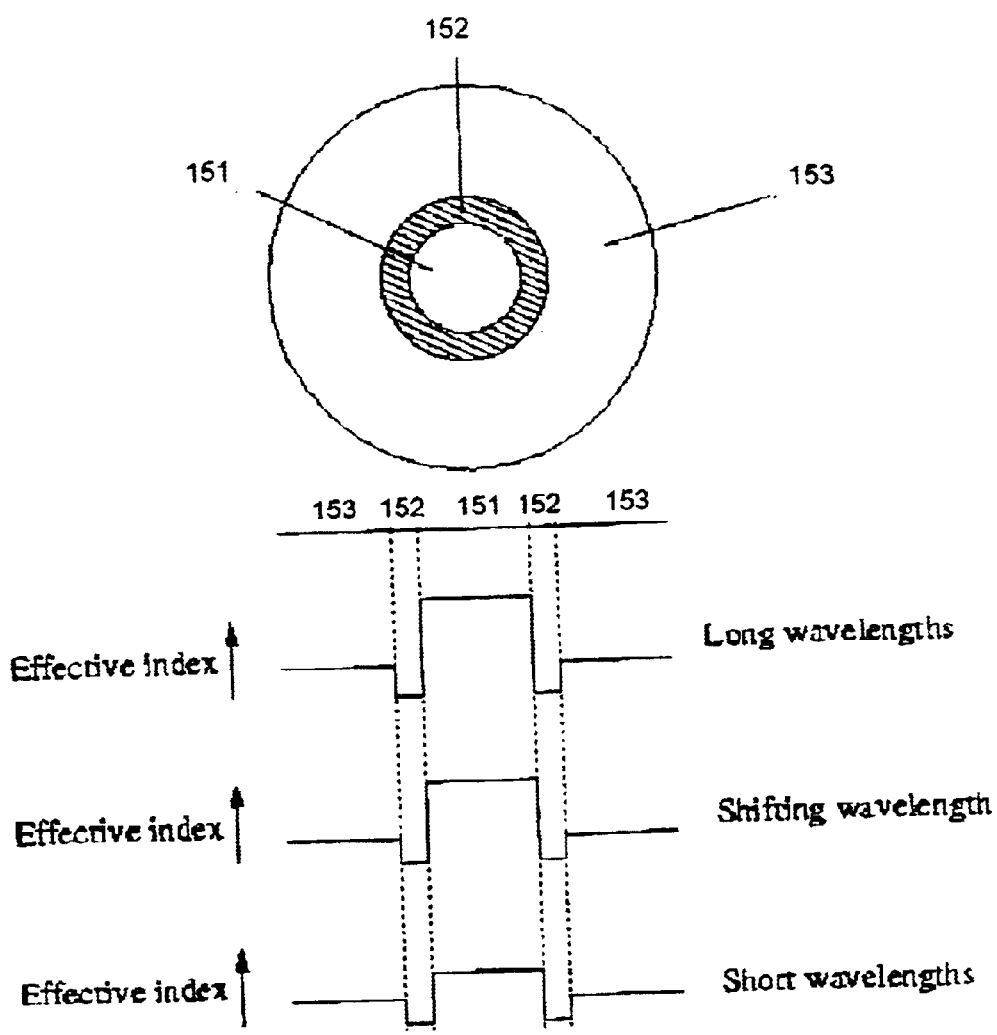
FIG. 15 illustrates schematically the operation of dispersion compensating fibres known from the prior art.
Figure 16:
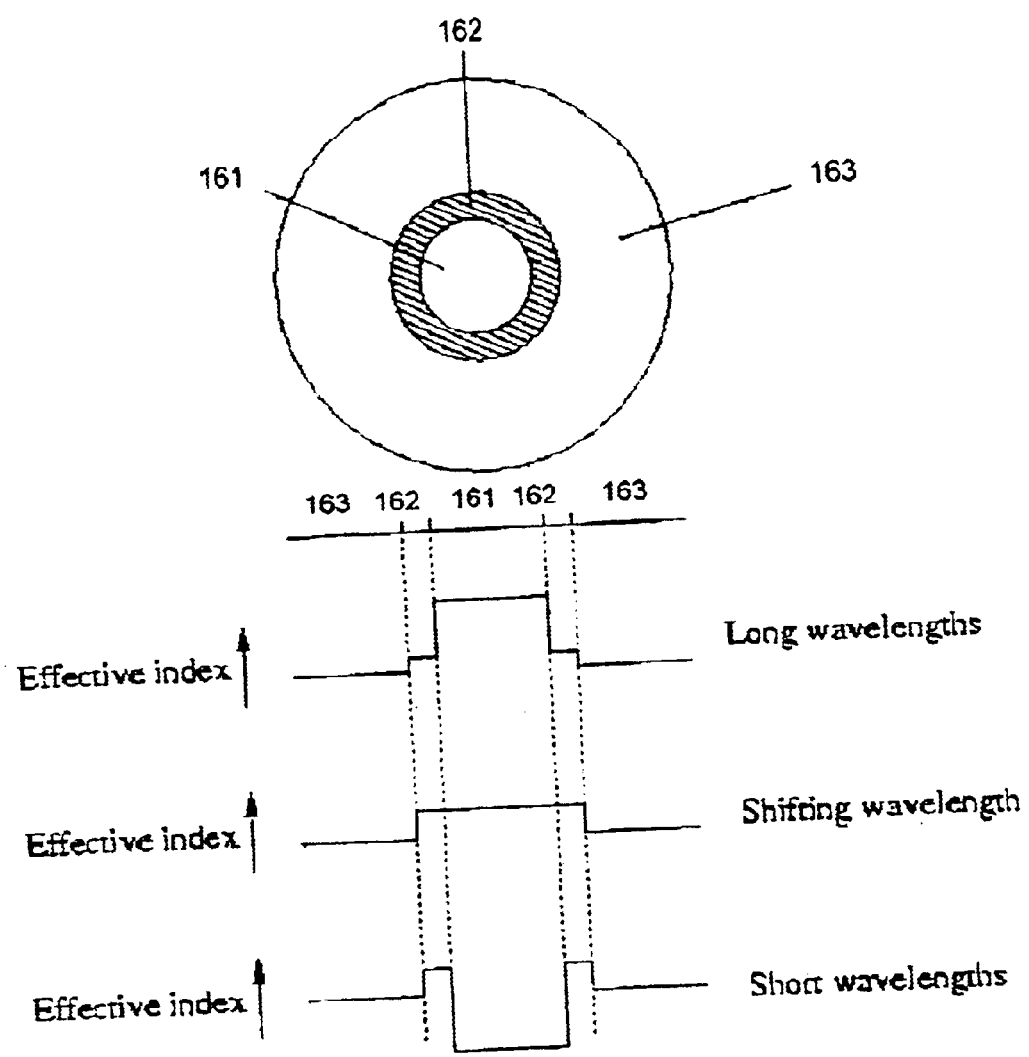
FIG. 16 illustrates schematically the operation of dispersion compensating fibres disclosed in this application.

Conventional optical fibres may be designed to exhibit normal dispersion. Such fibres are widely used on a commercial basis to provide dispersion compensation in optical fibres systems that are upgraded from operation at wavelength around 1.3 μm to operation at wavelengths around 1.55 μm. These dispersion-compensating fibres primarily allow us to significantly increase the transmission capacity over an existing fibre optical communication system. The dispersion compensating conventional optical fibres are commonly characterized by a so-called depressed cladding—an inner cladding region that has a lower refractive index than the core and an outer cladding region. Multiple depressed cladding designs are also well known from conventional optical fibres. Also micro-structured fibres have been designed for dispersion compensating purposes with a depressed, micro-structured, inner cladding region (see e.g. U.S. Pat. No. 5,802,236). Both the conventional, dispersion compensating optical fibres, and the micro-structured fibres in the above-cited reference have an operation that is illustrated schematically in FIG. 15. The figure shows the effective indices (which in the case that one (or more) of the three illustrated fibre regions is homogeneous is identical to the conventional refractive index of that region(s)). The figure illustrates that the core at the operating wavelengths have the higher index, while the depressed, inner cladding region has the lowest. The outer cladding region has an index higher than the depressed cladding, but lower than the core at all wavelengths. The present inventors have, however, realised that it is not optimum to have the above-described relation between the fibre regions for all wavelengths. In contrast, the present inventors have realized that it is advantageous to have fibres where the relation between the effective refractive indices of the fibre regions is varying as illustrated in FIG. 16.

Figure 17:
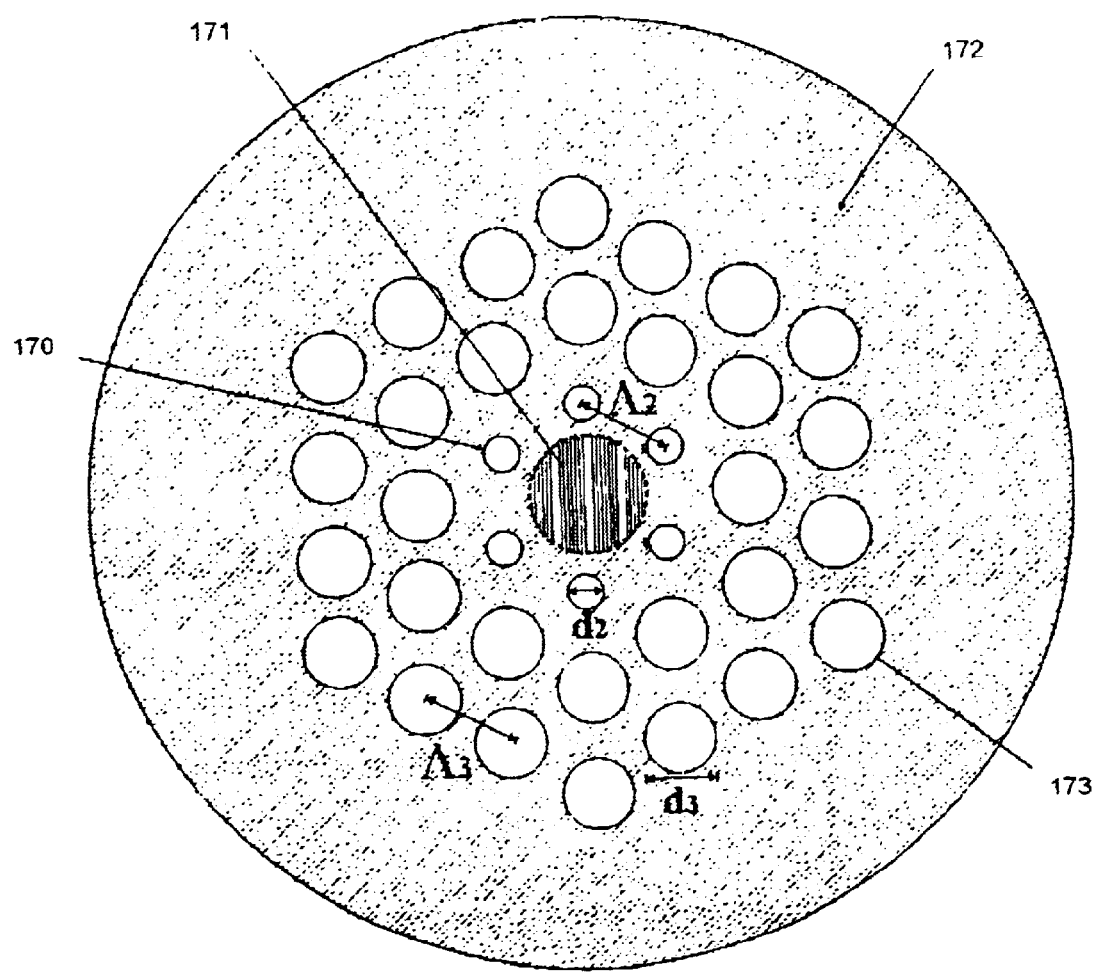
FIG. 17 shows a fibre according to the present invention. The fibre has a solid core that has a lower refractive index than the refractive index of the background cladding material and a raised, micro-structured, inner cladding region.

This application discloses fibres where the effective refractive index of the core may be larger than the effective indices of both an inner and outer cladding region at long wavelengths, the core index may be equal to the inner cladding index at a specific wavelength, named the shifting wavelength, but remain larger compared to the outer cladding at this wavelength, and finally, the core index may be lower than both the inner and outer cladding indices at short wavelengths. The effective index of the inner cladding region will at least at the operating wavelengths be higher than that of the outer cladding index, and we are, therefore, naming inner cladding regions, according to the invention as raised claddings. The present inventors have realized that a very strong dispersion can be obtained around the shifting wavelength, and that this shifting wavelength can be designed to any desired absolute wavelength for a number of the fibres disclosed in this application. The above-described effect may e.g. be obtained by realizing a fibre as shown in FIG. 17. The fibre has a raised, inner cladding containing the features (170), and a solid core (171) that has a lower refractive index than the background material of the fibre (172). The outer cladding region contains larger features (173) than the features of the inner cladding region.

Figure 18:
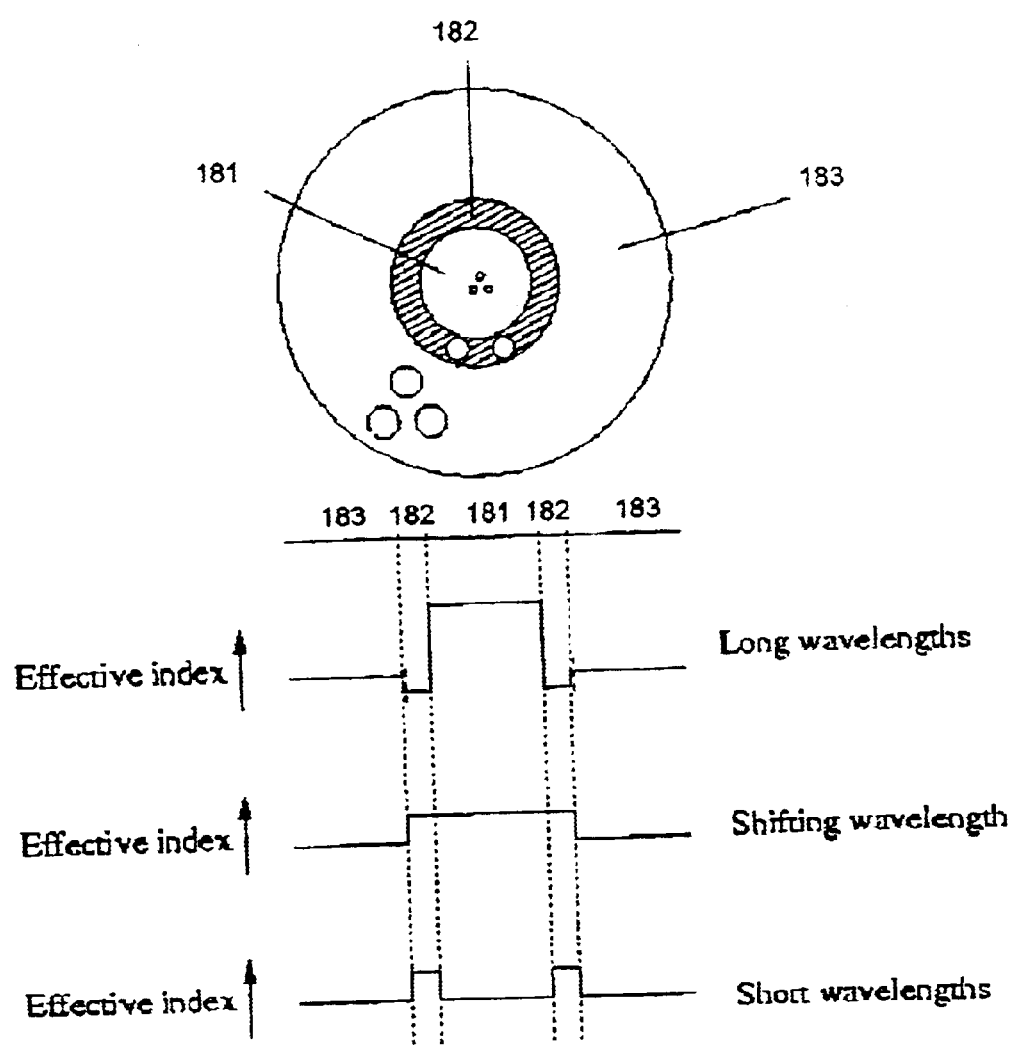
FIG. 18 illustrates schematically the operation of dispersion compensating fibres disclosed in this application.

Another example of the effective index variation of a fibre according to the invention is shown in FIG. 18. In this example, we describe fibres, where the effective refractive index of the core may be larger than the effective indices of both an inner and outer cladding region at long wavelengths. In agreement with the previously described example, the core index may be equal to the inner cladding index at a specific wavelength, named the shifting wavelength. However, in contrast to the previous example, this may be obtained for a case, where the refractive index of the background material of the inner cladding region is higher than that of the outer cladding region, provided that the air-filling fraction of the inner cladding region is equal to or larger than that of the outer cladding. In this example, the effective refractive index of the core may be equal to the outer cladding index at short wavelengths, but the core index may also be smaller than that of the outer cladding. Also in this case, a very strong dispersion can be obtained around the shifting wavelength, and this shifting wavelength can be designed to any desired absolute wavelength for a number of the fibres disclosed in this application.

Figure 19:
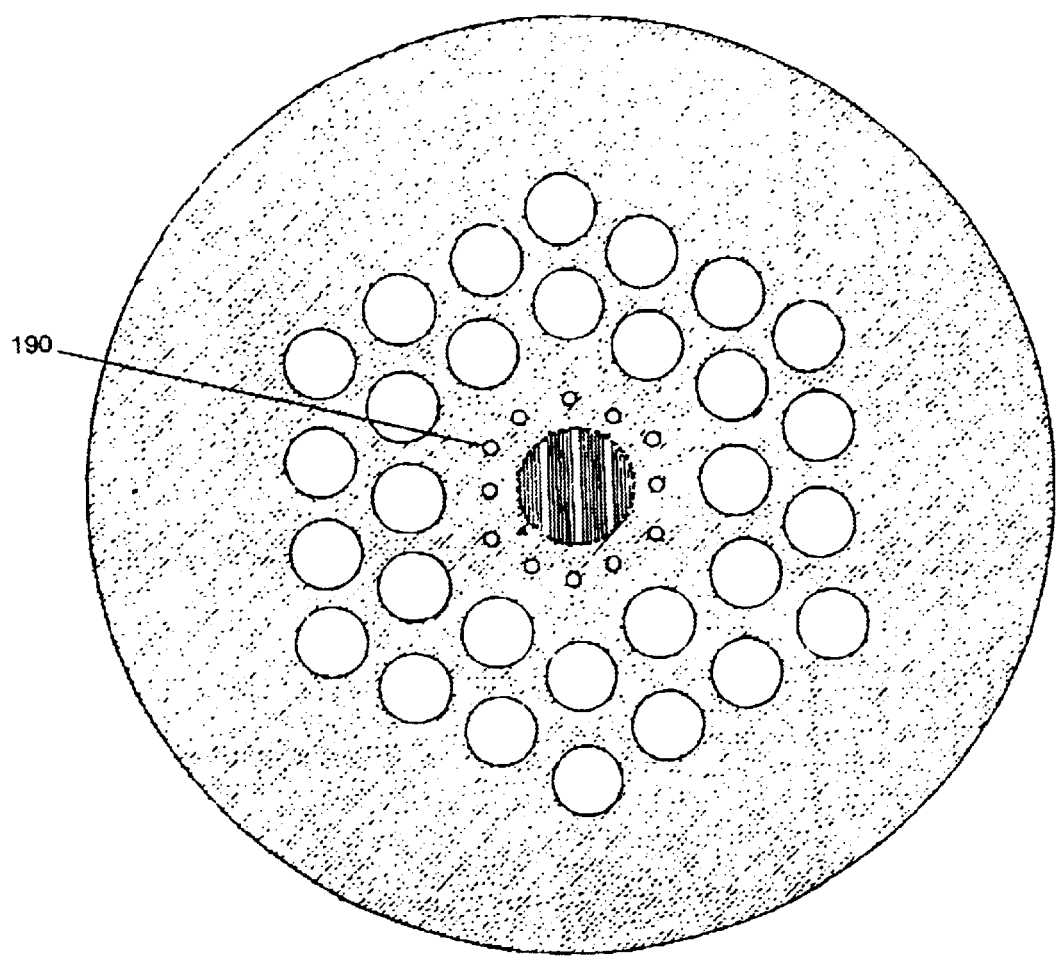
FIG. 19 shows a further example of a fibre according to the present invention. The fibre has a raised, micro-structured, inner cladding region.

According the invention, also a fibre with a design as illustrated in FIG. 19 will be advantageous. The fibre has smaller inner cladding features (190) distributed in a near-ring shaped region around the core.

According to the invention, it will be further advantageous to have obtained the behaviour illustrated in FIG. 16 by introducing a micro-structure into the fibre core region. The following text is a more detailed description of a more advanced design according to the present invention, and how a large negative dispersion can be obtained. The description exemplifies the design-route that the present inventors have found in order to realize micro-structured fibres that exhibit strong dispersion.

Figure 20:
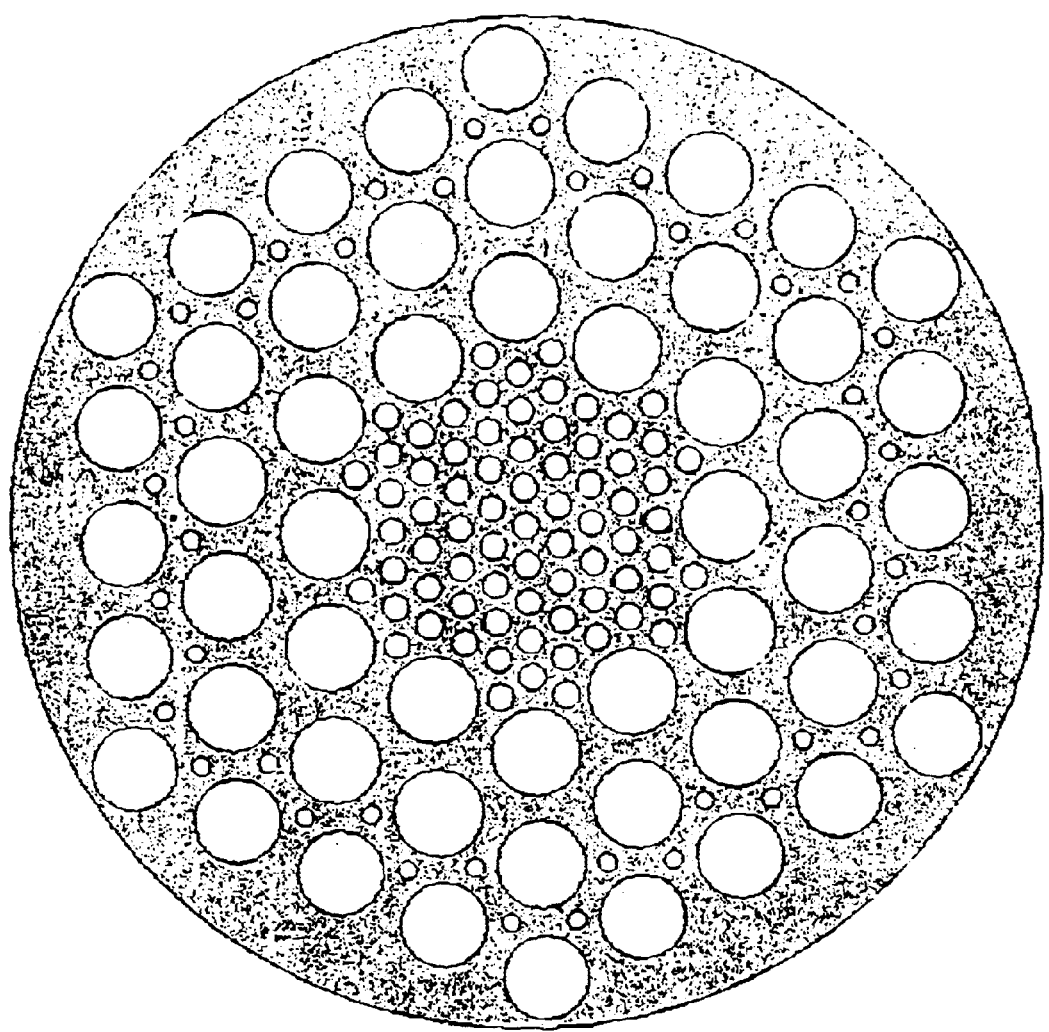
FIG. 20 shows yet another example of a fibre according to the present invention. The fibre has micro-structured core region and a raised, micro-structured, inner cladding region.

The basic transverse structural form of the micro-structured fibres, employed to obtain a large degree of dispersion compensation (The group velocity dispersion, GVD, is very negative), is shown in FIG. 20. This is not a structure actually calculated upon in the following, however, it describes the structural idea.

In the centre is a closed-packed core-region (this means that the air-holes are situated on a triangular lattice). This implies that an air hole is situated in the central part of the core-region, which is an unusual quality in fibres, which guide light by modified Total Internal Reflection (TIR).

Lattice-constants: Outside the close-packed core-region is the inner cladding region. This inner cladding region is also closed-packed but the distance between the air holes (the lattice-constant, Λ) is significantly larger than the lattice-constant in the central core region. In the calculated example, as well as the structural example shown hereunder, the lattice-constant is three times as large in the inner cladding region as it is in the central core-region.

Surrounding the inner cladding region is the outer cladding region. In the calculated example (as well as the structural example shown hereunder), the inner and the outer cladding regions have the same lattice-constant. However, in the outer cladding structure, small interstitial holes are placed. The effect of these holes is that the outer cladding region behaves as if its lattice constant is slightly smaller, than the lattice constant of the inner cladding region.

Figure 21:
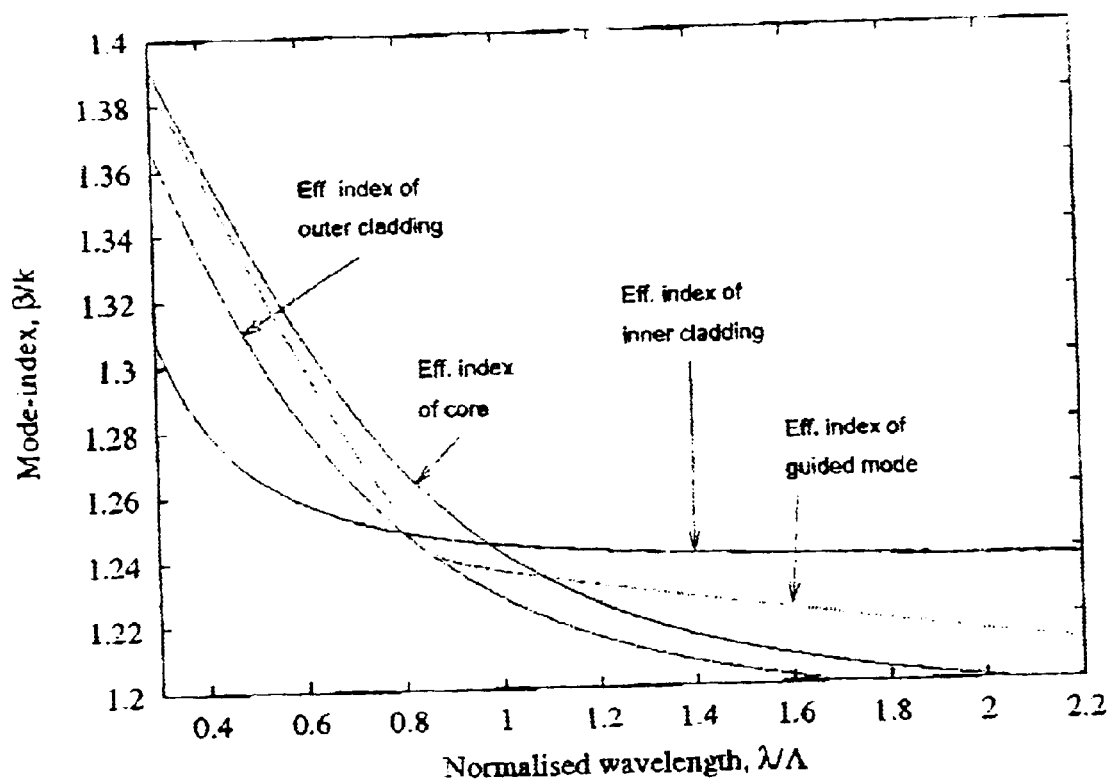
FIG. 21 illustrates the operation of the Fibre in FIG. 20 through the use of effective refractive index considerations.

The effects creating the possibility of large dispersion compensation: To explain the way this fibre works, we will use the mode-index plot, shown in FIG. 21. Here is shown the effective index of some different periodic structures. The effective index is defined in the invariant length direction, for the fundamental mode, and is defined as the wave-vectors component in the length direction (the propagation constant β), divided by the free-space wavenumber, k. For a bounded mode (exemplified by core-mode in the plot), this definition is compatible with the definition known from standard optical fibres. The effective index is shown as a function of the normalized wavelength, $\lambda/\Lambda$, where $\lambda$ is the free-space wavelength, while $\Lambda$ is the aforementioned lattice-constant in the inner cladding (or the outer cladding, since they are equal).

The effective index of the outer cladding is termed 'outer cladding' in the plot. The effective index of the the curve 'inner core' is similar to the effective index of the central core, since 'inner core' shows the effective index of a periodic material, identical to the central core, except that 'inner core' extends infinitely in space.

To obtain the desired effect, it is necessary to have an index of the central core (inner core) that lies above the index of the outer cladding at long (normalized) wavelengths. This is ensured by having an air-filling fraction in the central core, which is less than the air-filling fraction in the outer cladding. In the example calculated upon in this section, the central core has air-holes with a diameter of 70% of its lattice constant, while the outer cladding has air-holes with a diameter of 75% of its lattice constant. Furthermore, the outer cladding has interstitial air-holes with a diameter of 13% of the local lattice constant, which further lowers the effective index of the outer cladding at long wavelengths, compared to the effective index of the central core.

At shorter wavelengths ($\lambda/\Lambda\equiv 0.79$) the effective index of the outer cladding has risen to the same level as the effective index of the central core-region. The reason behind the significant rising of the effective index of the outer cladding, at wavelengths which are sufficiently long to ensure that the effective index of the central core-region is still fairly constant is the significantly larger lattice constant of the outer cladding compared to the central core-region. At these wavelengths the large air holes of the outer cladding have a size comparable to the wavelength, which causes the field to avoid the air-holes, which again causes the effective index to rise.

A hypothetical structure, consisting of the central core, surrounded by the outer cladding, would therefore guide light in the core-region at long wavelengths (where the effective index of the core is higher than the effective index of the cladding). At short wavelengths the fibre would become an anti-guide (not guiding in the core-region), since the effective index of the cladding has risen above the effective index of the core. On the mode-index curve shown above, one may actually see that the mode-index curve is tending towards the effective outer cladding index ($\lambda/\Lambda\equiv 0.85$), due to the small index contrast between the central core and the outer cladding at these wavelengths.

However, in the structure calculated upon in the above plot, the effective index of the inner cladding rises above the effective index of the outer cladding at these wavelengths. By designing correctly, one may now obtain the following situation: Before the mode-index reaches the effective index of the outer cladding, it begins to de-localize, because of an insufficient index difference between core and cladding. However, because of the inner cladding surrounding the central core, the field is de-localizing into the inner cladding, since this inner cladding has a significantly higher index than the outer cladding at these wavelengths. Actually, this index difference becomes sufficiently large, for the inner cladding to guide the light.

Instead of having a central core mode, and an inner cladding mode, we obtain that the central core-mode is de-localized out into the inner cladding over a quite short wavelength interval. However, the slope of the central core-mode and the inner cladding mode is quite different, due to the large difference in structural size between the central core and the inner cladding. The guided mode-index therefore turns sharply in the wavelength region where the transition from the central core to the inner cladding (which becomes the new core) takes place.

Figure 22:
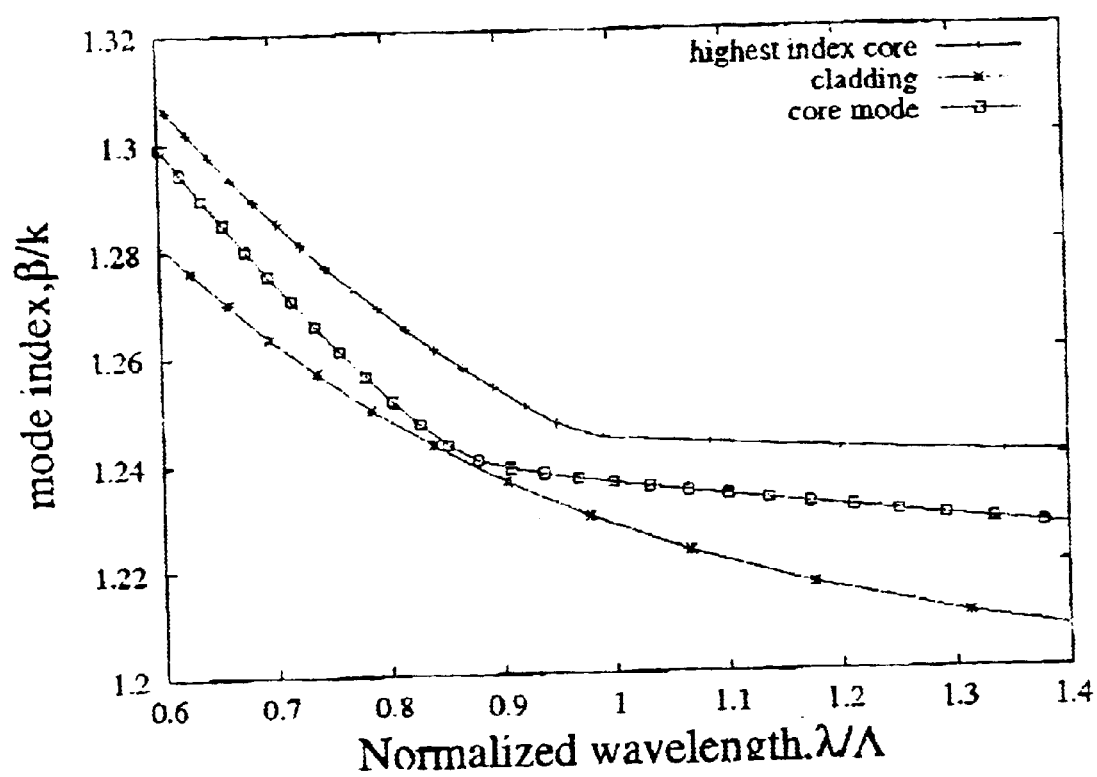
FIG. 22 shows a simplified illustration of the operation of the fibre in FIG. 20.

In FIG. 22 is depicted the same calculation, except that we have zoomed in on the interesting transition region. Also, we do not show an effective index of the central core-region, and an effective index of the inner cladding. The core-index instead shows the effective index of the one of the two, which has the higher effective index at the particular wavelength. Shown like this the effective core-index appears to break at the shifting wavelength, which of course is a mathematical abstraction. Nevertheless, it explains the dramatic effect on the slope of the guided mode, since the guided mode is forced to have an effective index, which lies between the effective index of the cladding and the core.

The group velocity dispersion, GVD, for a guided mode can be written as:

$$GVD=-\lambda/c\ d^2n/d\lambda^2, \text{ where } n=\beta/k.$$

Figure 23:
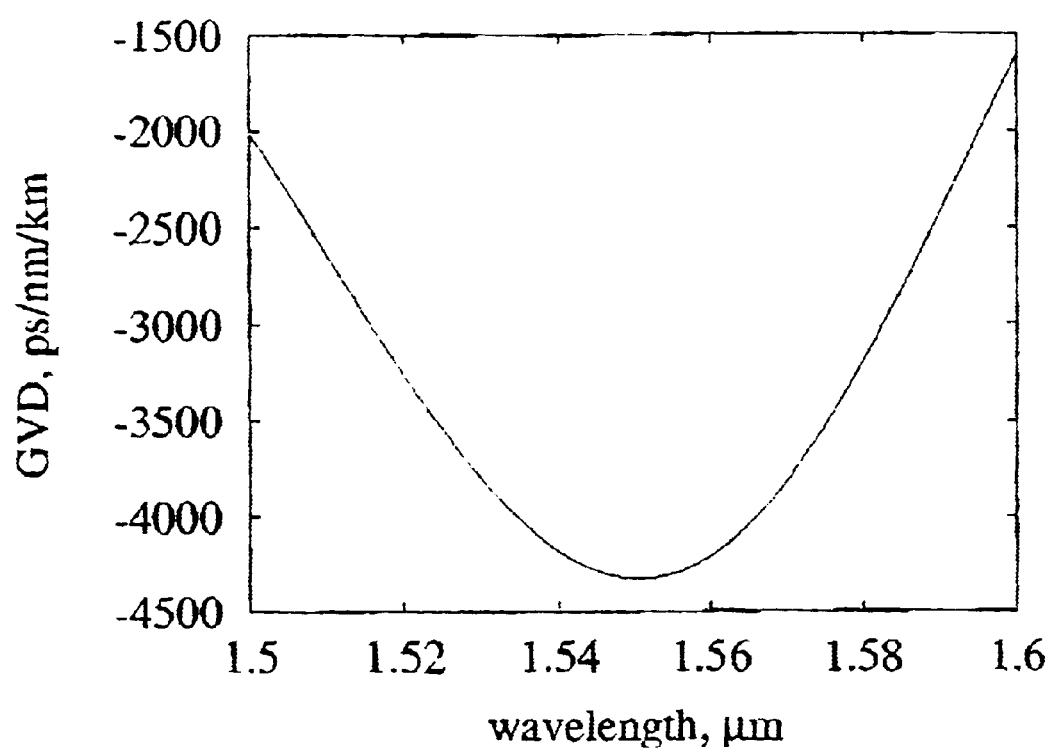
FIG. 23 shows the dispersion properties of a fibre according to the present invention. The dispersion at near-infrared wavelengths is lower than −4000 ps/km/nm.

From this formula, those skilled in the art will recognize that the sharp upward bending of the guided mode corresponds to a numerically large negative group velocity dispersion. The calculated group velocity dispersion of the fibre is shown in FIG. 23.

Since it has been assumed that a group velocity dispersion below 2500 ps/nm/km is unattainable in pure silica fibres at 1.5 $\mu$m wavelength the numbers speak for themselves. The lattice constant in the cladding is 1.78 $\mu$m, while the core-diameter is estimated to be approximately 5 $\mu$m.

Figure 24:
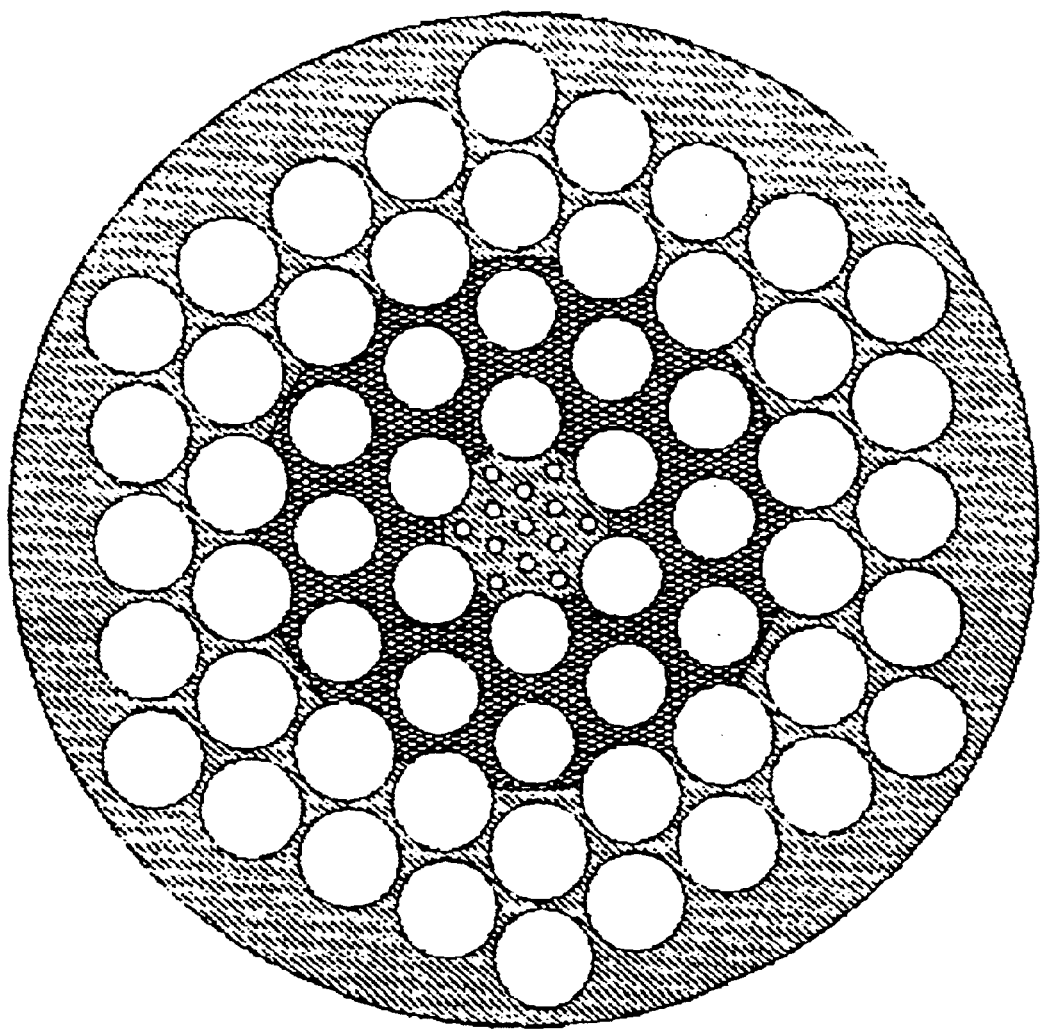
FIG. 24 shows yet another example of a fibre design according to the present invention.

Another example of a fibre design according to the present invention is illustrated in FIG. 24. The fibre consists of a core-region with relatively small air holes. Surrounding the core-region is an inner cladding region that has a higher percentage of air than the core region (ensuring that the core has a higher effective index than the inner cladding at long wavelengths. The inner cladding structure further has a significantly larger structure scale than the core-region ensuring that the effective index of the inner cladding becomes equal to the effective index of the core-region at the shifting wavelength (the longest free-space wavelength where the effective index of the core-region is equal to the effective index of the inner cladding). At shorter free space wavelengths than the shifting wavelengths the effective index of the inner cladding raises above the effective index of the core-region.

The reason that the index of the inner cladding region raises above the effective index of the core region is that the air holes of the inner cladding are avoided by the field at much longer wavelengths than the air holes of the core-region. This is due to the larger structural size of the inner cladding.

Surrounding the inner cladding is the outer cladding, which has the same structural size as the inner cladding. However, the air-filling fraction of the outer cladding is greater than the air-filling fraction of the inner core, since the air holes are largest in the outer cladding.

The effective index of the outer cladding is therefore lower than the effective index of the inner cladding at all wavelengths. The effective index of the three distinct parts of the fibre therefore behaves in accordance with the preferred behaviour shown in FIG. 16. FIG. 24 is therefore an example of a preferred embodiment where the desired behaviour is obtained by having different structural sizes in different parts of the fibre.

The different patterns in the background of the different parts of the structures, exemplifies that the behaviour may be further refined by employing different background materials in the fibre. By using different background index in one of the regions of the fibre, it becomes possible to obtain a more desirable combination of the effective index and the slope of the effective index in the working wavelength range of the fibre. This allows more flexibility when tailoring the dispersion of the fibre.

Figure 25:
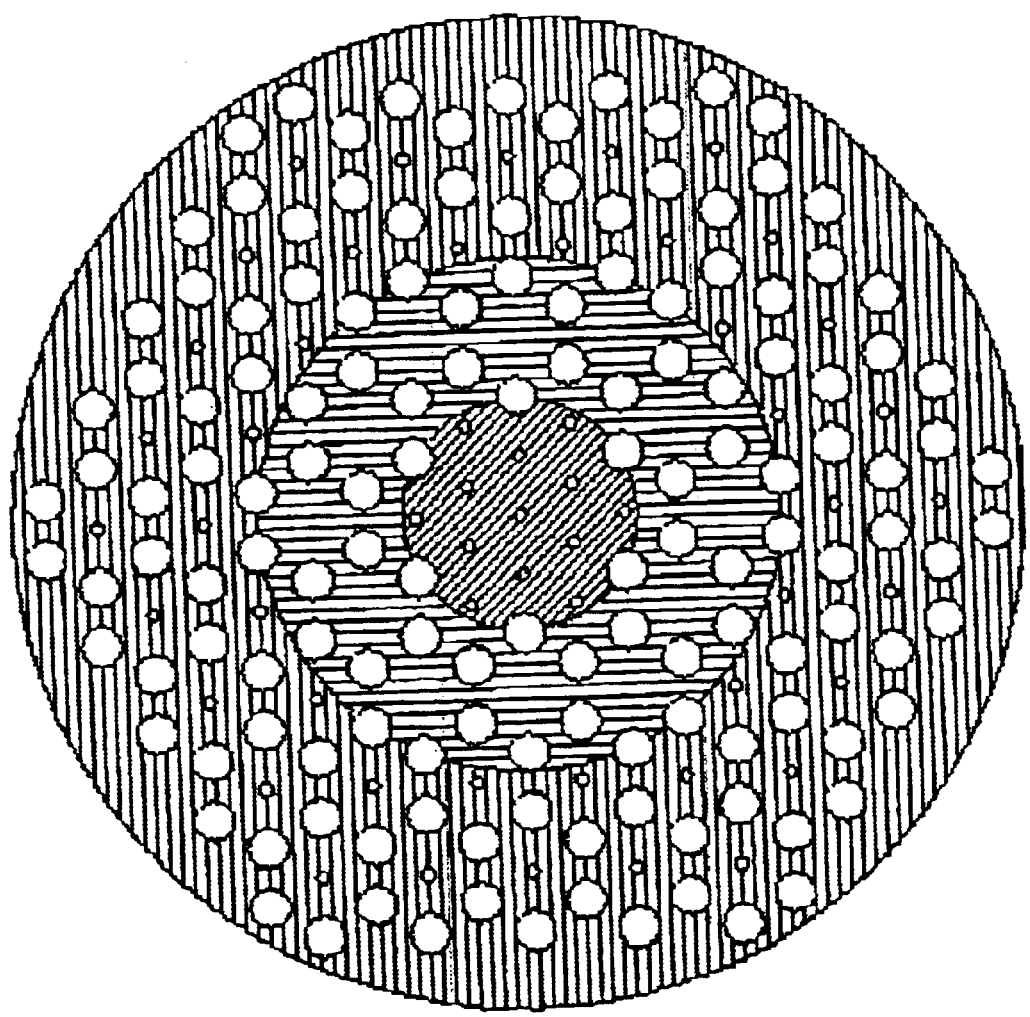
FIG. 25 shows yet another example of a fibre design according to the present invention.

FIG. 25 shows yet another preferred way to obtain a different structural size in different regions of the fibre. Here the typical minimum inter-hole distance is equal in all three parts of the fibre. The core-region has air holes on a triangular lattice and the inner cladding has air holes on a honeycomb lattice. The outer cladding has relatively large air holes on a honeycomb lattice and relatively small air holes in the centres of the honeycombs (on a larger triangular lattice). Even though the typical inter-hole spacing is equal in all parts of the fibre, the typical structural size is much smaller in the core-region compared to the cladding regions. It is therefore possible to obtain effects similar to those found in the structure shown in FIG. 24, using this embodiment.

Again it is illustrated how different parts of the fibre can have different refractive indices of their background material, allowing more flexibility in the design of the fibre. One possible advantage of the design shown in FIG. 25, compared to the other structures shown, is that it becomes possible to have an effective index of the core-region, which is comparable to the effective index of the outer cladding, even at short wavelengths. This makes it easier to keep the fibre single-moded even at short wavelengths.

Those skilled in the art will recognise, that a multitude of structures exist, which has different structural sizes in different parts of the fibre. These structures include: holes on a triangular lattice (as in the core-regions shown in FIG. 24–25), holes on a honeycomb lattice (as the inner cladding shown in FIG. 25), holes on a honeycomb and a triangular lattice (as the outer cladding shown in FIG. 25), holes on a Kagomé lattice (not shown) and holes on a Kagomé and a triangular lattice (not shown).

Figure 26:
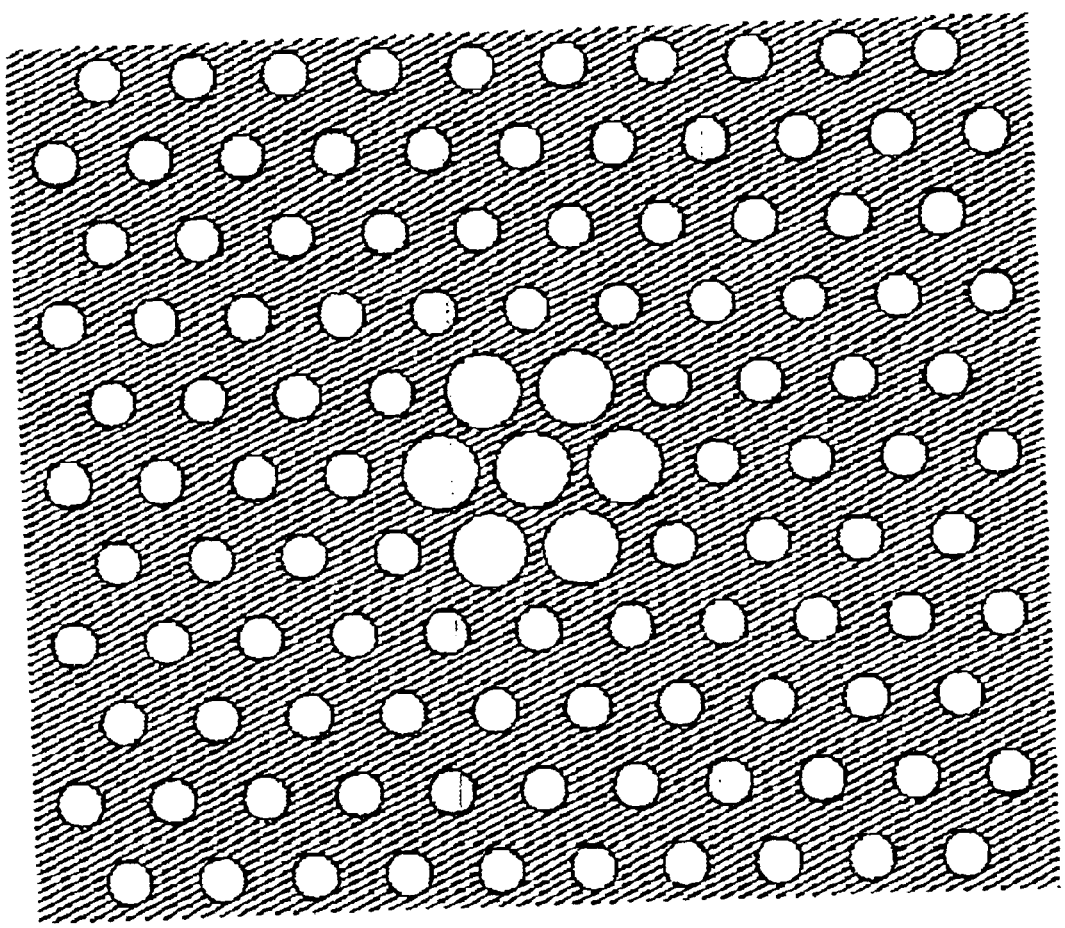
FIG. 26 illustrates schematically another type of fibre design with a micro-structured core region according to the present invention. This type of fibre design is used for fibres operating by PBG effects.

FIG. 26 illustrates schematically another type of fibre design with a micro-structured core region according to the present invention. This type of fibre design is used for fibres operating solely by PBG effects, and it is a requirement that the cladding features (typically air holes) are periodically arranged. The core holes are larger in size than the cladding holes, thereby creating a low-index core region that eliminates any operation by modified total internal reflection index or index guidance.

Figure 27:
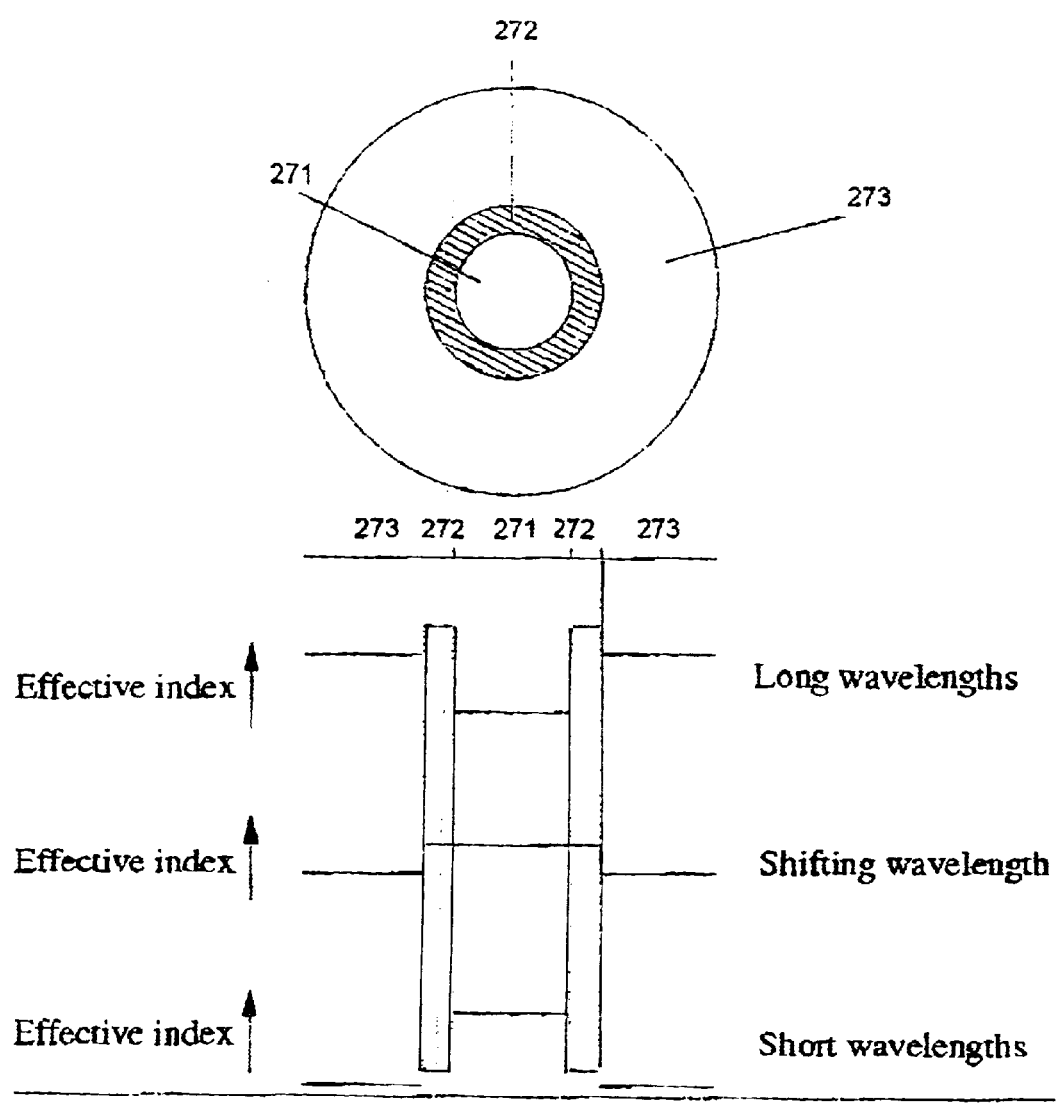
FIG. 27 illustrates schematically the operation of other dispersion compensating fibres disclosed in this application.

The present inventors have further realized that it is possible to realize fibres where the effective refractive indices of the core and the cladding regions behave as illustrated in FIG. 27 with respect to each other as a function of wavelength. At all wavelengths the inner cladding has a higher effective, refractive index than the outer cladding region. The fibre core has the lowest effective refractive index at long wavelengths, an effective refractive index similar to the inner cladding region at the so-called shifting wavelength (being shorter than the above-mentioned wavelength), and the highest effective refractive index at short wavelengths. Fibres with this effective index behaviour of the different regions also provide large tailorability of the dispersion. Especially, the present inventors have realized fibres exhibiting large negative dispersion near the shifting wavelength. An example of a fibre design, which provides the above-described behaviour, is a fibre with the core region comprising a multitude of spaced apart core features being elongated in the axial direction and disposed in a core material, wherein the refractive index of the core features is larger than the refractive index of the inner cladding material, and the refractive index of the core material is lower than the refractive index of the inner cladding material. The fibre may further be characterized by the inner cladding region comprising an inner cladding material with the refractive index being larger than the refractive index of the outer cladding features.

Another example of a fibre providing a shifting wavelength is a fibre, for which the core region comprising a multitude of spaced apart core features being elongated in the axial direction and disposed in a core material, wherein the refractive index of the core features is lower than the refractive index of the inner cladding material, and the refractive index of the core material is larger than the refractive index of the inner cladding material.

Figure 28:
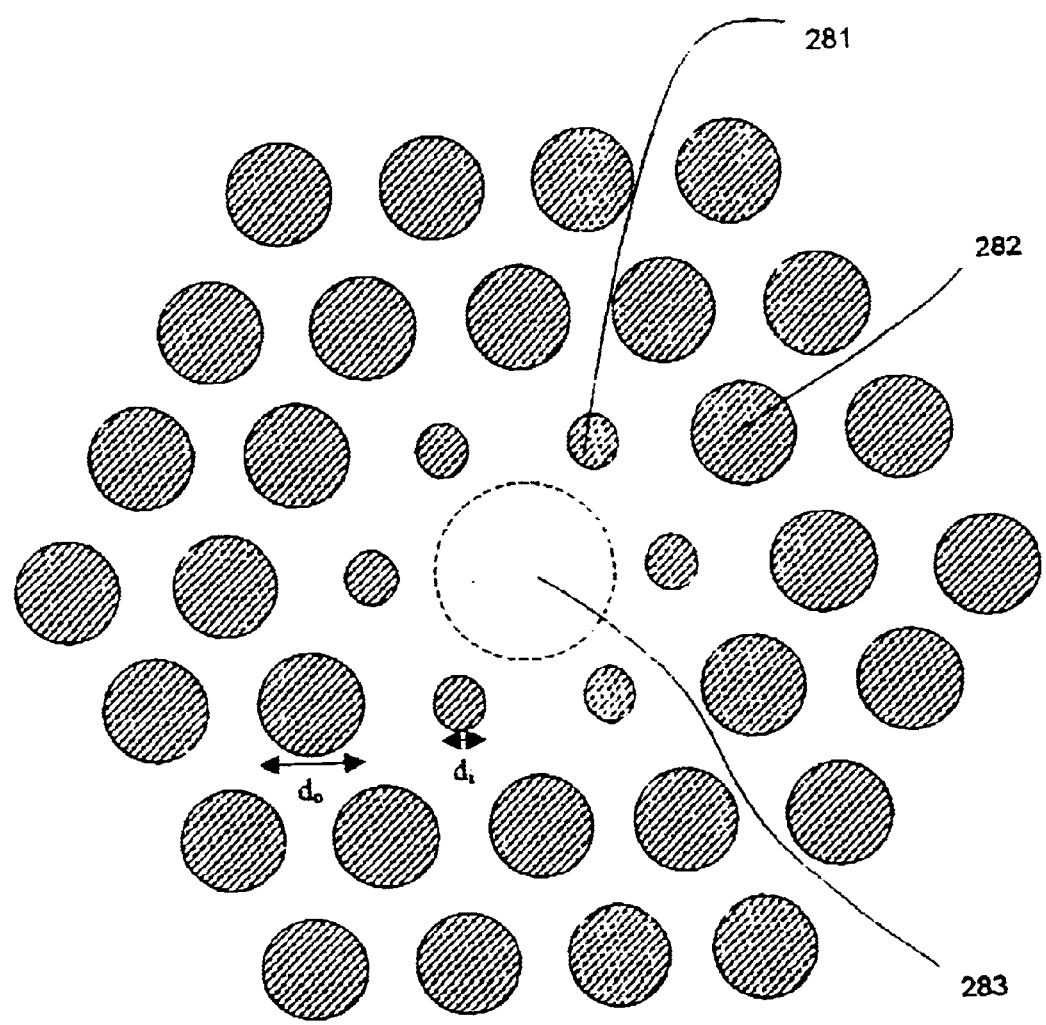
FIG. 28 shows an example of a fibre with a raised, inner cladding for non-linear applications at wavelengths around 1.5 µm.
Figure 29:
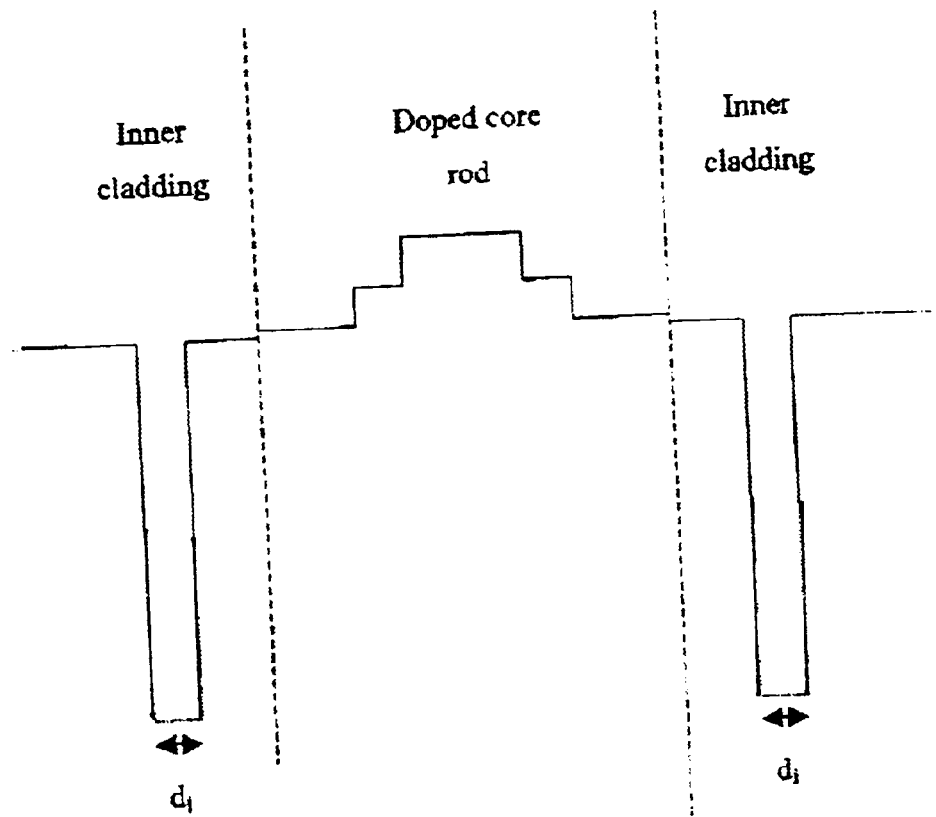
FIG. 29 shows an example of a fibre with a specific core index profile that may be advantageous for non-linear applications.

Fibres according to the present invention may also have simple or complicated core refractive index profiles obtained through conventional doping techniques, such as for example through the use of Modified Chemical Vapour Deposition (MCVD). A wide range of doping profiles may be used for the core—profiles that may either be taken directly from standard fibre technology, such as W-profiles, parabolic profiles, profiles resembling depressed cladding fibre designs etc., or profiles that are unknown for standard fibre technology, but may be of advantages for photonic crystal fibre technology. As an example of a PCF with a special core profile—realizable through conventional doping techniques, a PCF as illustrated in FIG. 28 is given. The fibre has a raised, inner cladding region as the previously studied (using smaller holes (281) compared to larger holes (282) in the outer cladding). A part of the fibre core region (283) has been doped to provide a specific refractive index profile as illustrated in FIG. 29.

The present inventors have further realized that fibres according to the present invention may be used for non-linear applications at wavelength around 1.5 $\mu$m. Apart from providing fibres with a large negative dispersion, the use of an inner, raised cladding also allows to realize PCFs with flat, near-zero or zero dispersion at wavelengths around 1.5 $\mu$m for core sizes smaller than prior art fibres.

For non-linear applications, it is vital to realize fibres with small core sizes—typically with core diameters smaller than 3.5 $\mu$m as well as fibres with flat, near-zero dispersion around the desired operational wavelength(s). Ferrando et al. have presented PCFs with flat, near-zero dispersion for fibres with pitches from around 1.6 $\mu$m to 1.9 $\mu$m—resulting in core diameters of around 3.2 $\mu$m to 3.8 $\mu$m (see Ferrando et al. Electronics Letters, Vol. 35, No. 4, February 1999). The fibres presented by Ferrando et al. are, however, designed for near-zero dispersion at wavelengths around 1.0 $\mu$m. For use at wavelengths around 1.5 $\mu$m, the fibres presented by Ferrando et al. must have a larger pitch resulting in fibres having core diameters larger than 4.5 $\mu$m.

Monro et al. (Journal of Lightwave Technology, Vol. 17, No. 6, June 1999) and Ferrando et al. (See Ferrando et al., Optics Letters, Vol. 25, No. 11, June, 2000) have specifically investigated fibres with flat, near-zero dispersion around 1.55 $\mu$m. Both Monro et al. and Ferrando et al. find flat, near-zero dispersion properties for PCFs with a pitch of 2.3 $\mu$m or larger—resulting in fibre diameters of 4.6 $\mu$m or larger. It is a disadvantage of the fibres presented by Monro et al. and by Ferrando et al. that they do not have flat, near-zero dispersion at wavelengths around 1.5 $\mu$m for pitches smaller than 2.3 $\mu$m. As shall be demonstrated by way of example, the present inventors have realized that the use of a raised, inner cladding may provide PCFs with near-zero, flat dispersion at wavelengths around 1.5 $\mu$m for smaller core sizes than known in the prior art (for pitches smaller than 1.8 $\mu$m—corresponding to core diameters of 3.6 $\mu$m or smaller). PCFs according to the present invention are characterized by a lower threshold for non-linear effects compared to prior art fibres, and will, therefore, be advantageous.

Figure 30:
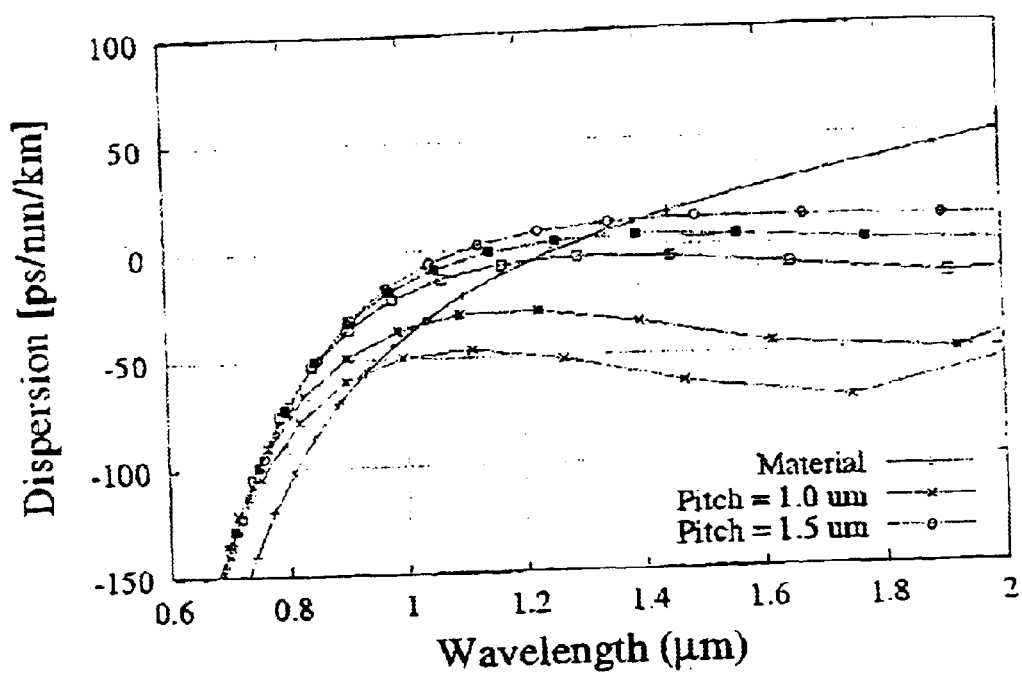
FIG. 30 shows the dispersion properties of series fibres according to the present invention for various pitches.
Figure 31:
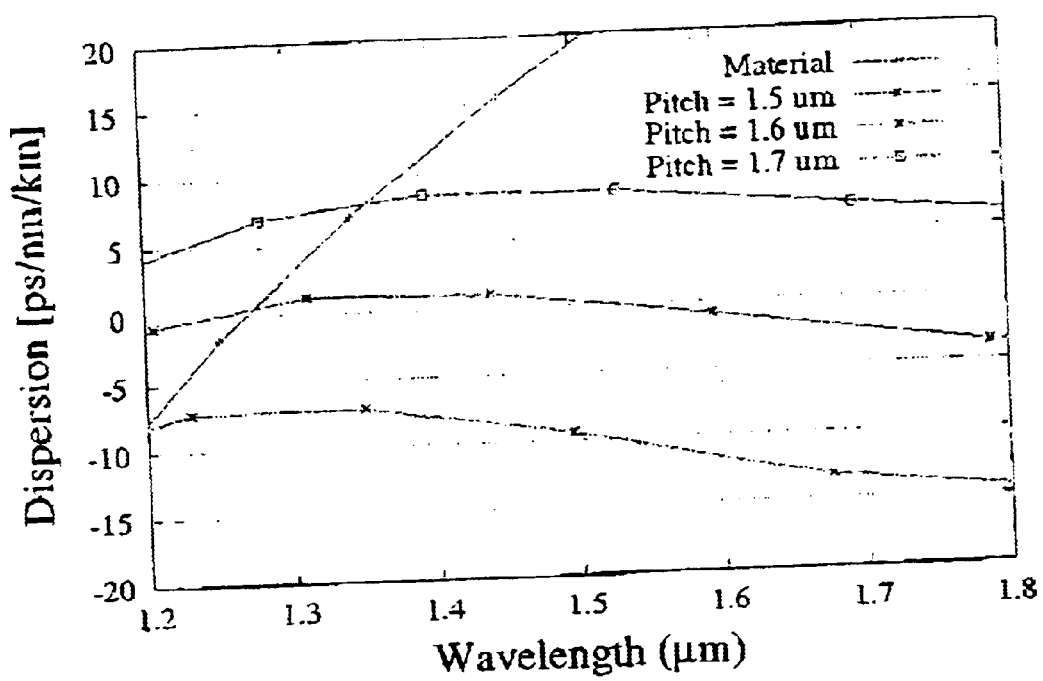
FIG. 31 shows the dispersion properties of another series fibres according to the present invention for various pitches.

To analyse the dispersion properties of fibres with a design as illustrated in FIG. 28 and FIG. 29, a background refractive cladding index of 1.45 (for both cladding regions) and a highest refractive index in the core of 1.47 is chosen. A refractive index value of 1.45 is representative for silica at near-infrared wavelengths and a index increase of 0.02 is feasible with conventional doping techniques. The inner cladding holes (281) have a diameter of 0.3 Λ and the outer cladding holes (282) have a diameter of 0.60 Λ. FIG. 30 illustrates the dispersion properties of such fibres for Λ ranging from 1.0 μm to 1.5 μm. As seen from the figure, a fibre with a small pitch of around 1.4 μm has a near-zero dispersion with a near-zero slope over a (very) broad wavelength range covering wavelengths of at least 1.2 μm to 1.8 μm. A close up of the dispersion properties of a similar fibre, but with outer cladding holes of diameter 0.5 Λ is illustrated in FIG. 31. Also for this fibre a flat, near-zero dispersion is found for small pitches—in this case a pitch of 1.5 μm. The two above-studied fibres with pitches of 1.4 μm and 1.5 μm have core diameters of 2.8 μm to 3.0 μm. This is significantly smaller than for prior art fibres with flat, near zero dispersion at wavelengths around 1.5 μm, and the fibres disclosed in this patent application are, therefore, advantageous for non-linear fibre applications at near-infrared wavelengths.

Figure 32:
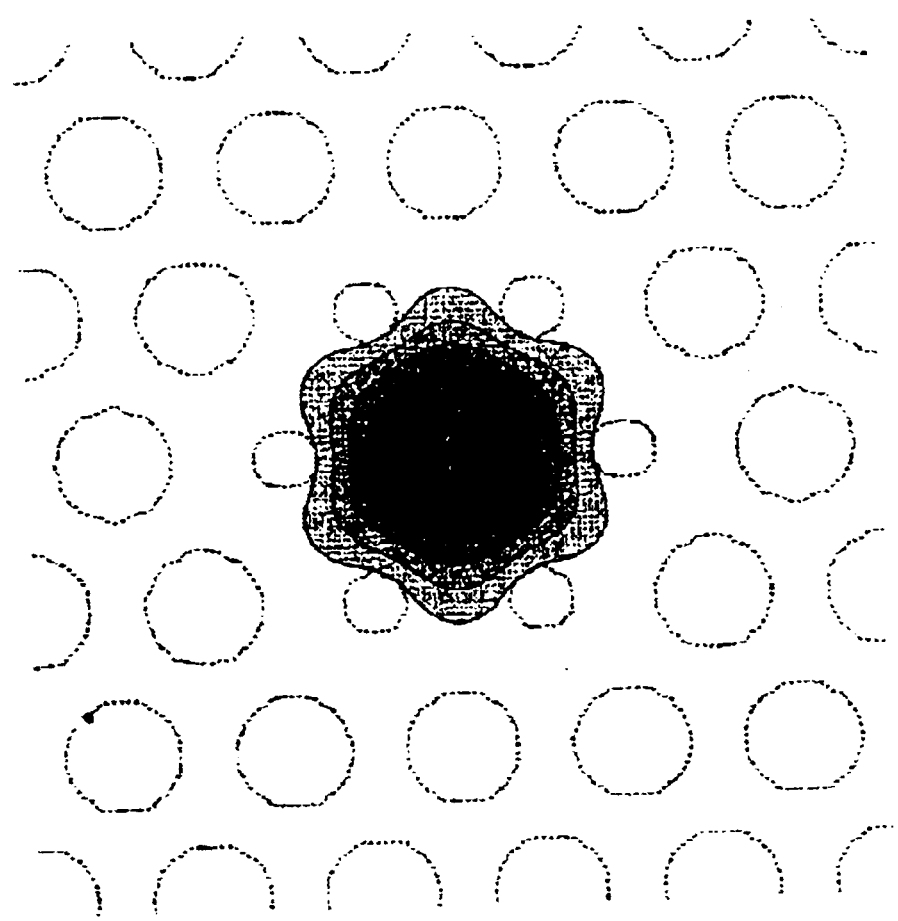
FIG. 32 shows the mode field of a fibre according to the present invention.

FIG. 32 illustrates the field distribution of a guided mode at a wavelength of 1.5 μm. As can be seen from the figure, the mode experiences a strong confinement to the core region.

Due to the higher refractive index of the central part of the core region, the fibre will be further advantageous with respect to splicing as the core may confine light even in the case of partly or fully collapsed holes that may result over a short length of the fibre at a spliced end.

Figure 33:
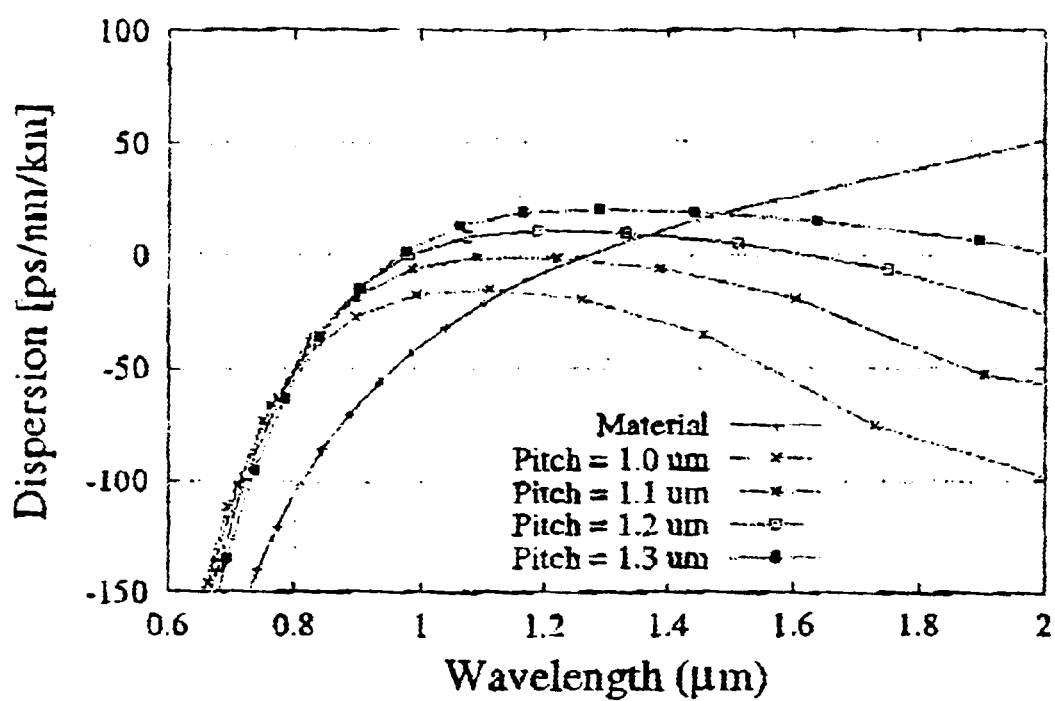
FIG. 33 shows the dispersion properties of yet another series fibres according to the present invention for various pitches.

Although the previous dispersion analysis was done for fibres with a higher refractive index in the central core region compared to the cladding indices, the use of a raised, inner cladding also allows to realize fibres with the desired dispersion properties in the case of a core region having a lower refractive index than the background refractive index of one or both the cladding regions. FIG. 33 illustrates the dispersion properties of a fibre having a design as illustrated in FIG. 28, but the cladding background refractive indices being 0.02 higher than the core background refractive index (the refractive index values of 1.47 and 1.45 were used for the background material of the cladding and core, respectively). As seen from the figure, also this design provides a flat, near-zero dispersion around 1.5 μm for small pitches (Λ of around 1.2 μm). This specific fibre has $d_i$=0.4 Λ and $d_o$=0.7 Λ.

Figure 36:
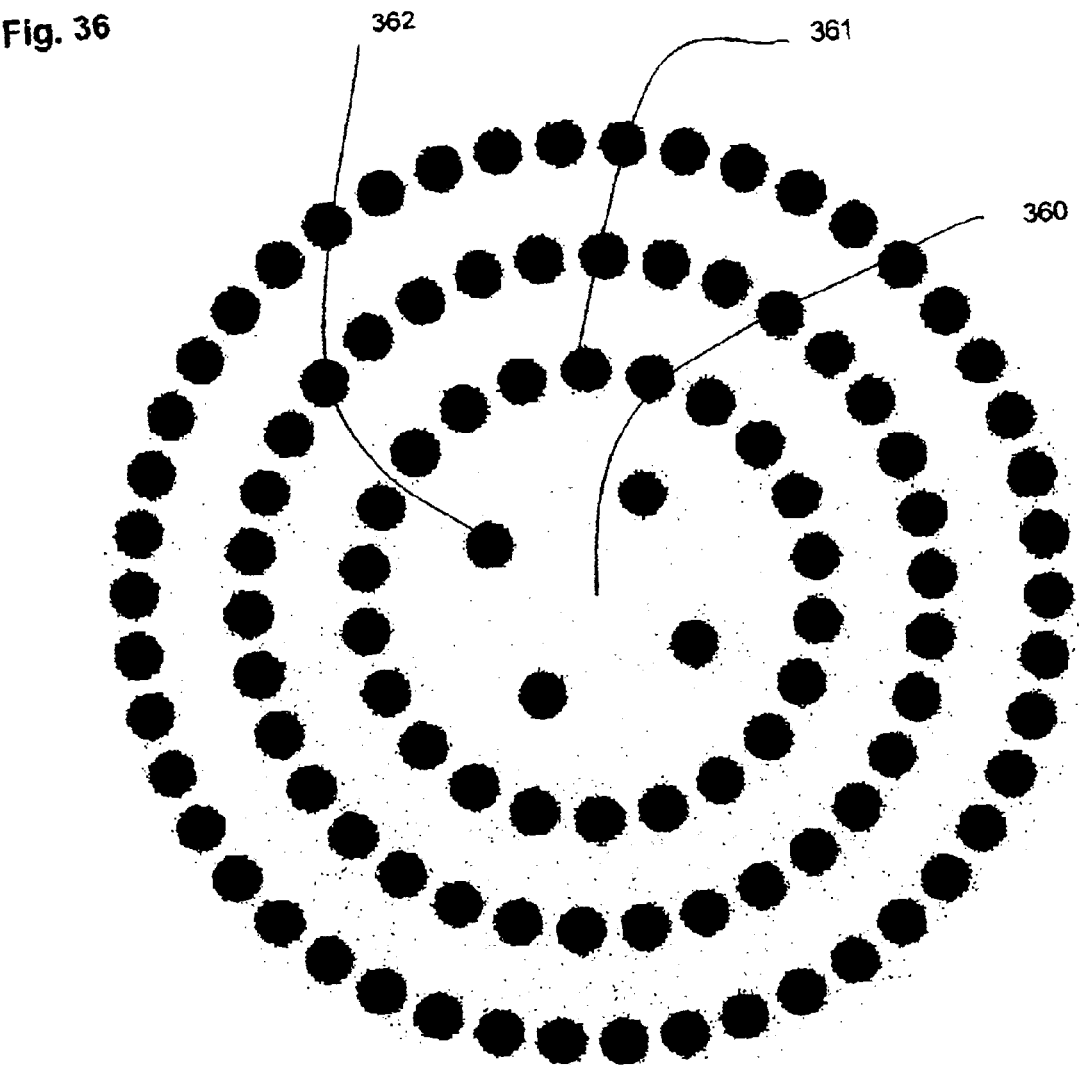
FIG. 36 shows another example of a fibre according to the present invention. The fibre has 4 innermost cladding features providing a raised, inner cladding.
Figure 37A:
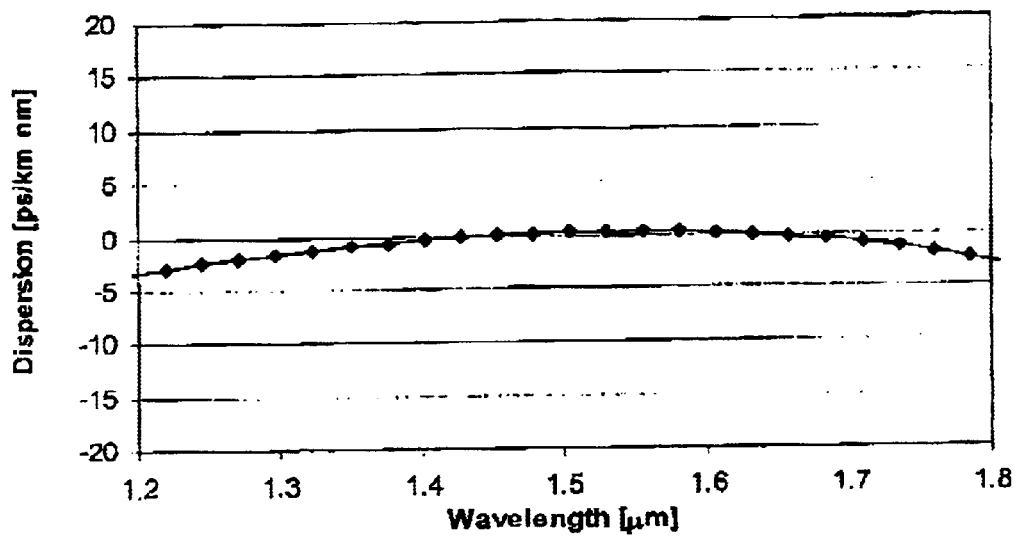
FIG. 37 shows the dispersion properties of the fibre in FIG. 36
Figure 37B:
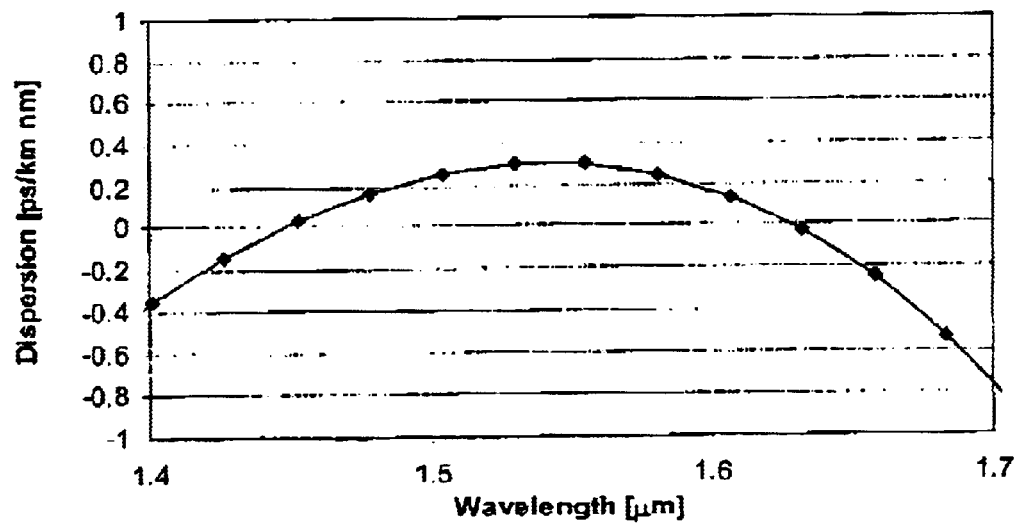
Figure 38:
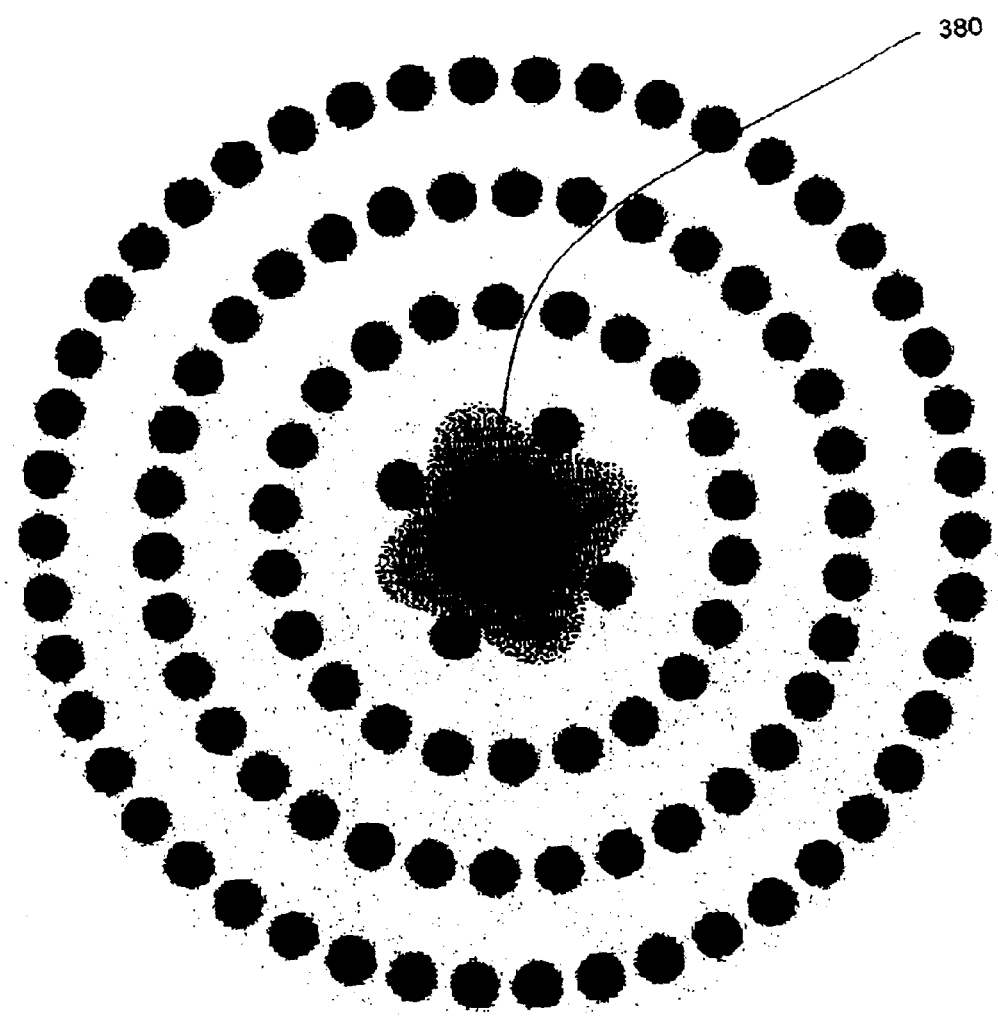
FIG. 38 shows the mode field distribution of the fibre in FIG. 36 at a wavelength of 1.55 µm.

The present inventors have realized yet another range of designs for non-linear fibres with flat, near-zero dispersion at wavelengths around 1.5 μm. An example of the design is illustrated in FIG. 36. The fibres has a low number of innermost cladding features (innermost with respect to the fibre core). In the example in FIG. 36, the fibre has four inner cladding features (362) that surround the core (360). The fibre also comprises outer cladding features (361) arranged in a concentric, annular manner surrounding the core. The outer features do not necessarily need to be position in a concentric manner, but may also be close-packed. Due to the low number of inner cladding features (being lower than six which is the most generally studied case in the prior art), the fibre in FIG. 36 will also have a higher refractive index of the inner cladding compared to the micro-structured region (s) surrounding the inner cladding. The low number of innermost cladding features provides a larger spacing between the innermost cladding features compared to the outer cladding features—and since all cladding features are similar in size, the filling fraction in the inner part of the cladding will be lower than in the outer part. Naturally, in the case of low-index features, this provides a larger effective refractive index of the inner cladding compared to the outer cladding. The present inventors have studied a number of fibres having less than six innermost cladding features (such as 5, 4, 3, and 2 innermost cladding features). As an example of the dispersion properties that may be obtained for such fibres, FIG. 37 shows the dispersion properties of an exemplary fibre with a design as shown in FIG. 36, where the cladding features are air and the cladding background material is pure silica (with a refractive index of 1.45), and the core is solid comprising Ge-doped silica (with a refractive index of 1.47). The cladding features are all similar sized with a diameter of 0.5 μm. The cladding features are arranged in concentric annular regions (rings), and the number of features in each ring (counting from the core) is 4, 22, 34, and 46. The smallest spacing between a centre of a cladding features in one ring to a centre of a cladding feature in another ring being 1.27 μm. The core diameter of the fibre is around 1.8 μm (defined as the distance from a centre of one innermost cladding features to a centre of a second innermost cladding feature—these two innermost cladding features being positioned opposite each other with respect to a centre of the core). As seen from FIG. 37, the fibre exhibits near-zero dispersion over an extremely broad wavelength range—the dispersion varying less than between +0.4 ps/nm/km and −4 ps/nm/km over more than 600 nm (for wavelengths between at least 1.2 μm to 1.8 μm). FIG. 37 shows further a close-up of the dispersion from 1.4 μm to 1.7 μm—the dispersion varying less than from +0.4 ps/nm/km to −0.4 ps/nm/km in the important wavelength range from 1.4 μm to 1.6 μm. At a wavelength of 1.5 μm, the mode field distribution (380) of the guided mode of the fibre is illustrated in FIG. 38. The field has a mode field diameter of only 1.7 μm. This small mode field diameter and the near-zero, flat dispersion of the fibre at wavelengths around 1.5 μm, make the fibre highly attractive for non-linear fibre applications. It is important to understand, that the low number of innermost cladding features acts to provide an effectively higher refractive index of the inner part of the cladding compared to the outer parts of the cladding. This is obtained by having substantially similarly sized inner and outer cladding features, where the spacing between inner cladding features is larger than the spacing between outer cladding features (in the same annular region).

The present invention also covers fibres with less than six innermost cladding features for other types of design than the one shown schematically in FIG. 36, such as fibres with close-packed outer cladding features.

It is a further advantage of the fibre design shown schematically in FIG. 36 that all cladding features in the fibre have identical size (or diameter) due to potential difficulties in controlling cladding features of different size during fibre fabrication. Although various types of pressurizing systems may be employed to control different sized cladding features (as for example for fibres with a design as shown in FIG. 28), it is less demanding to fabricate similar sized-cladding features.

Figure 39:
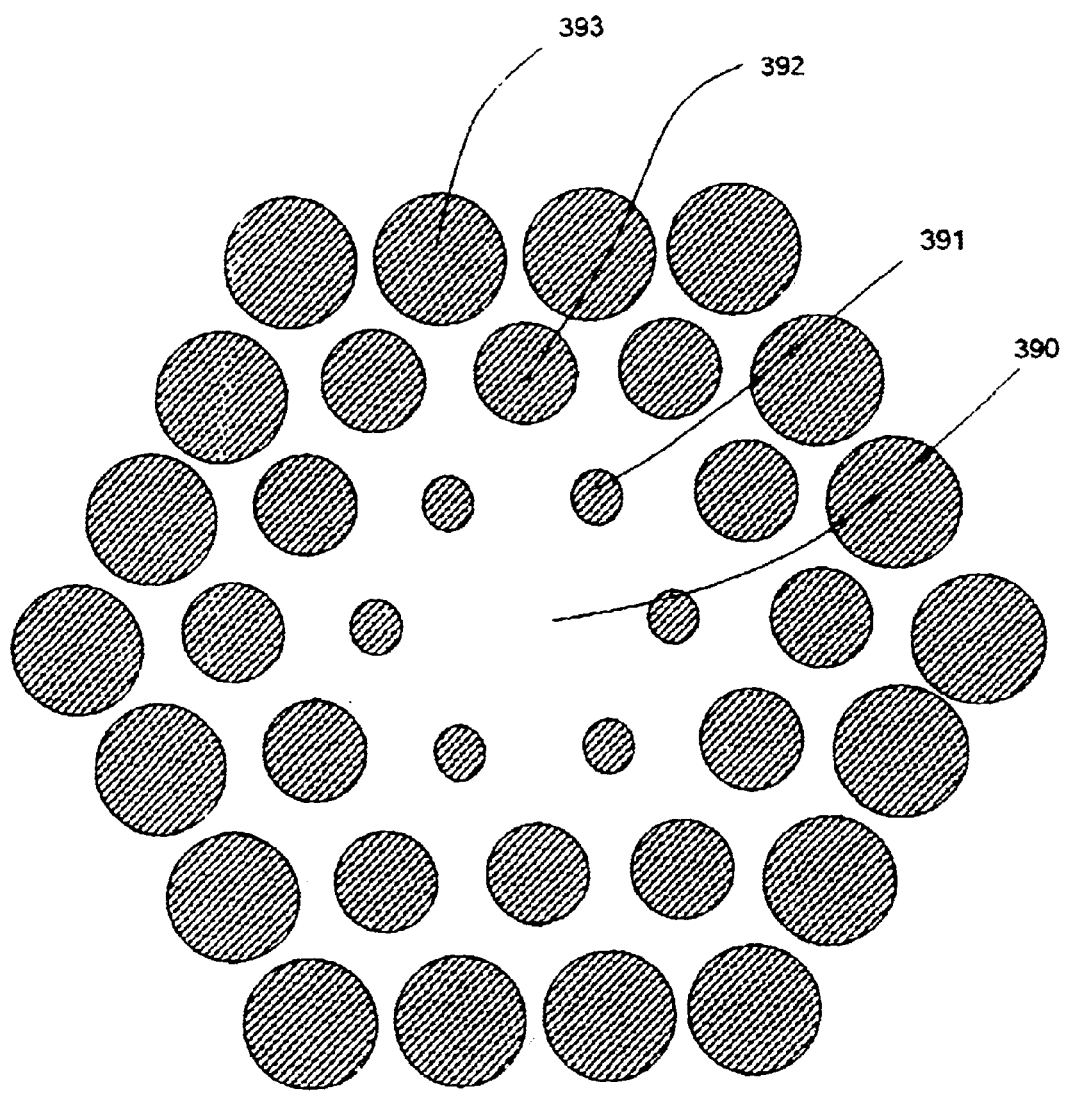
FIG. 39 shows yet another example of a fibre according to the present invention with a raised, inner cladding.

As another example of a fibre according to the present invention, FIG. 39, shows schematically a fibre design, where the cladding features are increasing in size with respect to distance to the centre of the core (390). The inner ring of cladding features (391) has smaller diameter than the outer cladding features (392) that again have smaller diameter than the outermost cladding features (393).

Potential applications of PCFs according to the present invention are: pulse compression (using self phase modulation), soliton generation and propagation, supercontinuum generation around 1.5 μm or other wavelengths, wavelength conversion (using four wave mixing), fibres for narrow bandwidth spectral shaping (using stimulated Brillouin scattering), fibres for wide bandwidth spectral shaping (gain equalising/flattening using cross phase modulation), Raman amplification, etc.

Figure 34:
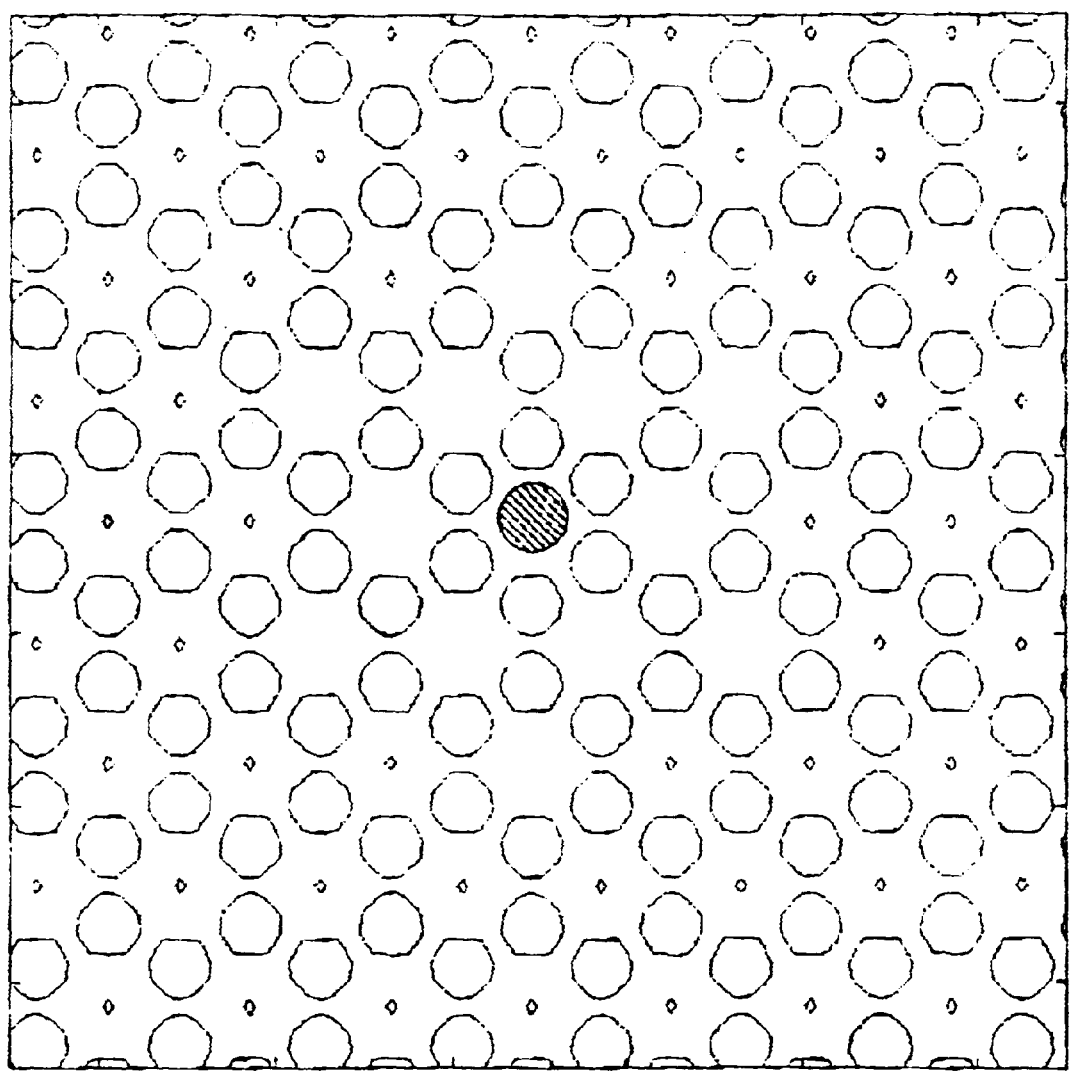
FIG. 34 shows an example of a fibre with a raised, inner cladding for dispersion slope compensation at wavelengths around 1.5 µm.
Figure 35:
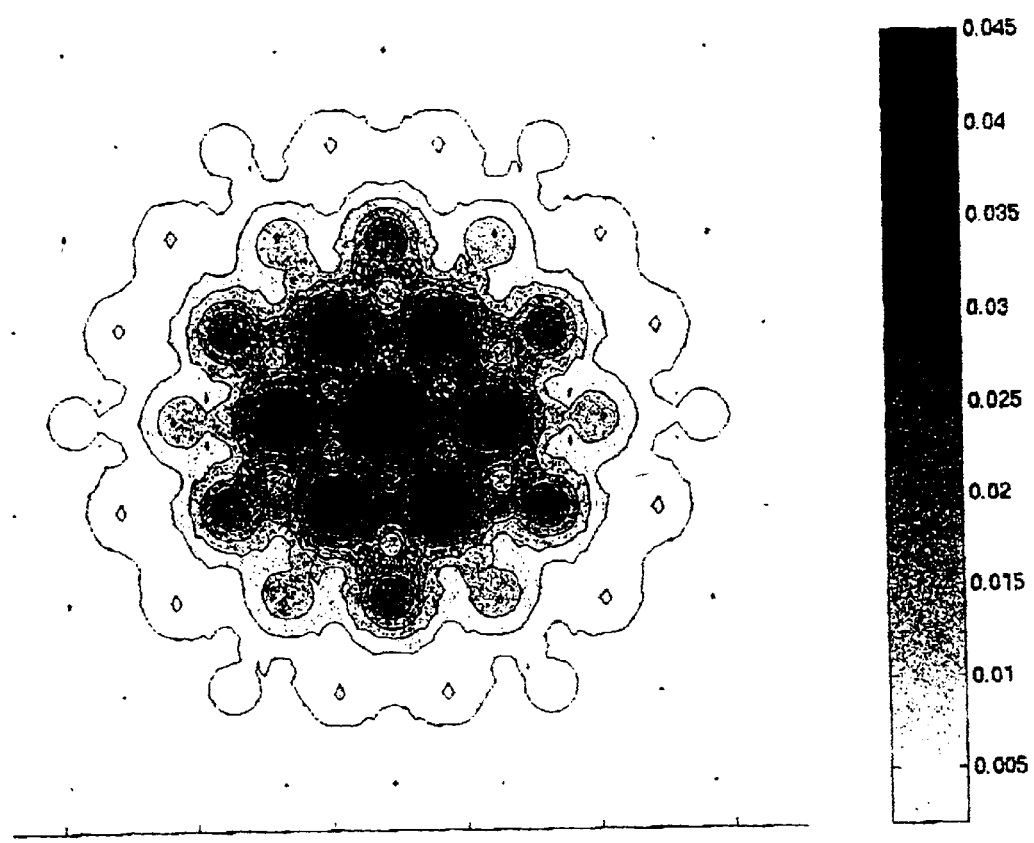
FIG. 35 shows the mode field of a fibre according to the present invention.

Another example of a fibre according to the present invention is illustrated in FIG. 34. A part of the core region (341) has a higher refractive index than the cladding background refractive index. The inner cladding region contains a honeycomb-like micro-structure (342) and the outer cladding region contains a micro-structure resembling the inner cladding structure, but with the addition of small features (343) in the centres of the honeycomb-cells. These small features provide a lower refractive index of the outer cladding region compared to the inner cladding region. The field distribution of the fundamental mode is illustrated in FIG. 35. The fibre has a large negative dispersion slope at wavelengths around for 1.5 μm—making it useful for dispersion slope compensating applications. The centre-to-centre air holes spacing is 1 mm—resulting in a fibre with giving a mode field diameter of around 8 μm.

As polarization properties may play an important role for non-linear fibre applications, it is important to notice that fibres according to the present inventions may be realized with non-symmetric cross-sections—such as e.g. an elliptic core—in order to improve polarization properties of the fibres.

Fibres according to the present invention may be fabricated using techniques that are well known in the prior art of micro-structured fibres. These include stacking of capillary tubes and/or rods to form a preform that may be drawn into fibre using a conventional fibre drawing tower. Alternatively, fibres according to the present invention may be fabricated using extrusion techniques. These fabrication techniques may both be applied to glass based microstructured fibres, such as air-silica, air-chalcogonide, all-glass (using different types of glass or glasses having different dopants) micro-structured fibres, or to micro-structured fibres based on polymer materials.

What is claimed is:

1. A micro-structured optical fibre for transmitting at least a predetermined wavelength of light, said optical fibre having an axial direction and a cross section perpendicular to said axial direction, said optical fibre comprising:
   a core region having a multiplicity of spaced apart core features that are elongated in the fibre axial direction and disposed in a core material, said core region having an effective index of refraction $N_{co}$; and
   a cladding region surrounding said core region, said cladding region comprising a multiplicity of spaced apart cladding features that are elongated in the fibre axial direction and disposed in a first cladding material, and said cladding region having an effective index of refraction $N_{cl}$, wherein a plurality of said cladding features have a cross-sectional dimension perpendicular to said axial direction being larger than said predetermined wavelength, and wherein one or more of said cladding features are voids.

2. A micro-structured optical fibre according to claim 1, wherein the effective index of refraction of the core region, $N_{co}$, is larger than the effective index of refraction of the cladding region, $N_{cl}$, at said predetermined wavelength of light.

3. A micro-structured optical fibre according to claim 1, wherein the refractive index of one or more of the core features is lower than the refractive index of the core material.

4. A micro-structured optical fibre according to claim 3, wherein the refractive index of a majority of the cpre features is lower than the refractive index of the core material.

5. A micro-structured optical fibre according to claim 1, 2 or 3, wherein the refractive index of one or more of the core features is higher than the refractive index of the core material.

6. A micro-structured optical fibre according to claim 1, wherein the refractive index of a majority of the gore features is higher than the refractive index of the core material.

7. A micro-structured optical fibre according to claim 1, wherein the refractive index of one or more of tbe cladding features is lower than the refractive index of the cladding material.

8. A micro-structured optical fibre according to claim 7, wherein the refractive index of a majority of the cladding features is lower than the refractive index of the cladding material.

9. A micro-structured optical fibre according to claim 1, wherein the refractive index of one or more of the cladding features is higher than the refractive index of the cladding material.

10. A micro-structured optical fibre according to claim 1, wherein the refractive index of a majority of ibe cladding features is higher than the refractive index of the cladding material.

11. A micro-structured optical fibre according to claim 1, wherein said predetermined wavelength is selected from wavelength in the interval of 0.3 μm to 2 μm.

12. A micro-structured optical fibre according to claim 11, wherein said predetermined wavelength is selected from wavelengths in the interval of 0.6 μm to 1.2 μm.

13. A micro-structured optical fibre according to claim 12, wherein said predetermined wavelength is selected to be about 0.78 μm, about 0.98 μm, or about 1.06 μm.

14. A micro-structured optical fibre according to claim 11, wherein said predetermined wavelength is selected from wavelengths in the interval of 1.2 μm to 1.6 μm.

15. A micro-structured optical fibre according to claim 14, wherein said predetermined wavelength is selected to be about 1.3 μm.

16. A micro-structured optical fibre according to claim 11, wherein said predetermined wavelength is selected from wavelengths in the interval of 1.5 μm to 1.6 μm.

17. A micro-structured optical fibre according to claim 16, wherein said predetermined wavelength is selected to be about 1.55 μm.

18. A micro-structured optical fibre according to claim 1, wherein said optical fibre is dimensioned to transmit light of said predetermined wavelength in a single mode of propagation.

19. A micro-structured optical fibre according to claim 18, wherein the optical fibre is dimensioned to transmit light in a single mode of propagation for a range of wavelengths below said predetermined wavelength.

20. A micro-structured optical fibre according to claim 19, wherein said range of wavelengths includes wavelengths down to 0.3 μm.

21. A micro-structured optical fibre according to claim 1, wherein a part of or all of the core features have gross-sectional dimensions perpendicular to said axial direction being smaller than the cross-sectional dimensions of the cladding features.

22. A micro-structured optical fibre according to claim 1, wherein a part of or all of the core features have a centre-to-centre spacing being smaller than said predetermined wavelength.

23. A micro-structured optical fibre according to claim 22, wherein a part of or all of the core features have a centre-to-centre spacing being smaller than 0.9 times the predetermined wavelength, such as 0.6 times, such as smaller than 0.4 times, or such as smaller than 0.2 times.

24. A micro-structured optical fibre according to claim 1, wherein a part ot or all of the core features have cross-sectional dimensions perpendicular to said axial direction being smaller than said predetermintd wavelength.

25. A micro-structured optical fibre according to claim 24, wherein a part of or all of the core features have cross-sectional dimensions perpendicular to said axial direction being smaller than 0.9 times the predetermined wavelength, such as 0.6 times, such as smaller than 0.4 times, or such as smaller than 0.2 times.

26. A micro-structured optical fibre according to any of the claims 21–25, wherein the core features have a cross-sectional dimension perpendicular to said axial direction being so large that a second-order mode of propagation is shifted to a wavelength of light being shorter or smaller than said predetermined wavelength.

27. A micro-structured optical fibre according to claim 26, wherein a part of or all of the core features have a cross-sectional dimension being larger than 0.2 $\mu$m.

28. A micro-structured optical fibre according to claim 26, wherein a part of or all of the core features have a cross-sectional dimension perpendicular to said axial direction being so large that the second-order mode of propagation is shifted to a wavelength of light being shorter or smaller than 1.5 $\mu$m, such as smaller than 1.3 $\mu$m, or such as smaller than 1.06 $\mu$m, such as smaller than 0.8 $\mu$m or such as smaller than 0.6 $\mu$m, such as smaller than 0.4 $\mu$m, such as smaller than 0.3 $\mu$m, or such as smaller than 0.2 $\mu$m.

29. A micro-structured optical fibre according to claim 24, wherein a part of or all of the core features have a cross-sectional dimension perpendicular to said axial direction larger than 0.2 $\mu$m, such as in the range of 0.2 $\mu$m to 0.4 $\mu$m, such as in the range of 0.4 $\mu$m to 1.0 $\mu$m, or such as in the range of 1.0 $\mu$m to 1.8 $\mu$m.

30. A micro-structured optical fibre according to claim 2, wherein the fibre has been dimensioned so that the value of the effective index of refraction of the cladding region, $N_{cl}$, is larger than the effective index of refraction of the core region, $N_{co}$, for wavelengths of lights below a shifting wavelength, said shifting wavelength having a value smaller than said predetermined wavelength.

31. A micro-structured optical fibre according to claim 30, wherein said shifting wavelength has a value below 1.5 $\mu$m, such as below 1.3 $\mu$m, such as below 1.06 $\mu$m, such as below 0.8 $\mu$m, such as below 0.6 $\mu$m, or such as below 0.4 $\mu$m.

32. A micro-structured optical fibre according to claim 1, wherein the core features in the cross section occupy in total a ratio $F_c$ of the core region, and the cladding features in the cross section occupy in total a ratio $F_t$ of the cladding region, and $F_o$ is smaller than $F_i$.

33. A micro-structured optical fibre according to claim 1, wherein the cladding features are periodical features.

34. A micro-structured optical fibre according to claim 33, wherein the effective index of refraction of the core region, $N_{co}$, is lower than the effective index of refraction of the cladding region, $N_{cl}$, at said predetermined wavelength of light.

35. A micro-structured optical fibre according to any claims 33 or 34, wherein the core features have cross-sectional dimensions perpendicular to said axial direction being larger than the cross-sectional dimensions of the cladding features.

36. A micro-structured optical fibre according to claim 33, wherein the core features in the cross section occupy in total a ratio $F_c$ of the core region, and the cladding features in the cross section occupy in total a ratio $F_i$ of the cladding region, and $F_o$ is larger than $F_i$.

37. A micro-structured optical fibre according to claim 1, wherein the core features have a centre-to-centre spacing being substantially equal to the centre-to-centre spacing of the cladding features.

38. A micro-structured optical fibre according to claim 1, wherein the core features have a centre-to-centre spaqing being smaller than the centre-to-centre spacing of the cladding features.

39. A micro-structured optical fibre according to claim 1, wherein the number of core features is larger than 2, such as larger than 5, such as larger than 17.

40. A micro-structured optical fibre according to claim 1, wherein the number of core features is equal to 7 or equal to 13 or equal to 19.

41. A micro-structured optical fibre according to claim 1, wherein the refractive index of the core material is lower than the refractive index of the cladding material.

42. A micro-structured optical fibre according to claim 1, wherein the refractive index of the core material is substantially equal to the refractive index of the cladding material.

43. A micro-structured optical fibre according to claim 1, wherein the refractive index of the core material is higher than the refractive index of the cladding material.

44. A micro-structured optical fibre according to claim 42, wherein the core material and the cladding material are made of the same material.

45. A micro-structured optical fibre according to claim 1, wherein at least 60%, such as at least 80%, or such as all of the cladding features have a cross-sectional dimension perpendicular to said axial direction being larger than the wavelength of light guided by said fibre.

46. A micro-structured optical fibre according to claim 1, wherein the core region has a diameter larger than 2 $\mu$m.

47. A micro-structured optical fibre according to claim 46, wherein the core region has a diameter in the range of 2–50 $\mu$m, such as in the range from 2–5 $\mu$m, such as in the range from 5–10 $\mu$m, such as in the range from 10–25 $\mu$m, such as in the range from 25–50 $\mu$m.

48. A micro-structured optical fibre according to claim 1, wherein the cladding features have a diameter or a cross-sectional dimension being larger than 0.45 times the centre-to-centre spacing of said cladding features, such as larger than 0.6 times the cladding feature spacing, or such as larger than 0.9 times the cladding feature spacing.

49. A micro-structured optical fibre according to claim 1, wherein the cladding features occupy at least 25% of the cross-section of the cladding region, such as more than 40%, such as more than 50%, such as more than 60%, such as more than 70%, such as more than 80%.

50. A micro-structured optical fibre according to claim 1, wherein the core features occupy more than 5% of the cross-section of the core region, such as more than 10%, such as more than 25%, such as more than 50%, such as more than 75%.

51. A micro-structured optical fibre according to claim 1, wherein the core features are periodical features.

52. A micro-structured optical fibre according to claim 1, wherein the spacing of the core features and/or the cladding features are in the range of about 0.2 $\mu$m to 10 $\mu$m.

53. A micro-structured optical fibre according to claim 1, wherein the core material and/or the first cladding material is silica.

54. A micro-structured optical fibre according to claim 1, wherein one or more of the core features are rods.

55. A micro-structured optical fibre according to claim 54, wherein a majority or all of the core features are rods.

56. A micro-structured optical fibre according to claim 1, wherein one or more of the cladding features are rods.

57. A micro-structured optical fibre according to claim 56, wherein a majority or all of the cladding features are rods.

58. A micro-structured optical fibre according to any of the claims 55–57, wherein some or all of the rods of the core features and/or the cladding features are made of silica.

59. A micro-structured optical fibre according to claim 58, wherein one or more of the silica core features and/or cladding features are doped with one or more materials selected from a list comprising: Ge, Al, F, Er, Yb, Nd, La.

60. A micro-structured optical fibre according to claim 1, wherein one or more of the core features are voids.

61. A micro-structured optical fibre according to claim 1 or 56, wherein a majority or all of the core features are voids.

62. A micro-structured optical fibre according to claim 1, wherein a majority or all of the cladding features are voids.

63. A micro-structured optical fibre according to claim 60, wherein the voids of the core region and/or the cladding region contain air, another gas, or a vacuum.

64. An article according to claim 60, wherein any of the core features and/or the cladding features are voids containing polymer(s), a material providing an increased third-order non-linearity, a photo-sensitive material, or a rare earth material.

65. An article comprising a micro-structured optical fibre for guiding light at an operating wavelength, said optical fibre having an axial direction and a cross section perpendicular to said axial direction, the optical fibre comprising: a core region having an effective refractive index $N_{co}$ and being surrounded by a cladding region comprising a multiplicity of spaced apart cladding features being elongated in the axial direction and disposed in a first cladding material, the cladding features having a refractive index that differs from a refractive index of the first cladding material, the cladding region further comprising an inner cladding region surrounding the core region and an outer cladding region surrounding the inner cladding region, the inner cladding region having an effective refractive index $N_i$ and the outer cladding region having an effective refractive index $N_o$, with $N_i$ being larger than $N_o$ at the operating wavelength, wherein the inner cladding region comprises the first cladding material and the cladding features disposed therein, the first cladding material thereby constituting an inner cladding material and the cladding features disposed in the first cladding material constituting a multiplicity of spaced apart inner cladding features.

66. An article according to claim 65, wherein the outer cladding region comprises a multiplicity of spaced apart outer cladding features being elongated in the axial direction and disposed in an outer cladding material, the outer cladding features having a refractive index that differs from a refractive index of the outer cladding material.

67. An article comprising a micro-structured optical fibre for guiding light at an operating wavelength, said optical fibre having an axial direction and a cross section perpendicular to said axial direction, the optical fibre comprising a core region surrounded by an inner cladding region that comprises a multiplicity of spaced apart inner cladding features that are elongated in the axial direction and disposed in an inner cladding material, the inner cladding region being surrounded by an outer cladding region that comprises a multiplicity of spaced apart outer cladding features that are elongated in the axial direction and disposed in an outer material, the inner cladding features having a refractive index that differs from a refractive index of the inner cladding material and the inner cladding region having an effective refractive index $N_i$, and the outer cladding features having a refractive index that differs from a refractive index of the outer cladding material and the outer cladding region having an effective refractive index $N_o$, wherein $N_i$ is larger than $N_o$ at the operating wavelength.

68. An article according to claim 67, wherein the core region has an effective refractive index $N_{co}$, the difference between $N_{co}$ and $N_i$ being a function of the wavelength of the guided light so that the effective index of the core region $N_{co}$ is substantially equal to the effective index of the inner cladding region $N_i$ at a wavelength referred to as the shifting wavelength, and wherein $N_i$ is larger than $N_o$ for operating wavelengths equal to or below said shifting wavelength.

69. An article according to claim 68, wherein $N_{co}$ is larger than $N_i$ for at least a range of wavelengths longer than the shifting wavelength, and $N_{co}$ is lower than $N_i$ for at least a range of wavelengths shorter than the shifting wavelength.

70. An article according to claim 68, wherein $N_{co}$ is lower than $N_i$ for at least a range of wavelengths longer than the shifting wavelength, and $N_{co}$ is higher than $N_i$ for at least a range of wavelengths shorter than the shifting wavelength.

71. An article according to claim 69 or 70, wherein $N_i$ is larger than $N_o$ for a range of wavelengths above the shifting wavelengths.

72. An article according to claim 67, wherein the core region is a substantially solid core made of a core material and having an effective refractive index $N_{co}$ being substantially equal to the refractive index of the core material.

73. An article according to claim 67, wherein the core region comprises a multitude of spaced apart core features being elongated in the axial direction and disposed in a core material.

74. An article according to claim 67, wherein all or at least part of the inner cladding features have a cross-sectional dimension being smaller than a cross-sectional dimension of the outer cladding features.

75. An article according to claim 67, wherein the centre-to-centre spacing between inner and outer cladding features is substantially identical.

76. An article according to claim 67, wherein the refractive index of the core material is lower than the refractive index of the inner cladding region material.

77. An article according to claim 67, wherein the inner cladding features in the cross-section occupy in total a ratio, $F_i$, of the inner cladding region and the outer cladding features in the cross-section occupy in total a ration, $F_o$, of the outer cladding region, and $F_i$ is smaller than $F_o$.

78. An article according to claim 67, wherein all or at least part of the inner cladding features have a cross-sectional dimension being substantially identical to a cross-sectional dimension of all or at least part of the outer cladding features.

79. An article according to claim 78, wherein the centre-to-centre spacing between inner cladding features is larger than the centre-to-centre spacing between outer cladding features.

80. An article according to claim 67, wherein the number of inner cladding features is lower than 6, such as equal to 4, such as equal to 3, such as equal to 2.

81. An article according to claim 67, wherein the refractive index of the inner cladding material is substantially identical to or larger than the refractive index of the outer cladding material.

82. An article according to claim 67, wherein the refractive index of the inner cladding material is larger than the refractive index of the outer cladding material and the inner cladding features in the cross-sectional occupy an area, $F_i$, of the inner cladding region and the outer cladding features in the cross-sectional occupy an area, $F_o$, of the outer cladding region, and $F_i$ is equal to or larger than $F_o$.

83. An article according to claim 67, wherein the refractive index of one or more of the inner cladding features is higher than the refractive index of the inner cladding material.

84. An article according to claim 83, wherein the refractive index of a majority or all of the inner cladding features is higher than the refractive index of the inner cladding material.

85. An article according to claim 67, wherein the refractive index of one or more of the inner cladding features is lower than the refractive index of the inner cladding material.

86. An article according to claim 85, wherein the refractive index of a majority or all of the inner cladding features is lower than the refractive index of the inner cladding material.

87. An article according to claim 65, wherein the outer cladding region comprises the first cladding material and the cladding features disposed therein, the first cladding material thereby constituting an outer cladding material and the cladding features disposed in the first cladding material constituting a multiplicity of spaced apart outer cladding features.

88. An article according to claim 87, wherein the core region comprises a multitude of spaced apart core features being elongated in the axial direction and disposed in a core material.

89. An article according to claim 88, wherein the refractive index of the core features is larger than the refractive index of the inner cladding material, and the refractive index of the core material is lower than the refractive index of the inner cladding material.

90. An article according to claim 88, wherein the refractive index of the core features is lower than the refractive index of the inner cladding material, and the refractive index of the core material is larger than the refractive index of the inner cladding material.

91. An article according to claim 88, wherein the inner cladding region comprises an inner cladding material with the refractive index of said inner cladding material being larger than the refractive index of the outer cladding features.

92. An article according to claim 91, wherein the refractive index of the inner cladding material is about equal to or larger than the refractive index of the outer cladding material.

93. An article according to claim 67, wherein the refractive index of one or more of the outer cladding features is higher than the refractive index of the outer cladding material.

94. An article according to claim 93, wherein the refractive index of a majority or all of the outer cladding features is higher than the refractive index of the outer cladding material.

95. An article according to claim 67, wherein the refractive index of one or more of the outer cladding features is lower than the refractive index of the outer cladding material.

96. An article according to claim 95, wherein the refractive index of a majority or all of the outer cladding features is lower than the refractive index of the outer cladding material.

97. An article according to claim 73 or 88, wherein the refractive index of one or more of the core features is higher than the refractive index of the core material.

98. An article according to claim 73 or 88, wherein the refractive index of one or more of the core features is lower than the refractive index of the core material.

99. An article according to claim 65 or 77, wherein the refractive index of the core material is substantially identical to the refractive index of the inner cladding region material.

100. An article according to claim 65, wherein the refractive index of the core material is substantially identical to the refractive index of the outer cladding region material.

101. An article according to claim 73, wherein the core features have a cross-sectional dimension that is smaller than a cross-sectional dimension of the inner cladding features.

102. An article according to claim 73, wherein the core features have a centre-to-centre spacing that is smaller than the centre-to-centre spacing of the inner cladding features.

103. An article according to claim 66, wherein the outer cladding features occupy more than 30% of the cross-section of the outer cladding region, such as more than 40% such as more than 50%, such as more than 60%, such as more than 70%, such as more than 80%.

104. An article according to claim 65, wherein the inner and/or outer cladding features are periodically disposed.

105. An article according to claim 73 or 88, wherein the core features are periodical core features.

106. An article according to claim 65, wherein the core has a diameter larger than 2 μm.

107. An article according to claim 106, wherein the core diameter is in the interval from 2 to 10 μm, such as in the interval from 4 to 6 μm.

108. An article according to claim 65, wherein the inner and/or outer cladding features have a spacing in the range of about 0.1 to 10 times the wavelength of any light guided through the fibre, such as in the range of about 0.5 to 1, such as in the range of about 1 to 2, such as in the range of about 2 to 5, such as in the range of about 5 to 10.

109. An article according to claim 73 or 88, wherein the core features have a spacing in the range of about 0.1 to 10 times the wavelength of any light guided through the fibre, such as in the range of about 0.5 to 1, such as in the range of about 1 to 2, such as in the range of about 2 to 5, such as in the range of about 5 to 10.

110. An article according to claim 73 or 88, wherein the core features have a spacing in the range of about 0.1 μm to 10 μm, such as in the range of about 0.5 μm to 1 μm, such as in the range of about 1 μm to 2 μm, such as in the range of about 2 μm to 5 μm, such as in the range of about 5 μm to 10 μm.

111. An article according to claim 73 or 88, wherein one or more of the core features are voids.

112. An article according to claim 111, wherein a majority or all of the core features are voids.

113. An article according to claim 65 or 93, wherein one or more of the inner cladding features are voids.

114. An article according to claim 113, wherein a majority or all of the inner cladding features are voids.

115. An article according to claim 66, wherein one or more of the outer cladding features are voids.

116. An article according to claim 115, wherein a majority or all of the outer cladding features are voids.

117. An article according to claim 111, wherein one or more of the core features and/or the cladding features are voids containing air, another gas, or a vacuum.

118. An article according to claim 73, wherein one or more of the core features are rods.

119. An article according to claim 118, wherein a majority or all of the core features are rods.

120. An article according to claim 65, wherein one or more of the inner cladding features are rods.

121. An article according to claim 120, wherein a majority or all of the inner cladding features are rods.

122. An article according to claim 66, wherein one or more of the outer cladding features are rods.

123. An article according to claim 122, wherein a majority or all of the outer cladding features are rods.

124. An article according to claim 111, wherein one or more of the core features and/or the cladding features are voids containing polymer(s), a material providing an increased third-order non-linearity, a photo-sensitive material, or a rare earth material.

125. An article according to claim 1, wherein the fibre guides light at a predetermined wavelength in a single mode.

126. An article according to claim 125, wherein said predetermined wavelength is in the range from about 0.3 $\mu$m to 15 $\mu$m.

127. An article according to claim 126, wherein the fibre guides light at several predetermined wavelengths.

128. An article according to claim 65 or 66, wherein the core region is a substantially solid core made of a core material and having an effective refractive index $N_{co}$ being larger than $N_i$ at the operating wavelength.

129. An article comprising a micro-structured optical fibre for guiding light at an operating wavelength, said optical fibre having an axial direction and a cross section perpendicular to said axial direction, the optical fibre comprising a core region having an effective refractive index $N_{co}$ and being surrounded by an inner cladding region that comprises a multiplicity of spaced apart inner cladding features that are elongated in the axial direction and disposed in an inner cladding material, the inner cladding region being surrounded by an outer cladding region that comprises a multiplicity of spaced apart outer cladding features that are elongated in the axial direction and disposed in an outer material, the inner cladding features having a refractive index that differs from a refractive index of the inner cladding material and the inner cladding region having an effective refractive index $N_i$, and the outer cladding features having a refractive index that differs from a refractive index of the outer cladding material and the outer cladding region having an effective refractive index $N_o$, wherein:

$N_i$ is larger than $N_o$ at the operating wavelength, the core region is a substantially solid core with a core diameter around or below 4 $\mu$m and with an effective refractive index $N_{co}$ being larger than $N_i$ at the operating wavelength, the centre to centre spacing or pitch of the inner cladding features, $\Lambda_i$, is around or below 2 $\mu$m, the inner cladding features have a diameter or cross sectional dimension, $d_i$, fulfilling the requirement that $d_i/\Lambda_i$ is equal to or below 0.7 and equal to or above 0.2, the centre to centre spacing or pitch of the outer cladding features, $\Lambda_o$, is around or below 2 $\mu$m, and the outer cladding features have a diameter or cross sectional dimension, $d_o$, fulfilling the requirement that $d_o/\Lambda_o$ is equal to or above 0.4.

130. An article according to claim 129, wherein $N_{co}$ is larger than $N_i$ for all wavelengths of optical radiation which can be guided by the micro-structured fibre.

131. An article according to claim 129, wherein the effective refractive index difference between the core region and the inner cladding region is greater than about 5%.

132. An article according to claim 129, wherein the core region and the inner cladding region are mutually adapted so that the micro-structured fibre exhibits a substantially zero dispersion or near-zero dispersion wavelength within the range of 1.2 $\mu$m to 1.8 $\mu$m, such as within the range of 1.48 $\mu$m to 1.62 $\mu$m, such as within the range of 1.52 $\mu$m to 1.58 $\mu$m.

133. An article according to claim 129, wherein the centre to centre spacing or pitch of the inner cladding features, $\Lambda_i$, is around or below 2 $\mu$m, such as around or below 1.5 $\mu$m, such as around 1.4 $\mu$m, or in the range of 1 $\mu$m to 2 $\mu$m, such as in the range of 1 $\mu$m to 1.5 $\mu$m.

134. An article according to claim 129, wherein the number of inner cladding features is higher than or equal to 6.

135. An article according to claim 134, wherein the inner cladding features have a diameter or cross sectional dimension, $d_i$, and a centre to centre spacing or pitch, $\Lambda_i$, fulfilling the requirement that $d_i/\Lambda_i$ is in the range from 0.2 to 0.4, such as about 0.3.

136. An article according to claim 129, wherein the centre to centre spacing or pitch of the outer cladding feature $\Lambda_o$, is substantially equal to the centre to centre spacing or pitch of the inner cladding features, $\Lambda_i$.

137. An article according to claim 129, wherein all or at least part of the inner cladding features have a diameter or cross-sectional dimension being substantially identical to a diameter or cross-sectional dimension of all or at least part of the outer cladding features.

138. An article according to claim 137, wherein the number of inner cladding features is lower than 6, such as equal to 4, such as equal to 3, such as equal to 2.

139. An article according to claim 129, wherein the centre to centre spacing between inner cladding features $\Lambda_i$ is larger than the centre to centre spacing between outer cladding features $\Lambda_o$.

140. An article according to claim 139, wherein the inner cladding features have a diameter or cross sectional dimension, $d_i$, and a centre to centre spacing or pitch, $\Lambda_i$, fulfilling the requirement that $d_i/\Lambda_i$ is in the range from 0.25 to 0.5.

141. An article according to claim 139, wherein the inner cladding features have a diameter or cross sectional dimension, $d_i$, fulfilling the requirement that $d_i/\Lambda_i$ is in the range from 0.28 to 0.57.

142. An article according to claim 139, wherein the inner cladding features have a diameter or cross sectional dimension, $d_i$, and a centre to centre spacing or pitch, $\Lambda_i$, fulfilling the requirement that $d_i/\Lambda_i$ is in the range from 0.35 to 0.7.

143. An article according to claim 129, wherein the centre to centre spacing or pitch of the outer cladding features, $\Lambda_o$, is around or below 2 $\mu$m, such as around or below 1.5 $\mu$m, such as around 1.4 $\mu$m, or in the range of 1 $\mu$m to 2 $\mu$m, such as in the range of 1 $\mu$m to 1.5 $\mu$m.

144. An article according to claim 142 or 143, wherein the outer cladding features have a diameter or cross sectional dimension, $d_o$, fulfilling the requirement that $d_o/\Lambda_o$ is equal to or below 0.7 and equal to or above 0.4, such as about 0.5 or such as about 0.6.

145. An article according to claim 129, wherein the core has a diameter around or below 4 $\mu$m, such as around or below 3.6 $\mu$m, such as around or below 2 $\mu$m, such as around or below 1.5 $\mu$m.

146. An article according to claim 129, wherein the refractive index of the core region is varying along the diameter of the core region so that an inner and/or a central portion of the core has a higher refractive index than an outer portion of the core.

147. An article according to claim 146, wherein the inner and/or central portion of the core comprises one or more rods having a higher refractive index than the background index of the core or the outer portion of the core.

148. An article according to claim 146, wherein the inner and/or central portion of the core has a higher refractive index than the refractive index of the inner cladding material and/or the outer cladding material.

149. An article according to claim 129, wherein at least part of the core region has a refractive index being substantially identical to the refractive index of the inner and/or outer cladding region material.

150. An article according to claim 129, wherein at least part of the core region has a refractive index being larger than the refractive index of the inner and/or outer cladding region material.

151. An article according to claim 129, wherein at least part of the core region has a lower refractive index than the refractive index of the inner cladding material and/or the outer cladding material.

152. An article according to claim 129, wherein the inner cladding features are voids and/or rods having a lower refractive index than the inner cladding material.

153. An article according to claim 129, wherein the outer cladding features are voids and/or rods having a lower refractive index than the outer cladding material.

154. An article according to claim 129, wherein all or at least part of the inner cladding features have a cross-sectional dimension being smaller than a cross-sectional dimension of the outer cladding features.

155. An article according to claim 129, wherein the refractive index of the inner cladding material is substantially identical to the refractive index of the outer cladding material.

156. An article according to claim 129, wherein the inner cladding features in the cross-section occupy in total a ratio, $F_i$, of the inner cladding region and the outer cladding features in the cross-section occupy in total a ration, $F_o$, of the outer cladding region, and $F_i$ is smaller than $F_o$.

157. An article according to claim 129, wherein one or more of the cladding features are voids containing air, another gas, or a vacuum.

158. An article according to claim 129, wherein one or more of the cladding features are voids containing polymer(s), a material providing an increased third-order non-linearity, a photo-sensitive material, or a rare earth material.

159. An article according to claim 129, wherein the core region and/or the cladding regions comprise silica.

160. An article according to claim 129, wherein the core and/or any of the cladding materials contains polymer(s), are material(s) providing an increased third-order non-linearity, are photo-sensitive material(s), or are rare earth material(s).

161. An article according to claim 129, wherein said fibre is dimensioned to guide light of predetermined wavelength in two substantially, non-degenerate polarization states.

162. An article according to claim 129, wherein the fibre is characterized by a birefringence of at least $10^{-5}$, such as of at least $10^{-4}$, such of as at least $10^{-3}$.

163. An article according to claim 129, wherein the core region has a substantially two-fold symmetry, obtained from arrangement of the core features in a substantially two-fold symmetric manner.

164. An article according to claim 129, wherein the core region contains core features with a non-circular symmetric shape in the fibre cross-section.

165. An article according to claim 129, wherein the shape of the core region deviates substantially from a circular shape in the fibre cross-section.

166. An article according to claim 129, wherein shape of the core region deviates substantially from a quadratic shape, a hexagonal shape, or a higher order polynomial shape in the fibre cross-section.

167. An article according to claim 129, wherein shape of the core region is substantially rectangular in the fibre cross-section.

168. An article according to claim 129, wherein the core region and/or cladding region has substantially a 180 degree rotational symmetry in the fibre cross-section.

169. An article according to claim 129, wherein shape of the core region is essentially circular or elliptical.

* * * * *